(12) United States Patent
Motoyama et al.

(10) Patent No.: US 7,861,227 B2
(45) Date of Patent: Dec. 28, 2010

(54) SOFTWARE DEVELOPMENT ENVIRONMENT WITH DESIGN SPECIFICATION VALIDATION TOOL

(75) Inventors: Tetsuro Motoyama, Cupertino, CA (US); Avery Fong, Castro Valley, CA (US)

(73) Assignee: Ricoh Company Ltd., Tokyo (JP)

( * ) Notice: Subject to any disclaimer, the term of this patent is extended or adjusted under 35 U.S.C. 154(b) by 1180 days.

(21) Appl. No.: 11/494,912

(22) Filed: Jul. 28, 2006

(65) Prior Publication Data

US 2006/0265690 A1 Nov. 23, 2006

Related U.S. Application Data

(63) Continuation-in-part of application No. 10/313,158, filed on Dec. 6, 2002, now Pat. No. 7,171,652.

(51) Int. Cl.
*G06F 9/44* (2006.01)
(52) U.S. Cl. ............... 717/124; 717/120; 717/117; 717/133
(58) Field of Classification Search .......... 717/124
See application file for complete search history.

(56) References Cited

U.S. PATENT DOCUMENTS

| | | | |
|---|---|---|---|
| 4,819,233 A | 4/1989 | Delucia et al. | |
| 4,875,162 A | 10/1989 | Ferriter et al. | |
| 5,197,001 A | 3/1993 | Mukherjee | |
| 5,490,097 A | 2/1996 | Swenson et al. | |
| 5,537,541 A | 7/1996 | Wibecan | |
| 5,548,506 A | 8/1996 | Srinivasan | |
| 5,603,020 A | 2/1997 | Hashimoto et al. | |
| 5,699,310 A | 12/1997 | Garloff et al. | |
| 5,709,410 A | 1/1998 | Reeves, Jr. | |
| 5,765,140 A | 6/1998 | Knudson et al. | |

(Continued)

FOREIGN PATENT DOCUMENTS

| | | |
|---|---|---|
| JP | 04-195222 | 7/1992 |
| JP | 04-250530 | 9/1992 |
| WO | WO 98/49640 A1 | 11/1998 |
| WO | WO 99/04370 | 1/1999 |

OTHER PUBLICATIONS

European Patent Office, "European Search Report", Foreign application No. 07109677.0-1238, received Oct. 29, 2007, 8 pages.

(Continued)

*Primary Examiner*—Thomas K Pham
(74) *Attorney, Agent, or Firm*—Hickman Palermo Truong & Becker LLP; Edward A. Becker

(57) ABSTRACT

An automated software class specification validation tool automatically determines, for functions defined in a function definition section of a class specification, whether the function is properly declared throughout one or more other sections of the same class specification. Further, it can be determined whether variables, i.e., attributes, parameters, and local variables, associated with respective functions in the function definition section are properly specified throughout one or more other sections of the same class specification. The functions and variables that are validated include attributes and functions that are specified for structures and nested classes defined in a defined type section of the class specification. The validation tool is accessible over a network via a web page, and results of the validation process are also displayed on a web page.

22 Claims, 34 Drawing Sheets

U.S. PATENT DOCUMENTS

| | | | |
|---|---|---|---|
| 5,826,086 A | | 10/1998 | Arima et al. |
| 5,826,252 A | | 10/1998 | Wolters, Jr. et al. |
| 5,909,689 A | | 6/1999 | Van Ryzin |
| 6,101,481 A | | 8/2000 | Miller |
| 6,161,113 A | | 12/2000 | Mora et al. |
| 6,189,009 B1 | * | 2/2001 | Stratigos et al. ............ 1/1 |
| 6,236,409 B1 | | 5/2001 | Hartman |
| 6,308,164 B1 | | 10/2001 | Nummelin et al. |
| 6,351,734 B1 | | 2/2002 | Lautzenheiser et al. |
| 6,385,765 B1 | * | 5/2002 | Cleaveland et al. ......... 717/100 |
| 6,405,361 B1 | | 6/2002 | Broy et al. |
| 6,581,040 B1 | | 6/2003 | Wright et al. |
| 6,609,200 B2 | * | 8/2003 | Anderson et al. .......... 713/176 |
| 6,678,698 B2 | | 1/2004 | Fredell et al. |
| 6,842,760 B1 | | 1/2005 | Dorgan et al. |
| 6,859,768 B1 | | 2/2005 | Wakelam et al. |
| 6,895,382 B1 | | 5/2005 | Srinivasan et al. |
| 6,901,579 B1 | | 5/2005 | Suguta |
| 6,957,189 B2 | | 10/2005 | Poage et al. |
| 7,107,268 B1 | | 9/2006 | Zawadzki et al. |
| 7,299,408 B1 | * | 11/2007 | Daconta et al. ............. 715/234 |
| 7,509,687 B2 | * | 3/2009 | Ofek et al. .................. 726/30 |
| 2002/0046394 A1 | | 4/2002 | Do et al. |
| 2003/0200531 A1 | | 10/2003 | Fairweather |
| 2004/0162750 A1 | | 8/2004 | Motoyama |
| 2005/0044295 A1 | | 2/2005 | Wakeam et al. |
| 2005/0060317 A1 | * | 3/2005 | Lott et al. ................... 707/10 |
| 2006/0053043 A1 | | 3/2006 | Clarke |

OTHER PUBLICATIONS

Angermeier, George, "Cooperative Project Management with RPLAN", XP-002345614, Copyright Projekt Magazin, Oct. 2002 edition, 6 pages.

Maurer, Frank et al., "Merging Project Planning and Web-Enabled Dynamic Workflow Technologies", XP-002345613, IEEE Internet Computing, Jun. 2000, 10 pages.

Buchbinder et al., "Oracle Project Management, Release 11i", XP-002345049, Oracle, User guide, part No. B10895-02, May 2004, 354 pages.

Janne, "Developing WWW-Based Project Management Tools for a Large Scale Project", dated Dec. 1997, Tampa University of Technology Department of Information Technology, 80 pages.

Christenberry, J. Reid, et al., "Project and Employee Time Tracking—For Information Systems and Technology", dated Nov. 14, 1996, Georgia University, 17 pages.

Mitchell, Karen, "Managers get a needed boost with project linking", dated Dec. 15, 1987, PC Week, v4, n50, Copyright The Gale Group, Dialog Accession No. 03021023, 4 pages.

Goldmann, S., "Procura: a project management model of concurrent planning and design", 5$^{th}$ International Workshops on Enabling Technologies: Infrastructure for Collaborative Enterprises, 1996, printed May 13, 2007, 2 pages.

Janne, "Developing WWW-Based Project Management Tools for a Large Scale Project", Tampere University of Technology, Department of Information Technology, Master of Science Thesis, Jan. 1998, 80 pages.

Petrie, Charles et al., "Agent-Based Project Management", Center for Design Research, Stanford University, Sep. 1999, 25 pages.

* cited by examiner

2. Project Duration (and Cost)

2.1 Project Duration 2.2 Project Cost (if necessary)

3. Project Members and Assignments

4. Goals

5. Objectives

6. Planning Intent (If necessary)

7. Technical Goals (If necessary)

8. Technical Issues and Risks (If necessary)

9. Patent Target

10. Criteria for Evaluation (If necessary)

11. Major Deliverables

12. Milestones

END OF FORM     550

FIG. 5C

J06 Project

Project Documents and Records

| Documents Number | Title and Description 602 |
|---|---|
| Q6-DJ06-yy | Project Documents |
| Q6-RJ06-II-zzz | Inspection Results |
| Q6-RJ06-MM-zzz | Meeting Records |
| Q6-DJ06-CC-zzz | Changes proposed. Decisions, etc. |
| Q6-RJ06-EE-zzz | Error Tracking |
| Q6-RJ06-yy | Other Records |

Zipped Project Source Code ~604

Current Task List ~610
   Avery Fong
   Tetsuro Motoyama

MEMBER WEBSITE ~612
   INDIVIDUAL 1
   INDIVIDUAL 2

Current Risks

Project Schedule ~608

| Dates | Milestones |
|---|---|
| 5 Jan 2001 | Design Freeze |
| 15 Jan 2001 | Status Report |
| 17 Feb 2001 | Status Report |
| 23 Mar 2001 | Closing Meeting and Demo |

Requirements ~606

Index of Project Documents

| Document ID | Title | Rev | Date | Status (Withdrawn, Active, Draft) | Approval |
|---|---|---|---|---|---|
| Q6-DJ106-17 | Analysis of Software Development | 1.0 | 2Feb01 | Active | Approved |
| Q6-DJ106-16 | Project Review: Problems/Difficulties and Successes | 1.0 | 31Jan01 | Active | Approved |
| Q6-DJ106-15 | Implementation and Unit Test Plan | 1.0 | 12Dec00 | Active | Approved |
| Q6-DJ106-14 | Status Report on 7 December 2000 | 1.0 | 7Dec00 | Active | Approved |
| Q6-DJ106-13 | Design Review Request | 1.0 | 29Nov00 | Active | Approved |
| Q6-DJ106-12 | Status Report on 6 November 2000 | 1.0 | 6Nov00 | Active | Approved |
| Q6-DJ106-11 | Integration Test Plan for J06 Project | 0.1 | 26Oct00 | Active | Approved |
| Q6-DJ106-10 | J06 Software Specification | 1.10 | 25Jan01 | Active | Approved |
| Q6-DJ106-09 | Requirement Matrix for J06 Project | 1.3 | 31Jan01 | Active | Approved |
| Q6-DJ106-08 | J06 Project Plan | 1.4 | 14Dec00 | Active | Approved |
| Q6-DJ106-07 | Requirements for J06 Project | 1.2 | 4Dec00 | Active | Approved |
| Q6-DJ106-06 | Organization and Use of the Project Directory for J06 | 1.1 | 20Oct00 | Active | Approved |
| Q6-DJ106-05 | Implementation and Unit Test Plan Guideline for J06 | 1.0 | 12Oct00 | Active | Approved |
| Q6-DJ106-04 | Code Conventions and Visual C++ | 1.1 | 15Dec00 | Active | Approved |
| Q6-DJ106-03 | Procedure for Source Code Control for J06 | 1.1 | 19Oct00 | Active | Approved |
| Q6-DJ106-02 | Design Document Guideline for J06 | 1.0 | 10Oct00 | Active | Approved |
| Q6-DJ106-01 | Project Initiation Form | 1.0 | 6Oct00 | Active | Approved |
| | | | | | |

To Archival Documents          700

FIG. 7A

| | | | | | |
|---|---|---|---|---|---|
| Publication | 27sep00 | 10oct00 | 10oct00 | 10oct00 | 10oct00 |
| Coding Convention | 29sep00 | 29sep00 | 11oct00 | 29sep00 | 11oct00 |
| Draft | 29sep00 | 29sep00 | 2oct00 | 29sep00 | 29sep00 |
| Review/Inspection | 29sep00 | 2oct00 | 11oct00 | 4oct00 | 11oct00 |
| Publication | 29sep00 | 11oct00 | 11oct00 | 11oct00 | 11oct00 |
| Implementation Plan and Unit Test Guideline | 29sep00 | 2oct00 | 12oct00 | 3oct00 | 12oct00 |
| Draft | 29sep00 | 2oct00 | 4oct00 | 3oct00 | 4oct00 |
| Review/Inspection | 29sep00 | 5oct00 | 12oct00 | 5oct00 | 12oct00 |
| Publication/Meeting | 29sep00 | 12oct00 | 12oct00 | 12oct00 | 12oct00 |
| Project Plan | 21sep00 | 25sep00 | 7oct00 | 25sep00 | 17oct00 |
| Draft | 21sep00 | 25sep00 | 29sep00 | 25sep00 | 29sep00 |
| Review/Inspection | 21sep00 | 2oct00 | 13oct00 | 2oct00 | 17oct00 |
| Publication | 21sep00 | 13oct00 | 13oct00 | 17oct00 | 17oct00 |

2. Design

| Tasks | Identified Date | Planned Start | Planned End | Actual Start | Actual End |
|---|---|---|---|---|---|
| Project Architecture | 2oct00 | 2oct00 | 31oct00 | 4oct00 | 19oct00 |
| Draft | 2oct00 | 2oct00 | 20oct00 | 4oct00 | 17oct00 |
| Review/Inspection | ~~2oct00~~ 19oct00 | 23oct00 | ~~31oct00~~ 19oct00 | 18oct00 | 19oct00 |
| Publication/Meeting | ~~2oct00~~ 19oct00 | ~~31oct00~~ 19oct00 | ~~31oct00~~ 19oct00 | 19oct00 | 19oct00 |
| Project Plan Revision | ~~2oct00~~ 19oct00 | ~~31oct00~~ 20oct00 | ~~2nov00~~ 24oct00 | 19oct00 | 23oct00 |
| Draft | ~~2oct00~~ 19oct00 | ~~31oct00~~ 20oct00 | ~~1nov00~~ 23oct00 | 19oct00 | 20oct00 |
| Review/Inspection | ~~2oct00~~ 19oct00 | ~~1nov00~~ 23oct00 | ~~2nov00~~ 24oct00 | 23oct00 | 23oct00 |
| Publication | ~~2oct00~~ 19oct00 | ~~2nov00~~ 24oct00 | ~~2nov00~~ 24oct00 | 23oct00 | 23oct00 |
| Package Design | 19oct00 | 20oct00 | 15nov00 | 20oct00 | 1nov00 |
| Sender Service | | | | | |
| Draft | 20oct00 | 20oct00 | 23oct00 | 20oct00 | 23oct00 |
| Review | 20oct00 | 24oct00 | 26oct00 | 24oct00 | 26oct00 |
| Receiver Service | | | | | |
| Draft | 20oct00 | 20oct00 | 23oct00 | 20oct00 | 23oct00 |
| Review | 20oct00 | 24oct00 | 26oct00 | 24oct00 | 26oct00 |

FIG. 12

| RICOH<br>RICOH Corporation | Office Solutions and Systems Development Group<br>Division: SUPPORT | Record Ctrl No.: Q6-RJ-II-090<br>Form Number: Q6-F010-01<br>Rev Number 1.3 |
|---|---|---|
| | Inspection Form | Project Number: J06 |

Meeting Date: 26 Oct 2000 Time: 9:06 - 9:09

Project: J06   Release: _____

Document: SENDER SERVICE   Moderator: AF
                                        ~ 1302
Time Spent for Preparation: AD 1 / 60

Meeting Type: Inspection (I)

Inspection Type: Document (Doc)

Result: Accept (A)   ~ 1304

Defect Type:
DA = Data, DC = Documentation, FN = Functionality, IF = Interface, LO = Logic, I/O = Input/Output, HF = Human Factors, MN = Maintainability, PF =

Defect Severity, J = Major, N = Minor

Defect                                                                                          1300

| Location | Defect Description | Type | Class | Sever |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 13

| Task | | Planned Start Date | Planned End Date | Estimated Deviation (Uncertainty) | Actual Completion Dates |
|---|---|---|---|---|---|
| Design Document Guidelines for J06 | | 28Sep00 | 13Oct00 | 0 | 10Oct00 |
| Code Convention for J06 | | 29Sep00 | 13Oct00 | 0 | 11Oct00 |
| Implementation and Unit Test plan guideline for J06 | | 2Oct00 | 13Oct00 | 0 | 12Oct00 |
| Source Code Control Procedure for J06 | | 2Oct00 | 13Oct00 | 0 | 11Oct00 |
| Project Requirements | | 2Oct00 | 16Oct00 | 0 | 16Oct00 |
| Requirements Matrix | | 17Oct00 | 19Oct00 | 1 | 18Oct00 |
| J06 Project Plan | | 27Sep00 | 17Oct00 | 0 | 17Oct00 |
| Integration Test Plan | | 21Sep00 | 31Oct00 | 1 | 26Oct00 |
| Design Document - General Architecture | | 2Oct00 | 31Oct00 | 1 | 19Oct00 |
| Revise J06Project Plan schedule | | ~~31Oct00~~ 20Oct00 | ~~2Nov00~~ 25Oct00 | 1 | 23Oct00 |
| Design Documentation - Package and Class Design | | ~~1Nov00~~ 20Oct00 | ~~22Nov00~~ 15Nov00 | 2 | 2Nov00 |
| TM | Sender Service | 2Oct00 | 26Oct00 | 1 | 26Oct00 |
| | Receiver Service | 2Oct00 | 26Oct00 | 1 | 26Oct00 |
| | ODBC Interface in Monitor_Send | 24Oct00 | 31Oct00 | 1 | 27Oct00 |
| | ODBC Interface in Receive_Store | 27Oct00 | 1Nov00 | 1 | 27Oct00 |
| | Database in Monitor_Send | 31Oct00 | 7Nov00 | 2 | 30Oct00 |
| | Database in Receive_Store | 31Oct00 | 7Nov00 | 2 | 30Oct00 |
| | Device Information | 2Nov00 | 10Nov00 | 2 | 31Oct00 |
| | Parser | 8Nov00 | 15Nov00 | 2 | 1Nov00 |
| AF | Device Monitor | 23Oct00 | 27Oct00 | 1 | 27Oct00 |
| | Data Transfer | 25Oct00 | 1Nov00 | 1 | 30Oct00 |
| | Data Retriever | 30Oct00 | 7Nov00 | 2 | 1Nov00 |
| | POP3 Processor | 3Nov00 | 10Nov00 | 2 | 2Nov00 |
| | Receiver Manager | 8Nov00 | 15Nov00 | 2 | 2Nov00 |
| Revise J06 Project Plan schedule | | 22Nov00 | 28Nov00 | 1 | 3Nov00 |
| Design Documentation - Class Specification | | ~~27Nov00~~ 3Nov00 | ~~5Jan01~~ 14Dec00 | 4 | 29Nov00 |

| Function Name | |
|---|---|
| CHTMLProcessor(CHTTPSession&in_HTTPSession) | 0 |
| ~CHTMLProcessor() | 0 |
| obtainDataFromHTMLFile(std::map<infoType,std::pair<std::string,int>> & inOut_Status,std::vector<SKeyValueInfo>&in_KeyValueInfoVector) | 0 |
| setupExtractionStateVector(std::vector<SKeyValueInfo>&in_KeyValueInfoVector) | 0 |
| adjustMap(std::map<infoType,std::pair<std::string,int>>& inOut_Status,std::string in_sValue,infoTypein_InfoType,int in_nRelativePriority) | 0 |
| obtainNonBlankLine(std::string&out_sLine) | 0 |
| obtainNonBlankLine(std::string&out_sLine,std::stringin_sLine) | 0 |
| clear(std::string&out_sLine) | 0 |
| SExtractionState::SExtractionState() | 0 |
| SExtractionState::~SExtractionState() | 0 |
| SExtractionState::clear() | 0 |

| Attribute Name | |
|---|---|
| m_LineState | 1 |
| m_CurrentPrecondtionItr | 1 |
| m_EndItr | 1 |
| m_infoType | 1 |
| m_nRelativePriority | 1 |
| m_sFrontDelete1 | 1 |
| m_sFrontDelete2 | 1 |
| m_sBackDelete | 1 |
| m_HTTPSession | 1 |
| m_ExtractValueFromLine | 1 |
| m_ExtractionStateVector | 1 |
| m_nCounter | 1 |

Filename - cHTMLProcessorError2.htm

Class/Struct - CHTMLProcessor

...................................................

CHTMLProcessor(CHTTPSession & in_HTTPSession):

~CHTMLProcessor():

obtainDataFromHTMLFile(std::map<infoType, std::pair<std::string, int> > & inOut_Status, std::vector<SKeyValueInfo> & in_KeyValueInfoVector):
*Error - Unspecified Variables*        ⟩ 2908
m_Counter - 1
*Local Variable Usage - Check Names of Local Variables*
loc_sLine - 3
loc_Line - 1                              ⟩ 2914
loc_sValue - 4
loc_bReturn - 3 setupExtractionStateVector(std::vector<SKeyValueInfo> & in_KeyValueInfoVector):
*Error - Unspecified Variables*        ⟩ 2910
m_PreconditionVector - 3
*Local Variable Usage - Check Names of Local Variables*
loc_ExtractionState - 8 adjustMap(std::map<infoType, std::pair<std::string, int> > & inOut_Status, std::string in_sValue, infoType in_InfoType, int in_nRelativePriority):
*Local Variable Usage - Check Names of Local Variables*
loc_Pair - 4 obtainNonBlankLine(std::string & out_sLine):
*Local Variable Usage - Check Names of Local Variables*
loc_fRemoveTrailing - 2
loc_fRemoveLeading - 2 obtainNonBlankLine(std::string & out_sLine, std::string in_sLine):
*Error - Unspecified Variables*
in_Line - 1                                ⟩ 2912
out_Line - 4
*Local Variable Usage - Check Names of Local Variables*
loc_fRemoveTrailing - 2
loc_fRemoveLeading - 2 obtainBlankLine(std::string & out_sLine, std::string in_sLine):           ╱ 2902
*Error - obtainBlankLine(std::string & out_sLine, std::string in_sLine) is Not Declared*
*Local Variable Usage - Check Names of Local Variables*
loc_fRemoveTrailing - 2
loc_fRemoveLeading - 2 clear(std::string & out_sLine, std::string in_sLine):           ╱ 2904
*Error - clear(std::string & out_sLine, std::string in_sLine) is Not Declared*

SExtractionState::SExtractionState():

SExtractionState::~SExtractionState():

SExtractionState::reset():           ╱ 2906
*Error - SExtractionState::reset() is Not Declared*
```

Fig. 29

SOFTWARE DEVELOPMENT ENVIRONMENT WITH DESIGN SPECIFICATION VALIDATION TOOL

CROSS REFERENCE TO RELATED APPLICATIONS

This application is a continuation-in-part of U.S. patent application Ser. No. 10/313,158, filed Dec. 6, 2002 now U.S. Pat. No. 7,171,652 entitled "Software Development Environment With Design Specification Verification Tool", which is related to U.S. patent application Ser. No. 09/881,250, entitled "Automated Management Of Development Project Files Over A Network", and U.S. patent application Ser. No. 10/059,694, entitled "Project Management Over A Network With Automated Task Schedule Update", the content of all of which is incorporated by reference in its entirety for all purposes as if fully set forth herein.

FIELD OF THE INVENTION

The present invention relates generally to project management and, more specifically, to automatically checking and validating a software class specification.

BACKGROUND OF THE INVENTION

Product development projects typically require significant effort to monitor and manage. Furthermore, computer software development projects are inherently difficult to manage. This difficulty is partly due to the large number of tasks and associated deliverables that comprise a software package and the vastness of paperwork and project files associated with these tasks and deliverables. Another contributing factor are the complex interdependencies established between individual tasks and deliverables during the development cycle of a software package. Yet another contributing factor is the need to generate and maintain a design specification associated with the software being developed.

Management of development projects typically includes organizing, maintaining, and controlling access to project documents, schedules, and the like. Furthermore, there are often multiple development projects occurring concurrently within an enterprise organization, thus significantly expanding the document management efforts. Historically, management of a master project schedule entails, among other tasks, manually entering data into a scheduling application, manually creating links between schedules, and manually aggregating individual developers' task schedules into the master project schedule. These are cumbersome and error-prone tasks, with little to no oversight and quality control.

A master project schedule is often in a state of flux, whereby management solicits the developers for task statuses and related schedule updates. Often, the feedback provided to management by the developers has little oversight and is not according to a rigid policy, procedure, or validation process. Thus, the actual status of a project schedule is often difficult to ascertain since the progress of individual tasks are dictated by subjective, and often self-supporting, progress reports by those individuals that are assigned to the task.

For example, some scheduling systems allow a developer to signify that a task is partially completed, i.e., ninety percent completed. This information is then entered into the scheduling system to determine whether the project is on-schedule. However, because there is generally no accountability as to whether an individual's status is reliable, the current process of obtaining project status tends to shadow the realistic progress of the project.

In view of the foregoing, there is a clear need for a technique for management of interdependent development project task schedules that reduces the manual tasks related thereto.

Furthermore, during the development of software, generating and maintaining accurate and consistent design specifications is a challenge. Sometimes variable names are misspelled or used inconsistently within the design specification and often these errors go undetected in the inspection process. Furthermore, sometimes variable names referenced in a design specification are inconsistent with organization rules, constraints and processes, such as variable naming rules.

If a design specification contains incorrect or inconsistent variable names that go undetected during the document inspection process, then these errors are usually detected by a compiler when the software code associated with the specification is compiled. In such a scenario, time and resources are wasted in correcting the errors, both in the code and in the design specification. In some organizations, design specifications must also abide by the organization's document change control process. Thus, the wasting of resources is exacerbated because a revised specification document requires generation of a document change request and further inspection of the document and the change request, which presents additional costs and results in additional wasting of resources. In view of the foregoing, there is a clear need for an automated technique for checking and verifying the accuracy and consistency of a software design specification document. For example, there is a need for validating various aspects of a class specification.

SUMMARY OF EMBODIMENTS OF THE INVENTION

A technique for validating a software class specification file includes automatically determining whether the class specification file includes all the sections that class specifications are required to have according to document rules and, if so, determining whether the sections are correctly ordered.

Various embodiments involve further validating the class specification file for consistency across the sections of the class specification. Specifically, the class specification file is validating with respect to proper (a) declaration of defined functions; and (b) specification of variables. Validating proper specification of variables includes validating (b1) class attributes, for attributes specified at either the class level or attributes specified for structures and nested classes defined in a defined type list; and (b2) parameters corresponding to functions defined in the class specification, for functions defined at either the class level or functions defined for structures and nested classes defined in a defined type list; and (b3) local variables referenced in corresponding function definitions.

A validator tool, which is accessible over a network via a web page, traverses the sections of the electronic class specification file. For example, the validator reads a Function List section, a Defined Type List section, and a Class Attributes section, and identifies and stores the various function names and variable names encountered in the class specification file. The validator then processes a Function Definitions section of the class specification file by identifying the defined functions and referenced variables, and checking these against the function and variable names already encountered in the other sections of the class specification file. Results are displayed on a web page, indicating the functions that are defined in the class specification and any undeclared functions and/or unspecified variables.

Hence, occurrences of misspelled, missing, or out of order functions and unspecified parameters and attributes in an electronic class specification file are discovered in an automated manner before proliferation of such errors to the software code associated with the class specification. Thus, in many cases, use of resources associated with correcting a controlled document, such as the class specification, is reduced or avoided. Further, subsequent compiler-time errors are reduced or avoided.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5C is a continuation of the exemplary printed/displayed project initiation form of FIG. 5B;

FIG. 6 illustrates an example of a project site, according to an embodiment of the invention;

FIG. 7A illustrates an example of a project document index, according to an embodiment of the invention;

FIG. 12 illustrates an example of an individual task schedule, according to an embodiment of the invention;

FIG. 13 illustrates a printed or displayed example of an on-line inspection form which is utilized to automatically update an individual task schedule, according to an embodiment of the invention;

FIG. 14 illustrates an example of a management schedule, according to an embodiment of the invention;

FIG. 19 illustrates an example of an on-line task assignment form, according to an embodiment of the invention;

FIG. 25A illustrates a lookup table that stores the functions declared in the Function List and Defined Type List of the class specification corresponding to the class specification of Appendix A, according to an embodiment of the invention;

FIG. 25B illustrates a lookup table that stores the attributes from the Defined Type List and Class Attributes of the class specification corresponding to the class specification of Appendix A, according to an embodiment of the invention;

FIG. 29 illustrates an example of results from use of the class specification validator on the class specification of Appendix C, according to an embodiment of the invention.

DETAILED DESCRIPTION OF EMBODIMENTS OF THE INVENTION

Techniques for automating tasks involved in the management of a development project are described. The techniques are described herein primarily in reference to a software development project, but those skilled in the art should recognize that the benefits of the invention are also available when applying the techniques to other development projects. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Operating Environment

Figure 1:
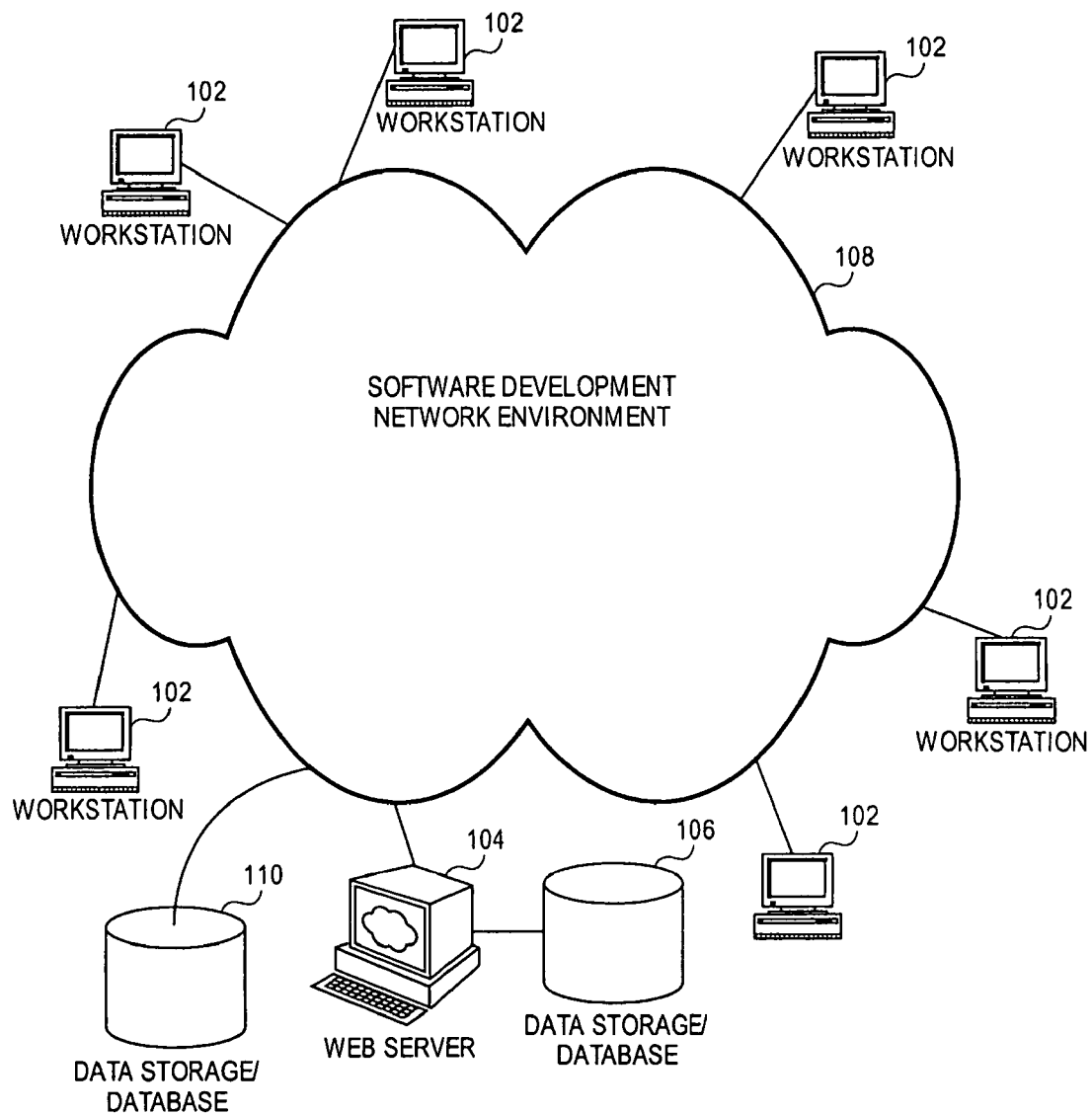
FIG. 1 illustrates an example of an operating environment in which aspects of the invention can be implemented.

FIG. 1 illustrates a non-limiting example of an operating environment in which embodiments of the invention can be implemented. The example operating environment comprises a plurality of workstations 102, a web server 104, and a database 106, all connected directly or indirectly to a software development network 108 for communication therebetween. Optionally, a database 110 may be present for reasons described below.

Figure 2:
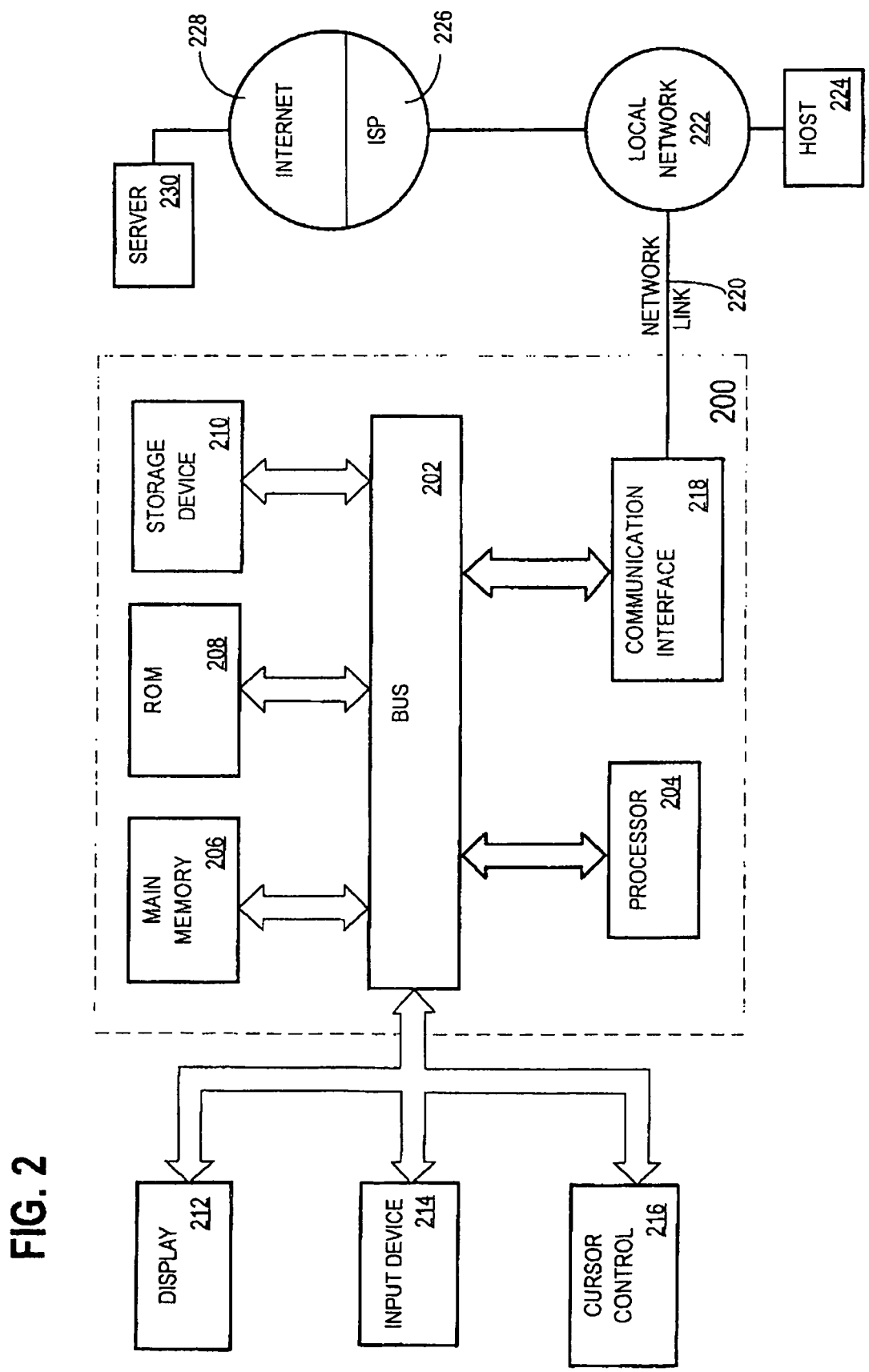
FIG. 2 is a block diagram that illustrates a computer system upon which embodiments of the invention can be implemented.

Workstations 102 are typically computer systems configured as illustrated by the computer system 200 of FIG. 2, and are utilized, for example, by the software engineers/developers to complete tasks associated with a development project. Pertinent non-limiting examples of such tasks include initiating projects, preparing and maintaining task schedules, designing software architecture, creating specifications, creating software code, implementing and testing software code, inspecting various task products, etc. In addition, project managers utilize workstations 102 for accessing information to review and manage the progress of the project. The developers and managers transmit communications through the network 108 to the other connected components, i.e., web server 104 and database 106.

Web server 104 depicts a conventional web server, which is a combination of computer hardware and software that, using the appropriate protocols (e.g., Hypertext Transfer Protocol [HTTP] and Transmission Control Protocol/Internet Protocol [TCP/IP]), serves the files that form web pages (e.g., Hypertext Markup Language [HTML] or Extensible Markup Language [XML] files), to users, such as developers or managers at a workstation 102. In general, the majority of information exchanged and managed during the development project life cycle is served by the web server 104 over the network 108. Furthermore, aspects of the techniques for automating management of development project files, as described herein, may be implemented and executed on the web server 104, although practice of the invention is not limited to such an implementation. The techniques could also be implemented on any other processing system, such as workstation 102 or a similarly configured computer system as illustrated in FIG. 2.

Database 106 depicts a conventional database for storing information related to the development project, thus providing access to the information by authorized individuals at workstations 102 or web server 104, through queries transmitted over the network 108. The type of information stored on database 106 is virtually limitless, non-limiting examples including project initiation forms, individual and aggregated management task schedules, specifications, software code, inspection reports, web page files, and document directories and indexes. In addition, other information may be stored on the database 106, as illustrated in and described in reference to FIG. 3. In alternative operating environments, a conventional database 110 is connected directly to the network 108 as a database server.

Network 108 depicts a conventional network, e.g., a packet-switched network, for facilitating the exchange of information between and among various connected components, such as workstation 102, web server 104, and database 106. The network 108 may be a Local Area Network (LAN), such as a conventional Ethernet, Fast Ethernet, a token ring, or a wireless LAN such as specified in 802.11a and 802.11b (developed by a working group of the Institute of Electrical and Electronics Engineers [IEEE]), which may be implemented within an enterprise. In addition, network 108 may also be a Wide Area Network (WAN), such as the Internet, for facilitating communication with remote users through a Virtual Private Network (VPN), or the network 108 may represent a combination of a LAN and a WAN. In addition, network 108 can be formed using a variety of different mediums, including but not limited electrical wire or cable, optical, or wireless connections.

Hardware Overview

FIG. 2 is a block diagram that illustrates a computer system 200 upon which embodiments of the invention can be implemented. Computer system 200 additionally illustrates a non-limiting example of a system configuration of the workstation 102 (FIG. 1) and the web server 104 (FIG. 1). Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk, optical disk, or magneto-optical disk, is provided and coupled to bus 202 for storing information and instructions.

Computer system 200 may be coupled via bus 202 to a display 212, such as a cathode ray tube (CRT) or a liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Examples of non-volatile media include, without limitation, optical, magnetic disks, or magneto-optical disks, such as storage device 210.

Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, without limitation, a floppy disk, a flexible disk, hard disk, magnetic tape, any other magnetic medium; a CD-ROM, DVD, any other optical or magneto-optical medium; punch-cards, papertape, any other physical medium with patterns of holes; a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

Project Database

Figure 3:
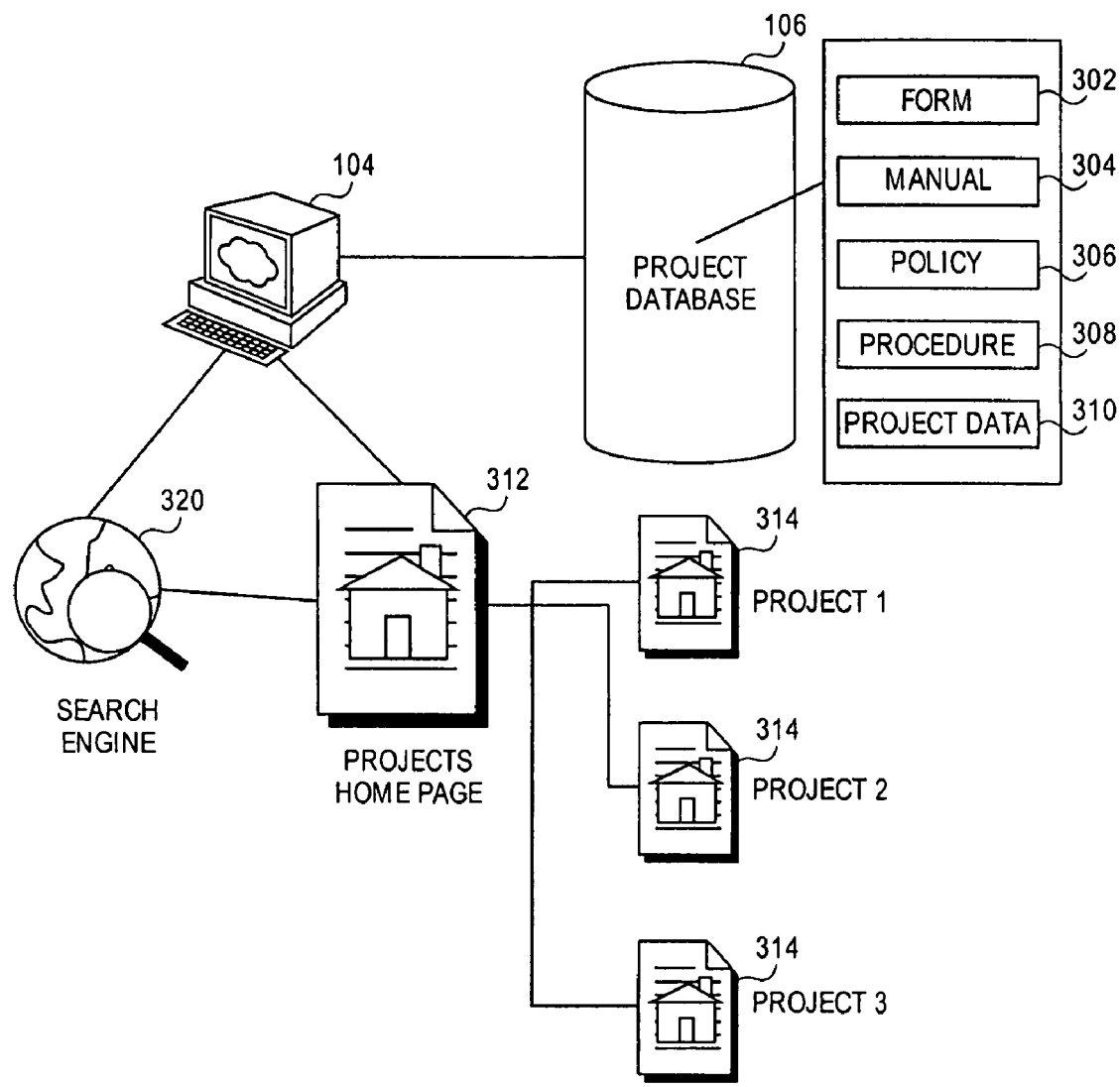
FIG. 3 illustrates examples of data components of a database and web components, according to an embodiment of the invention.

FIG. 3 illustrates a non-limiting example of data components of the database 106 and web components, according to an embodiment of the invention. Database 106 can store files representing various project documents, some being generic project-related documents employed by an enterprise for providing guidance with respect to administering and controlling development projects, and some being specific to a particular project. For examples of generic documents, the database can be configured to store, without limitation, one or more template forms 302 for use by project participants (i.e., engineer/developers, managers, and others), such as a project initiation form (see FIGS. 5B and 5C for a printed example of an interactive project initiation form) or an inspection form (see FIG. 13 for a printed example of an interactive inspection form); and one or more manuals 304, policies 306, and procedures 308, for instructing project participants on enterprise infrastructure, policy and procedures, at least with respect to development projects. The forms 302 facilitate the interactive input of information into the system database 106 and are primarily used by the clients, or individual project participants, and also define the printed outputs.

Figure 20:
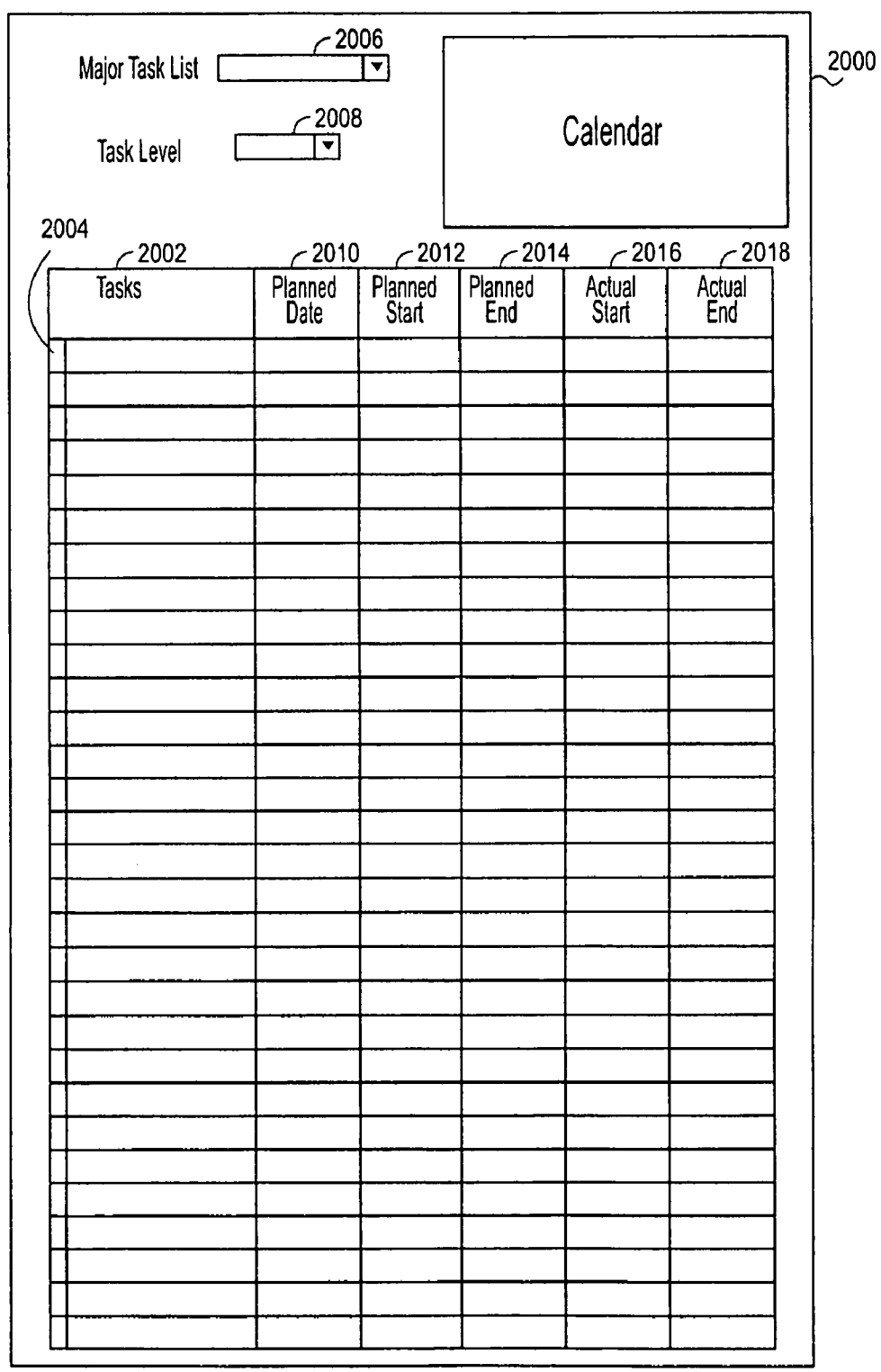
FIG. 20 illustrates an example of an on-line individual task scheduler form, according to an embodiment of the invention.

Project data 310 refers to project-specific documents that may include, but are not limited to, completed project initiation forms (see FIGS. 5B and 5C), individual task schedules (see FIG. 12), aggregated management task schedules (see FIG. 14), specifications, software code, completed inspection forms (see FIG. 13), web page files, document directories and indexes, task assignment forms (see FIG. 19), and individual task scheduler forms (see FIG. 20). Note that the document directories and indexes, and the task assignment and individual task scheduler forms, may alternatively or additionally be stored on the database 110 (FIG. 1). A project participant working on a workstation 102, or alternatively on web server 104, can utilize a search engine 320 to access the database 106 and search for the various generic and project-specific documents.

Different levels of project-specific information can be accessed from the database 106, as is depicted by a projects home page 312 and one or more project sites 314. The projects home page 312 provides links to the one or more project sites 314. As is known in the art, a link is a selectable connection from one word, picture, or information object to another. One non-limiting example of an implementation of a link is a hyperlink, utilizing a suitable protocol and language such as HTTP and HTML, respectively. The links allow a user to access the project sites 314 from the home page 312, by enacting the link. The link is enacted typically through use of the cursor control 216 (FIG. 2) and/or the input device 214 (FIG. 2), by interacting with an appropriate application such as a conventional web browser. Examples of the information that is linked to, and thus accessible from, the project sites 314 are described below.

Initiating Automated Project File Management

Figure 4A:
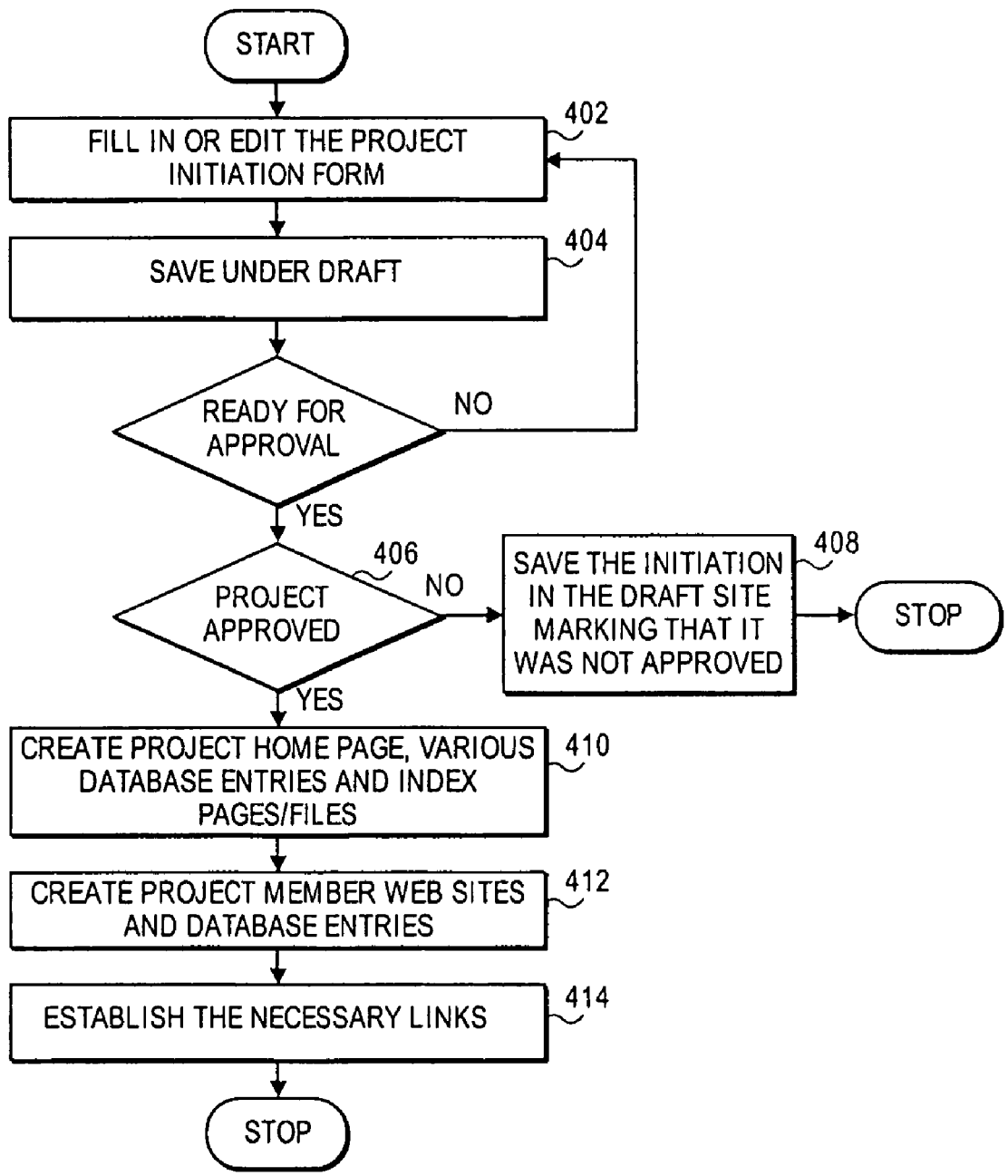
FIG. 4A is a flow chart illustrating steps for initiating automated management of project files over a network, according to an embodiment of the invention.
Figure 5A:
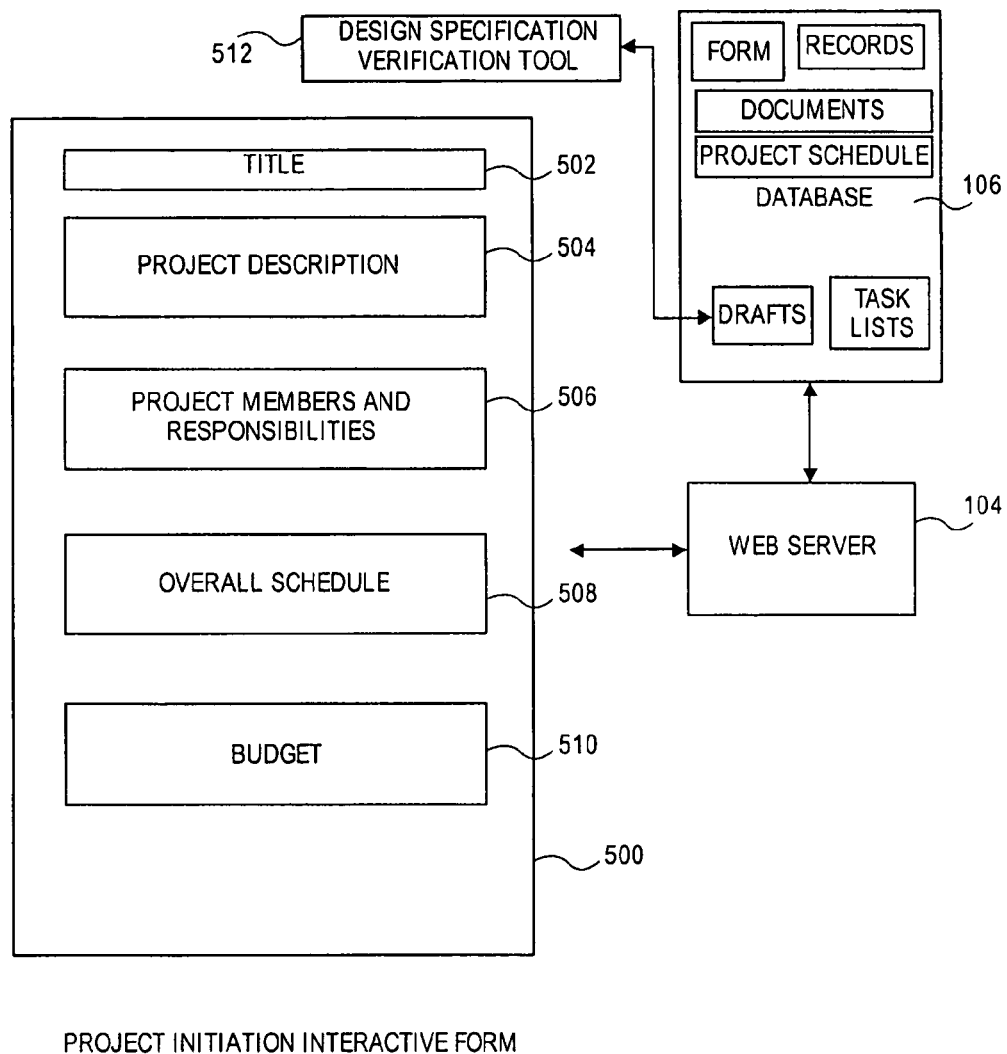
FIG. 5A is a block diagram of an arrangement for initiating a project via an on-line interactive form, according to an embodiment of the invention.

FIG. 4A is a flow chart illustrating steps for initiating automated management of project files over a network, according to an embodiment of the invention. First, at step 402, an individual completes a project initiation form for submission to management for project approval. FIG. 5A is a block diagram of an arrangement for initiating a project via an on-line interactive project initiation form 500, according to an embodiment of the invention. The interactive form can be an HTML or XML based page. The project initiator enters the necessary information, for a non-limiting example, the project title 502, project description 504, anticipated project members and responsibilities 506, overall schedule 508, and budget 510, through a network interface, such as a web browser. The entered information is transmitted through the web server 104 to the database 106, where it is initially stored in draft form prior to approval of the requested project, at step 404 of FIG. 4A. Furthermore, the initiator can revise the draft form until proceeding to the project authorization/approval process. The blocks of information depicted in database 106 in FIG. 5A comprise the various information that can be extracted and presented in a project home page or site, such as project site 600 of FIG. 6.

FIG. 5A further includes a design specification verification tool 512, which is used to automatically verify drafts of design specification documents. The design specification verification tool 512 can be used to support a software design process depicted in FIG. 22. Design specification verification tool 512 is described in detail below.

Figure 5B:
FIG. 5B illustrates an example of a printed or displayed project initiation form that can be utilized in an embodiment of the invention.

An example of a printed or displayed project initiation form 550, illustrating pertinent information headings with the information excluded, is illustrated in FIGS. 5B and 5C. The interactive project initiation form 500 (as exemplified also as form 550) is available from the form 302 (FIG. 3) component of database 106 (FIG. 1), and is linked to other data in the database 106 for automated entry of some data fields. The format of the printed/displayed project initiation form 550 is associated with the form 302.

Referring back to FIG. 4A, at decision block 406 it is determined whether the appropriate project approval authority has approved the proposed project. If the project is not approved, then at step 408 the project initiation form is marked to indicate that the project is not approved, and is stored as a draft in the database 106. Upon approval of the proposed project, at step 410 the project is automatically assigned a project number and an official project site, such as project site 314 (FIG. 3), is automatically created and linked to the project home page, such as project home page 312 (FIG. 3). In addition, various database 106 entries and index pages are created at step 410. At step 412, web sites for individual project participants are created; and linked to the appropriate official project site, at step 414. In addition, the necessary entries are created in the database 106, and linked to the appropriate skeleton files that are utilized by the project participants. The project participants are able to link any working or draft documents to their individual site, whereby the documents will be available to authorized project members through the appropriate chain of links from the project home page, i.e., projects home page 312. Access permissions are restricted and controlled according to document control policies. In certain embodiments, a directory of project files associated with the project is created, stored in the database 106 and database 110 (FIG. 1), and linked to the project site (as shown in FIG. 6). Sub-directories and indexes can be created, as applicable, and linked to the appropriate directory entry on the project site.

Inspection Process—Client

Figure 4B:
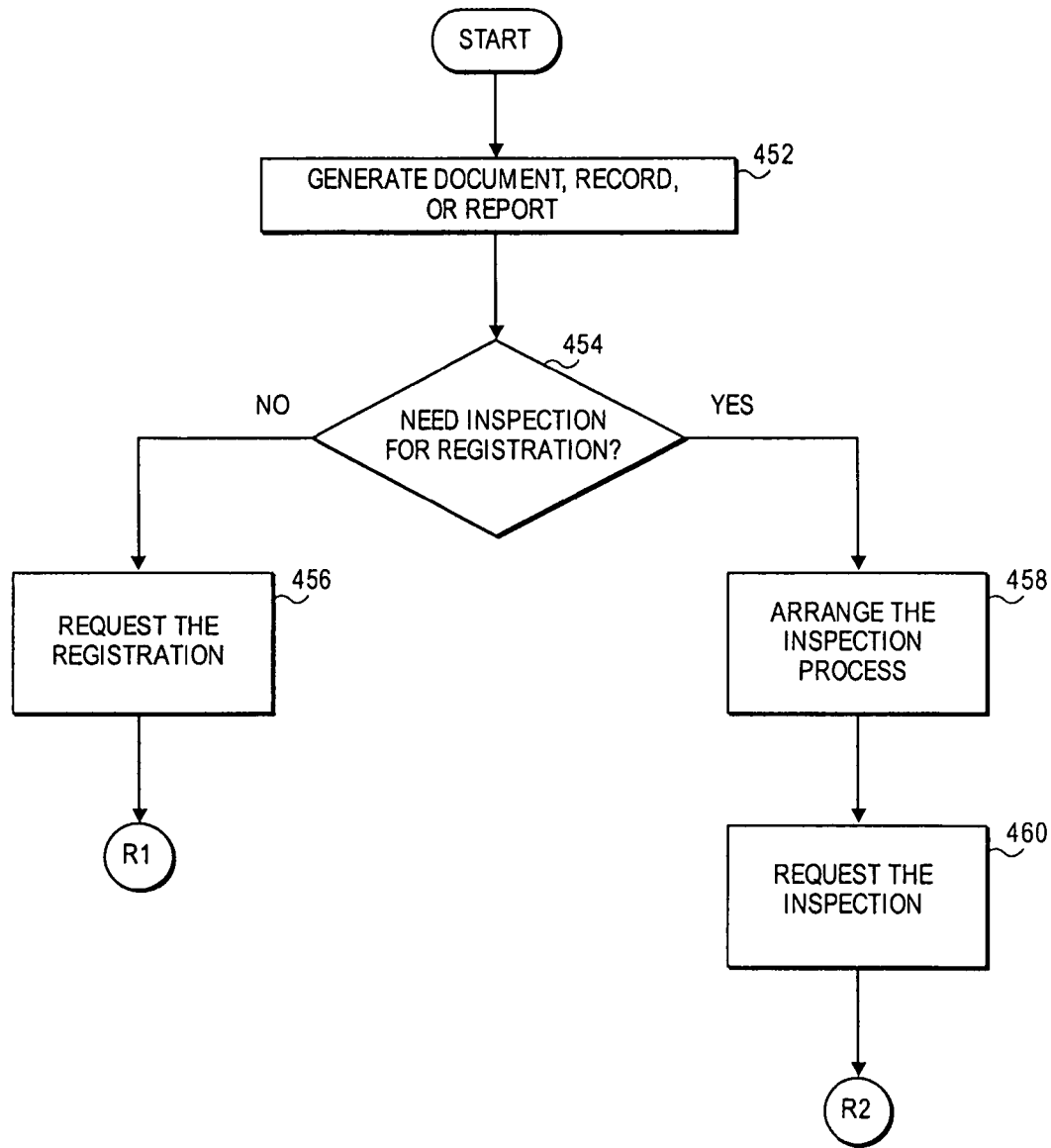
FIG. 4B is a flowchart illustrating steps an individual (client) performs in relation to the document inspection process, according to an embodiment of the invention.
Figure 4C:
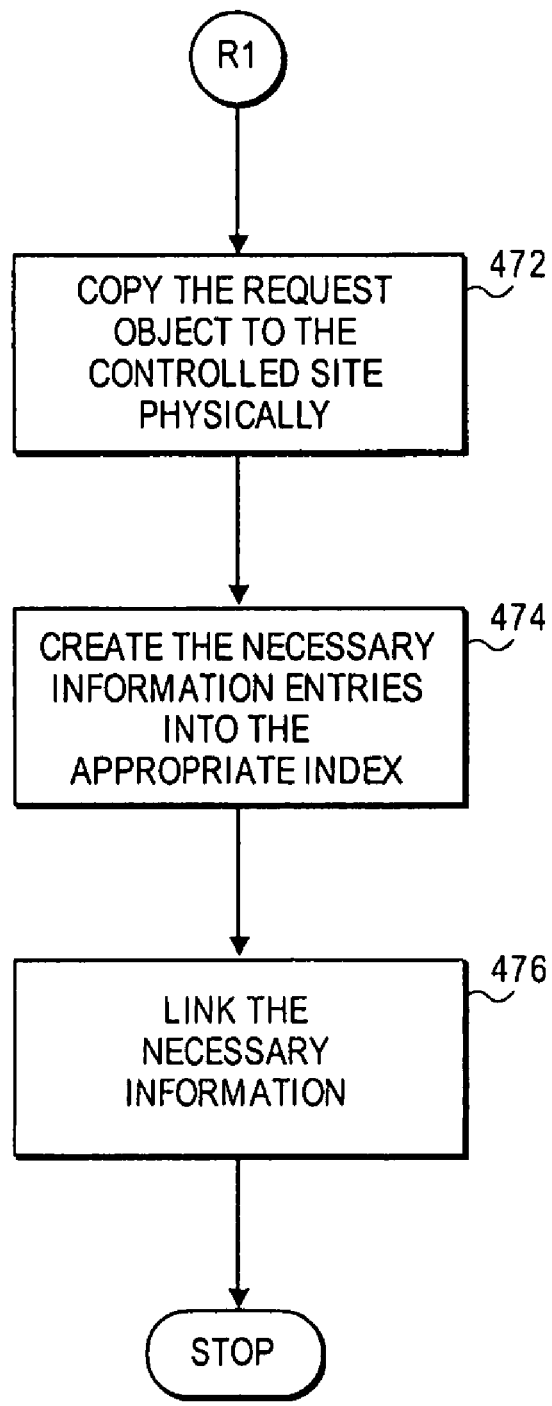
FIG. 4C is a flowchart illustrating a server-side process continuing from R1 of FIG. 4B, according to an embodiment of the invention.

FIG. 4B is a flowchart illustrating steps an individual (client) performs in relation to the document inspection process, according to one embodiment. At step 452, a document, record, or report (reference material) is generated by an individual project participant. At the decision block of step 454, it is determined whether the reference material is the type that requires inspection to ensure quality. For example, some information, such as technical information and records, may not require the quality inspection. In this case, at step 456, the individual requests registration of the document, whereby the flow goes to R1, which is illustrated in FIG. 4C. If inspection of the reference material is deemed necessary to ensure quality, the individual arranges inspection thereof, at step 458. At step 460, an inspection is requested whereby it is registered in the project file management system, to be managed by the processes described herein. In this case, the flow goes to R2, which is illustrated in FIG. 4D.

Inspection Process—Server

FIG. 4C is a flowchart illustrating the server-side process continuing from R1 of FIG. 4B, where the reference material is not inspected and where document registration is requested. At step 472, the reference material is copied into database 106 (FIG. 1) under a controlled environment so that the individual who created the material is no longer able to modify it. Alternatively, the material is copied into a secure file system and a reference to the material is saved in the database 106. At step 474, information entries, for example, the document reference number, the title, date, and originator, are created in the appropriate index page (see 700 of FIG. 7A). At step 476, links are created from the index page to the appropriate documents and corresponding document fields.

Figure 4D:
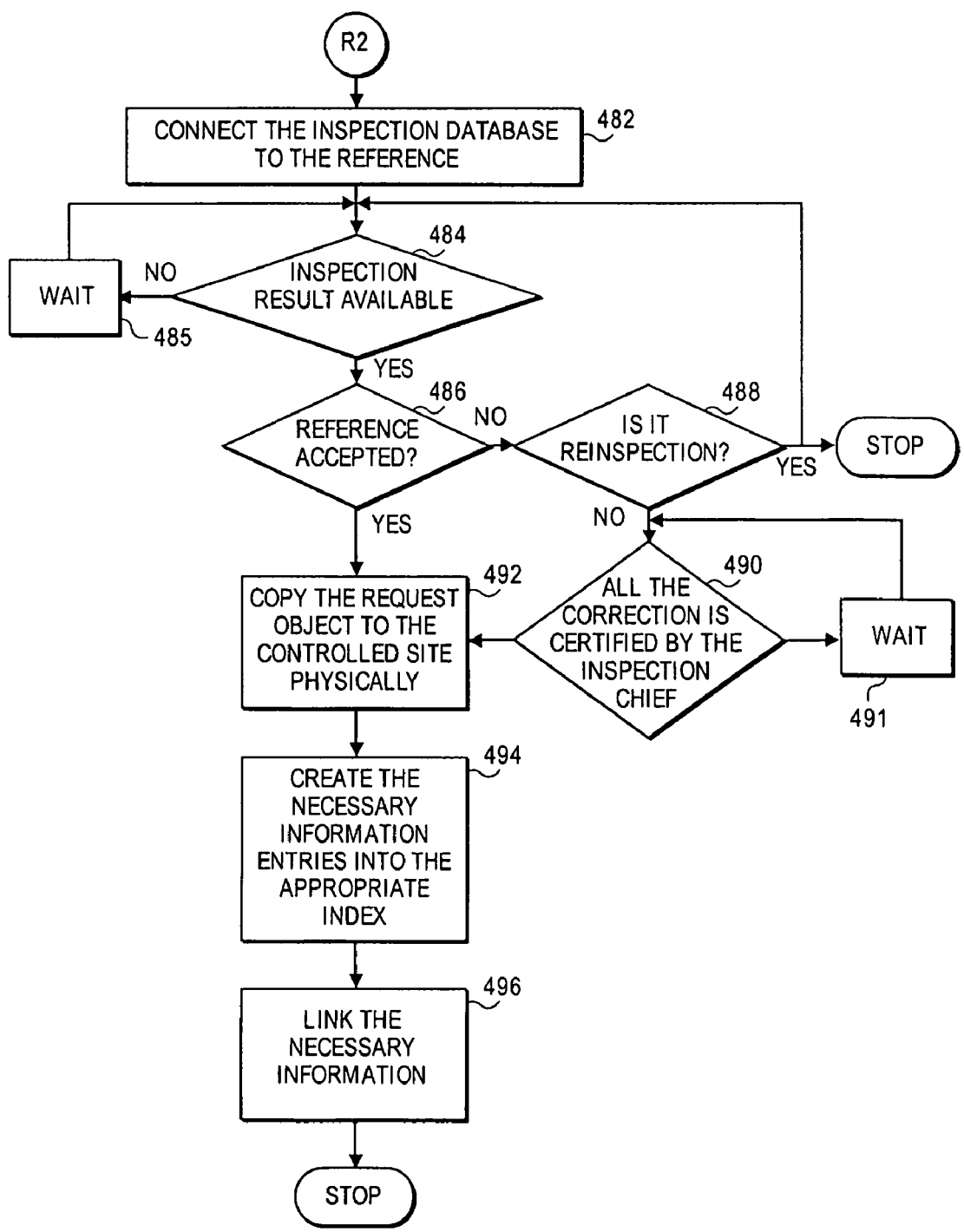
FIG. 4D is a flowchart illustrating the server-side process continuing from R2 of FIG. 4B; according to an embodiment of the invention.

FIG. 4D is a flowchart illustrating the server-side process continuing from R2 of FIG. 4B, where an inspection of the reference material is requested. Generally, the file management system embodying the file management processes described herein, monitors whether the requested inspection completes on schedule and thus, whether inspection results are available. At step 482, an inspection result object (see 774 of FIG. 7B) is linked to the reference material. At decision block 484, it is periodically determined whether inspection results are available. If inspection results are not yet available, the process essentially waits for a certain period to pass, at step 485, and then returns to block 484 to look for inspection results. Once inspection results are available, they are analyzed. At decision block 486, the inspection result is analyzed to determine whether the reference material is denoted as accepted by the associated inspector. If it is determined that the material is not accepted, then at step 488 it is determined whether the material requires re-inspection or if it is conditionally accepted (a disposition different than accepted). If the material requires re-inspection, the database is updated accordingly. At this point, the process could return to block 484 to determine if additional inspection results are available. If the material is conditionally accepted, the flow goes to decision block 490, where the material is checked to determine whether it is modified to meet the specified conditions from the inspection report, and whether the corrections are certified by an inspection chief. If the material is not yet certified by the inspection chief, at step 491, the process waits for a period and returns to block 490. After a predetermined period has passed without certification by the inspection chief, e-mails are sent to the document creator and to the inspection chief warning that the document is not yet certified.

Once it is determined at decision block 490 that the material has been certified by the inspection chief, the process continues to step 492, which is the same step that is performed if the reference material is accepted at block 486. At step 492, the current inspection material is copied into database 106 (FIG. 1) under a controlled environment so that the individual who created the material is no longer able to modify it. At step 494, information entries, for example, the document reference number, the title, date, and originator, are created in the appropriate index page (see 700 of FIG. 7A). At step 496, links are created from the index page to the appropriate documents and corresponding document fields.

Project Web Pages

FIG. 6 illustrates an example of a project site 600, with links (underlined entities) to several other pages of information specific to a particular project (in this case, the J06 project as shown at top of project site 600), according to an embodiment of the invention. Links include, but are not limited to, a directory 602 of official project documents and records; a project source code link 604; a project requirements link 606; a project schedule link 608; one or more current task list links 610 and member web site links 612 for individuals, i.e., engineers/developers, working on the project.

The directory 602 presents links to indexes of various official documents and records associated with the project, for non-limiting examples, project documents, inspection results, meeting records, changes, error tracking, and other records.

The project schedule link 608 provides access to the aggregated management task schedule, which is exemplified in and described in reference to FIG. 14. The current task list link 610 provides access to the task schedules of each individual assigned tasks for the project, which is exemplified in and described in reference to FIG. 12. Furthermore, the relation between the individual task schedules, accessed via current task list link 610, and the aggregated management task schedule, accessed via project schedule link 608, is described in detail below under the headings "Management Schedule Generation" and "Updating a Project Schedule." Finally, the member website link 612 provides access to one or more individual web sites, the creation of which is described above in reference to step 408 of FIG. 4. The individual web sites provide access to draft documents being worked on by the individual, as well as to the individual task lists (see FIG. 12).

Figure 7B:
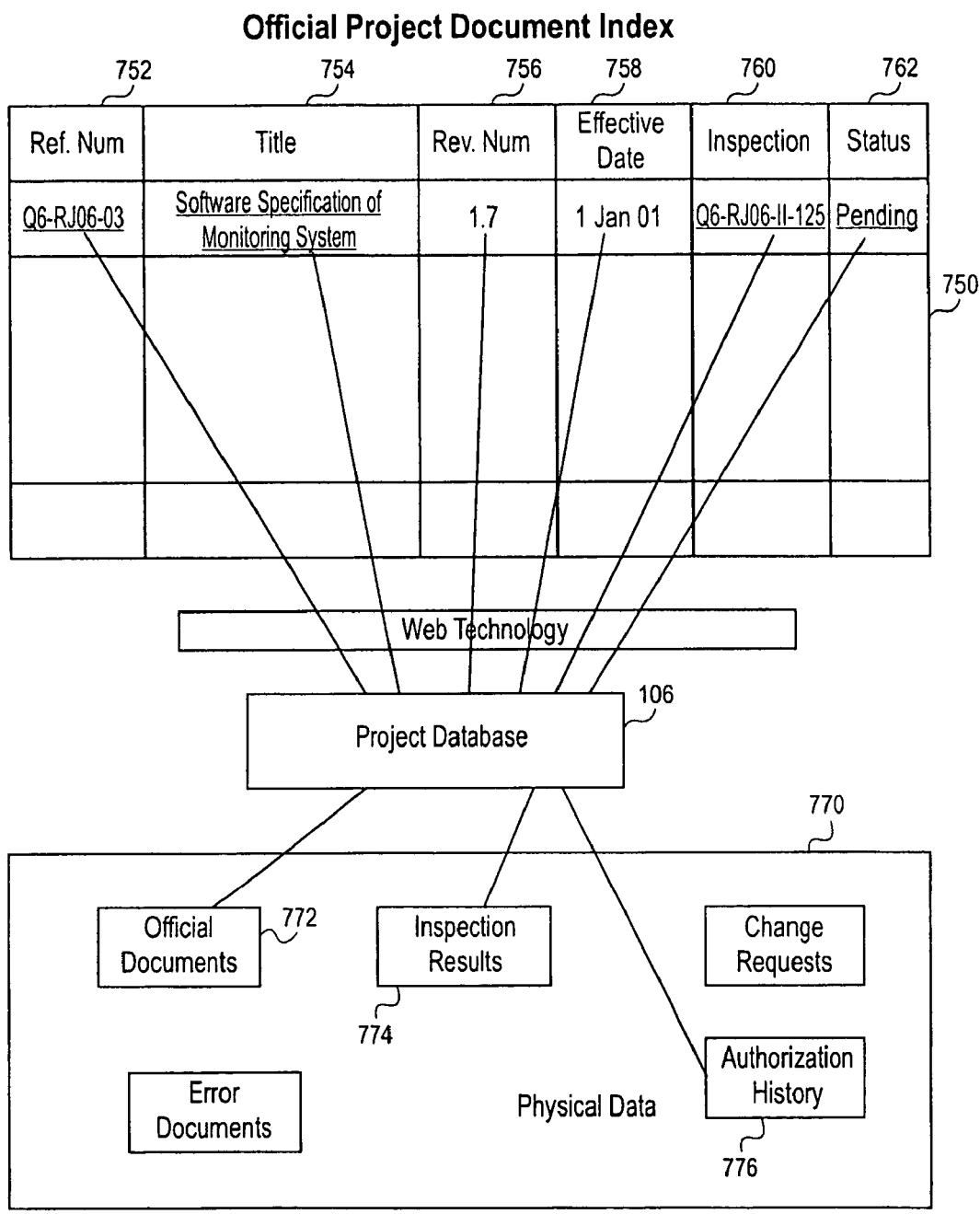
FIG. 7B illustrates link relationships between an example web index page, the project database, and electronic or physical files/objects managed by the database, according to an embodiment of the invention.

FIG. 7A illustrates an example of an index 700, which is an "Index of Project Documents", according to an embodiment of the invention. The index 700, and any other indexes linked to the directory 602, includes links to actual files stored in the database 106 (FIG. 1). FIG. 7B illustrates the link relationships between an example index web page 750, the project database 106, and electronic or physical files/objects 770 managed by the database 106, according to an embodiment of the invention. A reference number 752, a document title 754, and a revision number 756 are linked to the same object, that is, official documents 772. Effective date 758 corresponds to the date that the document is effective or last revised in correspondence with the revision number 756. An inspection 760 field is linked to the inspection results 774 corresponding to the inspections performed on the document. Status 762 presents the current status of the indexed document, that is whether the document is still awaiting authorization from the appropriate party. The status 762 field is linked to the authorization history object 776. The information included in the index web page 750, under the management of the database 106, is displayable to a client through a web browser interface.

Method for Managing Project Files Over a Network

Figure 8:
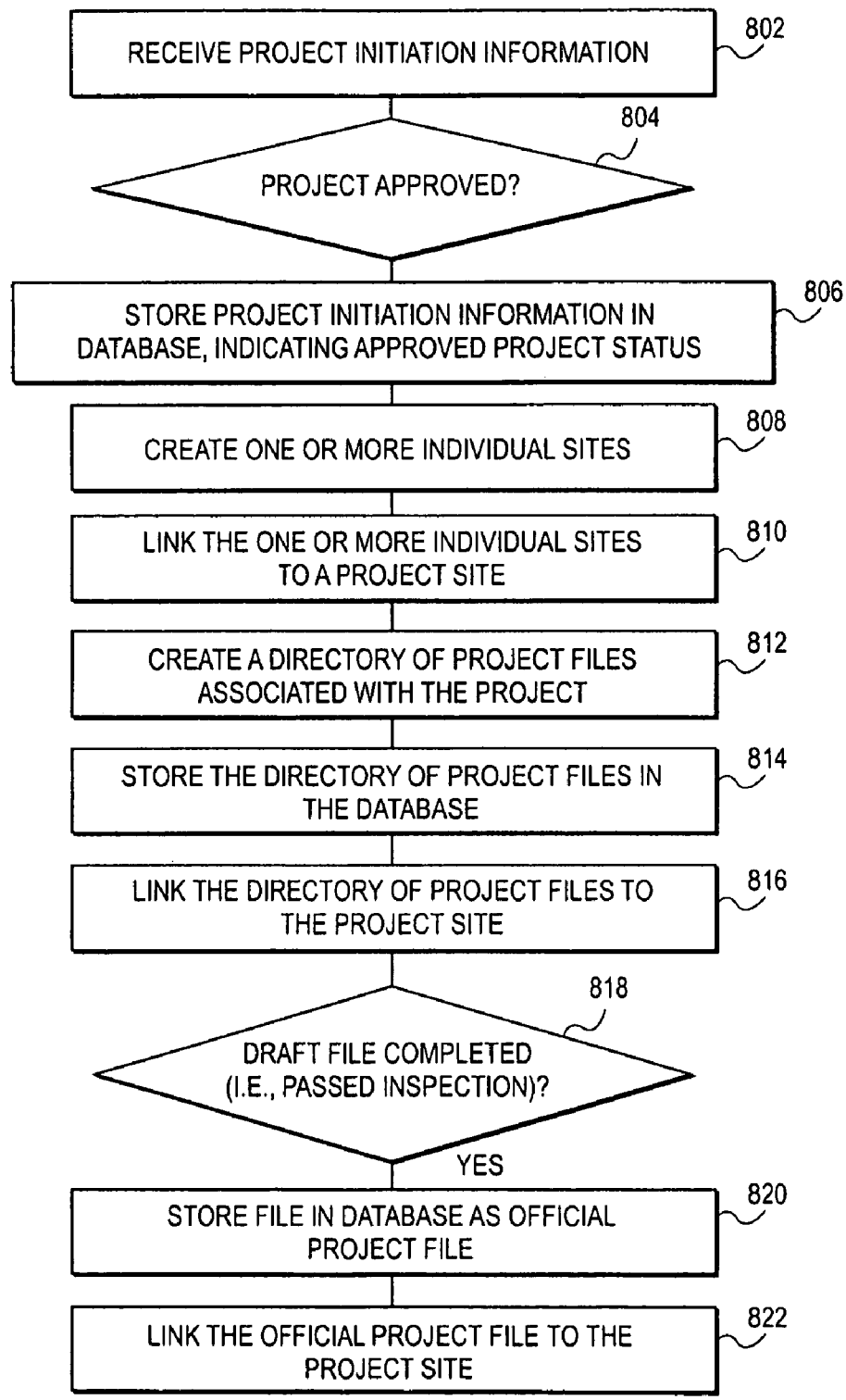
FIG. 8 is a flow chart illustrating steps for managing project files over a network, according to an aspect of the invention.

FIG. 8 is a flow chart illustrating steps for managing project files over a network, according to an aspect of the invention. Project initiation information, preferably including at least a description of the project and of individuals performing a project task, is received at step 802. A non-limiting example of the information received at step 802 is illustrated in the project initiation form 550 of FIGS. 5B and 5C. At step 804, it is determined whether the project has been approved by the appropriate entity. At step 806, if the project is approved, the project initiation information is stored in a database such as database 106 (FIG. 1 and FIG. 3) in a manner that indicates that the project is approved.

At step 808 of FIG. 8, an individual web site, or page, is created for each of the individuals working on the project. Various informational and work product documents can be linked to the individual web sites; for example without limitation, draft files and task schedules. Access to this information is typically regulated and is available to authorized individuals over a network. At step 810, the individual sites are linked to the project site, as exemplified by member web site 612 of project site 600 (FIG. 6). A directory of files associated with the project is created at step 812, which is stored in the database at step 814. The directory of files is linked to the project site at step 816, as exemplified by directory 602 and described in the associated text in reference to FIG. 6.

At step 818 of FIG. 8, it is determined whether a draft file is completed, where completion is defined as passing inspection. This criteria which defines a completed file serves at least the following purposes: it ensures the quality and integrity of the file, as a result of the inspection by two or more persons related to the project but not the creators of the file; and it clarifies whether a task is completed by providing a binary completion status, i.e., the task is recorded as completed or not without allowing recordation of a percentage of completion. Note that step 818 is related to the inspection process of FIG. 4D.

Upon completion of a draft file, the status of the file is changed from draft to official and it is stored in the database 106 indicating its status, at step 820. Alternatively, the physical file may be copied into the secure file system and the reference to the file stored in the database 106. Finally, at step 822, the official file is linked to the project site. As exemplified in reference to FIG. 6 and FIG. 7, the official file may be indirectly linked to the project site through a link to an index, such as index 700, which is in turn linked to a directory, such as directory 602, which is presented on the project site, such as project site 600.

Figure 9:
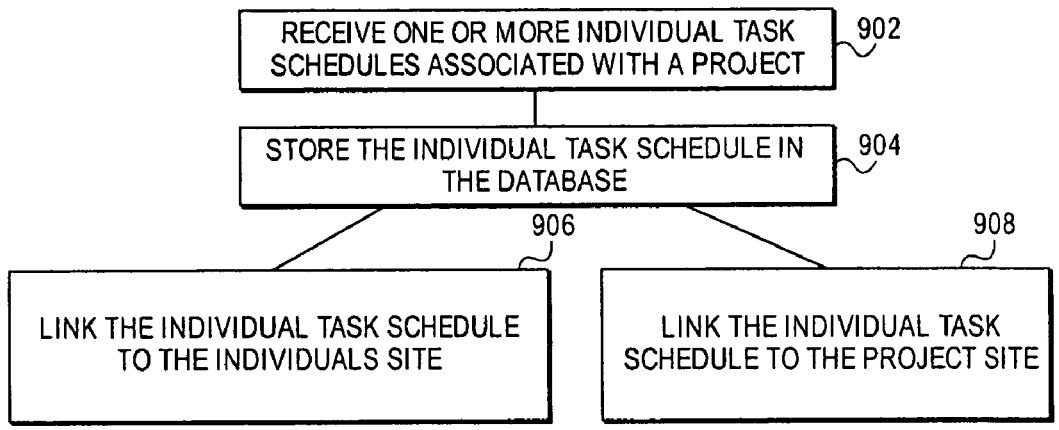
FIG. 9 illustrates an embodiment of the method of FIG. 8, wherein individual task schedules are automatically managed.

FIG. 9 illustrates an embodiment of the method of FIG. 8, wherein individual task schedules are automatically managed. At step 902, one or more task schedules are received from individuals working on the project. At step 904, the individual task schedules are stored in the database 106 (FIG. 1). Steps 906 and 908, which can complete in any order, include at step 906, automatically linking the individual task schedule to the associated individual's site which is accessible via current task list link 610 of FIG. 6, and at step 908, automatically linking the individual task schedule to the project site. The project site link is depicted as current task list link 610 and described in the associated text in reference to FIG. 6.

Management Schedule Generation

Figure 10:
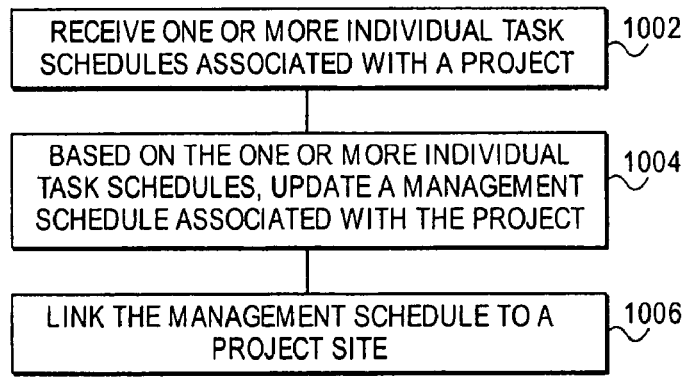
FIG. 10 illustrates another embodiment of the method of FIG. 8, wherein a summary management schedule is automatically managed.

FIG. 10 illustrates another embodiment of the method of FIG. 8, wherein a summary management schedule is automatically managed. At step 1002, one or more task schedules are received from individuals working on the project. At step 1004, a management schedule associated with the same project is updated based on the individual task schedules. An advantage of having the individual task schedules linked to the management task schedule is that the management task schedule can automatically update upon changes to the individual task schedules. At step 1006, the management task schedule is linked to the project site, as depicted as project schedule link 608 and described in the associated text in reference to FIG. 6.

Figure 11:
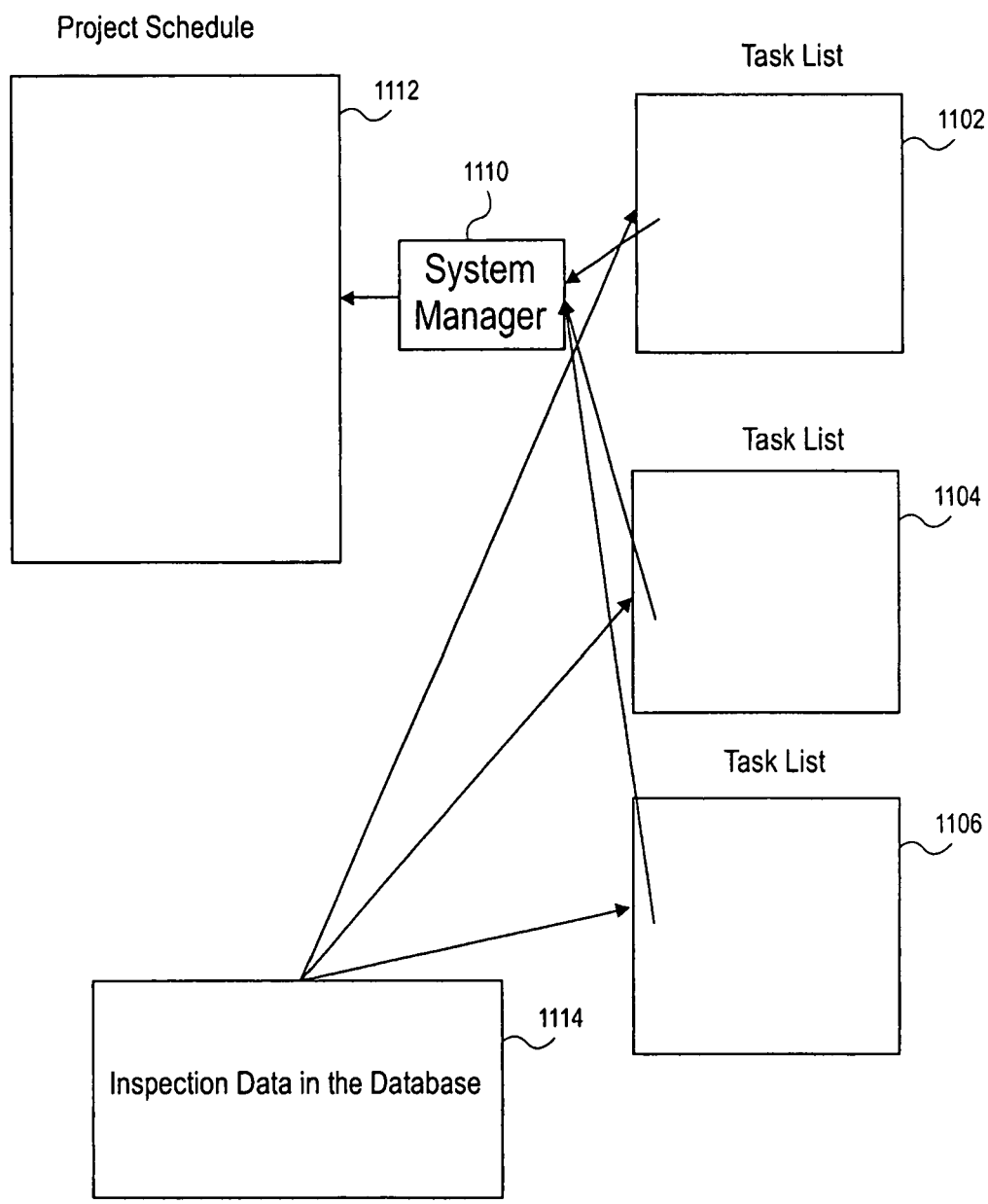
FIG. 11 is a block diagram illustrating associations utilized to manage a project schedule, according to an embodiment of the invention.

FIG. 11 is a block diagram illustrating link associations that are used to manage a project schedule by automatically updating the project schedule, according to an embodiment of the invention. In this example, multiple task lists 1102, 1104, and 1106 (see FIG. 12 for an example of an individual task list/schedule) are linked to a system manager 1110, which embodies methods for managing the project schedule as described herein. The task lists 1102-1106 are for individuals working on the project, and each task list is typically associated with a separate individual, although practice of the invention is not so limited. The project schedule 1112 (or "management schedule") is an aggregation of the individual task lists 1102-1106, and typically does not include task definitions at the level of detail as the individual task schedules. Hence, the project schedule 1112 summarizes the individual task lists 1102, 1104, and 1106. For example, FIG. 14 illustrates an example of a management schedule 1400, which is described in further detail below.

The completion of each task in the individual task schedules is linked to inspection forms, completed versions of which are stored in the database 106 (FIG. 1). For example, FIG. 13 illustrates an example of a printed or displayed inspection form 1300, which is described in further detail below. Upon a positive disposition by the inspection team that has inspection authority with respect to an individual task product, the associated task is considered completed. In one embodiment, the status of each task is binary variable, in that a task cannot be recorded as partially completed. For example, according to the project file management techniques described herein, a task is either completed or not completed, but not a percentage completed. Thus, only after the authorized task inspection team has completed the inspection of the task product and has stored a completed inspection form in the database 106, does the task product receive an "accepted," or similar, disposition. In certain embodiments, the individual task schedule is automatically updated based on the results of the completed inspection forms. In addition, once the individual task lists 1102, 1104, and 1106 are updated, the project schedule 1112 is subsequently updated based on the updated individual task lists 1102, 1104, and 1106 (for example, as described in reference to FIG. 21).

FIG. 12 illustrates an example of an individual task schedule 1200 for an individual "TM", according to an embodiment of the invention. FIG. 13 illustrates an example of a printed or displayed on-line inspection form 1300, according to an embodiment of the invention. In one embodiment, individual task schedule 1200 and inspection form 1300 provide status data that is used to automatically generate or update a management schedule 1400, as illustrated in FIG. 14. This process is facilitated by the links described in reference to FIG. 11. Upon completion of an inspection form (such as form 1300), an individual task schedule (such as task schedule 1200) is updated according to the completed inspection form, and a management schedule (such as schedule 1400) is consequently updated.

Referring to FIG. 13, document reference 1302 is mapped to the same task in the related individual task schedule. Note that the document reference 1302 does not refer to documents only, but more generally to products of individual tasks. Furthermore, a result reference 1304 is mapped to the "Actual End" column 1208 (FIG. 12) of the related individual task schedule, such as schedule 1200 of FIG. 12. The date that is automatically entered into the "Actual End" column 1208 is automatically determined based on the latest acceptance completion date for all of the required inspection forms (i.e., "Accept" in result reference 1304) for a particular task. The method includes logic for determining when all of the inspections are completed, and whether all of the completed inspection forms have indicated "Accept" in result reference 1304, in order to determine the "Actual End" date for column 1208. Alternatively, if the inspection result is conditional acceptance, the chief inspector must signal that all of the corrections are incorporated into the product as shown at step 490 in FIG. 4D.

Referring to FIG. 12 and FIG. 14, certain cells of the task schedule 1200 are mapped to the management schedule 1400. For example, cell 1202 of task schedule 1200, which is associated with the earliest "Planned Start" of a particular task, is mapped to cell 1402 of management schedule 1400. Similarly, cell 1204, which is associated with the latest "Planned End" of a particular task, is mapped to cell 1404. Thus, if data in cell 1202 or 1204 is added, revised, or deleted, cell 1402 or 1404 is automatically revised accordingly. Cells 1206 and 1406 are similarly related to each other as are the cells previously discussed. There are numerous other task schedule cells similar to cell 1202 that map to associated management schedule cells for a particular individual, in this case, "TM," thus providing automatic updates of the high-level management schedule 1400 according to an aspect of the invention.

Updating a Project Schedule

Figure 15:
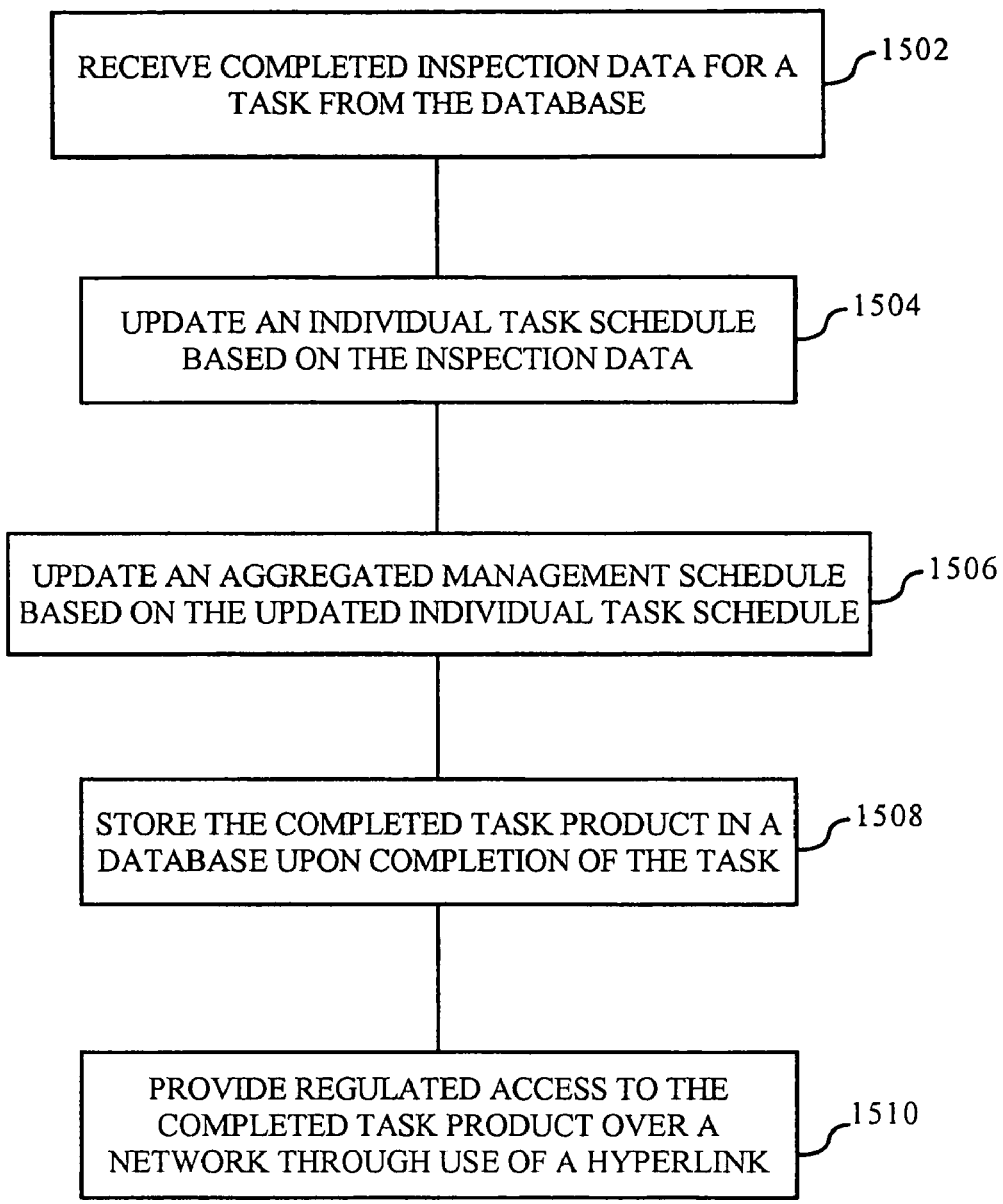
FIG. 15 is a flow chart illustrating steps for generating and updating a schedule for a project, according to an embodiment of the invention.

FIG. 15 is a flow chart illustrating steps for generating and/or updating a schedule for a project, according to an embodiment of the invention. At step 1502, a completed inspection form including the inspection data is received over a network from the database 106 (FIG. 1). A completed inspection form corresponds to the result of the inspection team meeting, held to inspect a task product, whereby the completed inspection form includes information based on the inspection. Refer back to FIG. 13 for an example of an inspection form 1300.

At step 1504, an individual's task schedule (i.e., the individual responsible for completing the task), is automatically updated based on the received inspection forms. According to a policy, a project task is not completed unless the inspection result report so indicates, or unless the chief inspector certifies the corrections to the product in the case where the inspection result indicates a conditional acceptance, as shown in FIG. 4D. At step 1506, a management schedule, as exemplified in FIG. 14 and which is an aggregation of all of the individual task schedules associated with the project, is automatically updated based on the updated individual task schedules from step 1504.

In one embodiment, the individual and management schedules are governed by a policy specifying that a project task cannot be partially completed and the automatic updating of the schedules is performed according to this policy.

At step 1508, the completed project task product is stored in the database 106 (FIG. 1 and FIG. 3) and access to the product is regulated according to a document control policy. In one embodiment, the completed task products are accessible via a packet-based network, such as the Internet or an enterprise network, via appropriate links such as hyperlinks.

Task Hierarchy

According to an embodiment of the invention, a task hierarchy is used to manage a development project. A task hierarchy represents relationships among tasks that are related to completion of a development project. In one embodiment, the relationships represent dependencies among task in the hierarchy, such that completion of a parent task depends on completion of one or more lower-level child tasks. Therefore, the dependencies specify how changes to a member task in the hierarchy affects other member tasks in the hierarchy, if at all. The use of a task hierarchy facilitates the automated update of project task schedules in response to changes to lower level task schedules.

Figure 16:
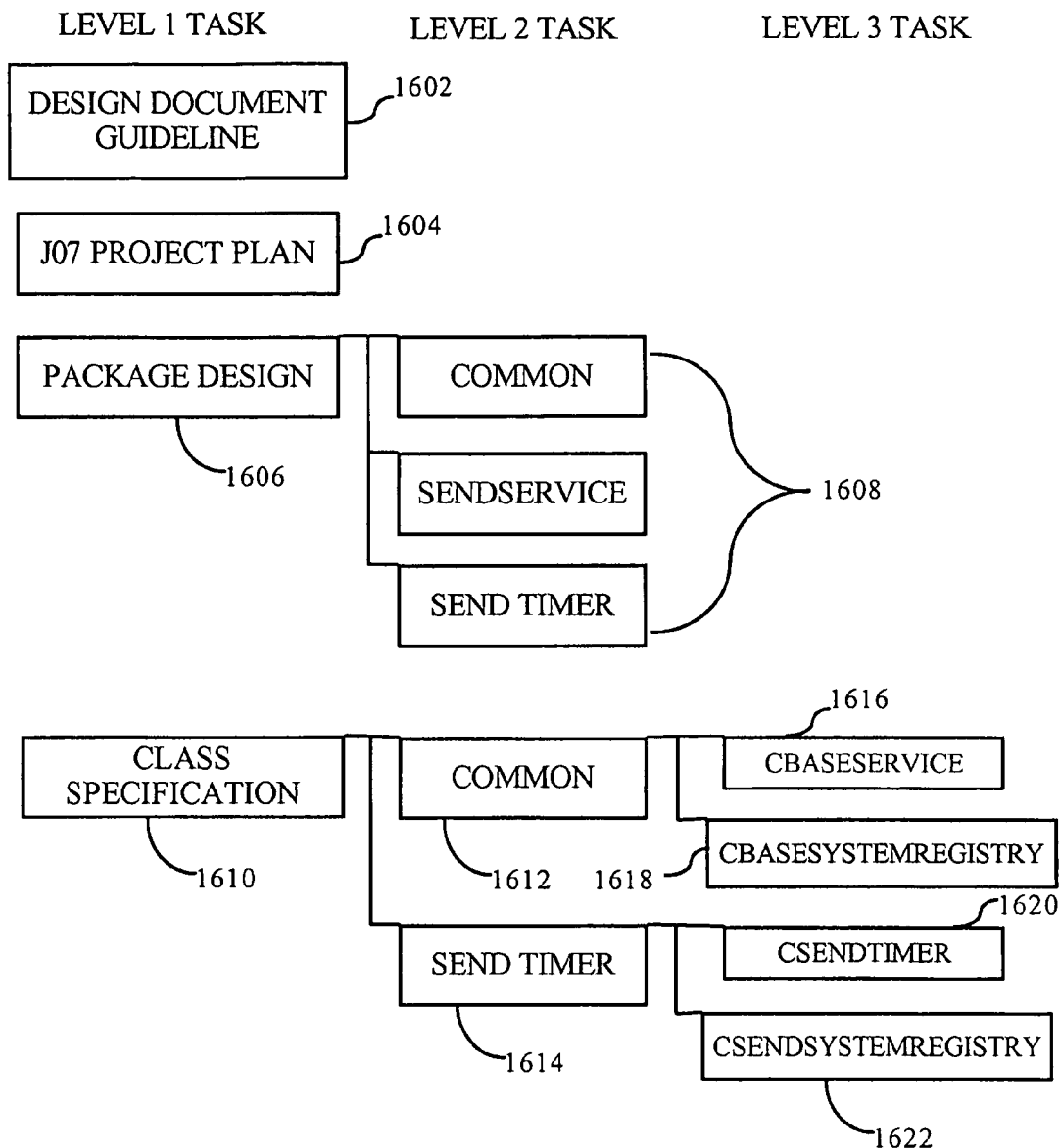
FIG. 16 depicts a task hierarchy that may be used to manage a development project, according to an embodiment of the invention.

FIG. 16 depicts a task hierarchy that may be used to manage a development project in accordance with an embodiment of the invention. The task hierarchy depicted in FIG. 16 includes three levels of tasks. These include level 1 tasks, level 2 tasks that are required to be completed to complete specific level 1 tasks, and level 3 tasks that are required to be completed to complete specific level 2 tasks. The number of levels of the hierarchy of tasks is not limited to three levels, as depicted in FIG. 16, but may comprise as many levels as necessary to define the major tasks and associated sub-tasks (or detail tasks) of a development project.

Note that a task at any particular level is not required to have associated sub-tasks. For example, task 1602 (Design Document Guideline) and task 1604 (J07 Project Plan), which are defined as level 1 tasks, are not defined to have any associated lower level tasks. In addition, the level 2 tasks collectively identified as tasks 1608 (Common, Send Service, and Send Timer), are not defined to have any associated level 3 tasks that require completion to complete the tasks 1608. As depicted in FIG. 16, tasks 1602, 1604, 1606, and 1610 are level 1 tasks (sometimes referred to as major tasks). The three tasks collectively identified as tasks 1608 are level 2 tasks which require completion in order to complete the associated level 1 task, that is, task 1606 (Package Design). In addition, task 1610 (Class Specification) is a level 1 task, which has two associated level 2 tasks, 1612 (Common) and 1614 (Send Timer). Furthermore, task 1612 has two associated level 3 tasks, 1616 (CBaseService) and 1618 (CBaseSystemRegistry), and task 1614 has two associated level 3 tasks, 1620 (CSendTimer) and 1622 (CSendSystemRegistry). The tasks depicted in FIG. 16 are for purposes of example only, to illustrate a hierarchy of tasks related to completion of a development project. Thus, practice of the invention is not limited to the tasks depicted.

TASK DATA STRUCTURE

Figure 17:
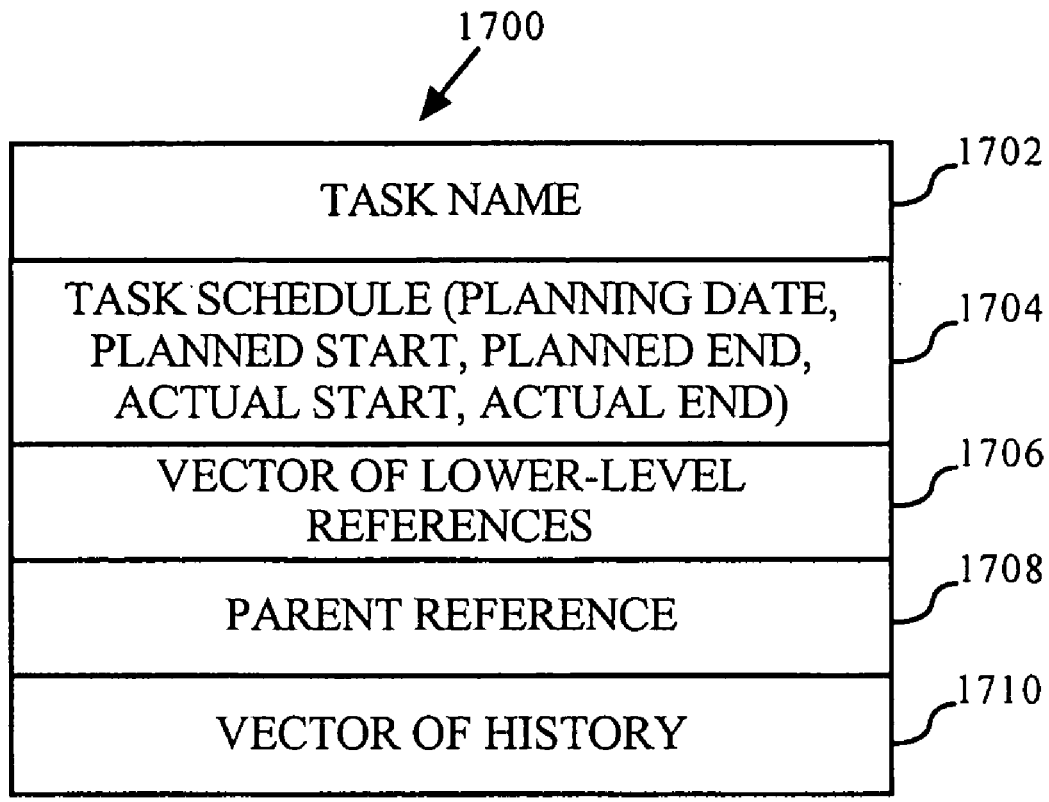
FIG. 17 is diagram graphically illustrating a task data structure, according to an embodiment of the invention.

FIG. 17 is diagram graphically illustrating a task data structure 1700, according to an embodiment of the invention. The data associated with each task is stored in some form of computer memory, for example without limitation, memory associated with database 106. Task data structure 1700 may be implemented using object-oriented programming techniques, whereby task data structure 1700 is defined as an object class, and each task is instantiated as an object with its corresponding data being states of the object. Practice or implementation of the invention is not limited to the use of object-oriented programming techniques, for other computer software programming techniques that are known in the art can be used to implement the techniques described herein.

FIG. 17 depicts task data structure 1700, implemented as an object class, wherein attributes include, but are not limited to, a task name 1702, a task schedule 1704, a vector of lower-level references 1706, a parent reference 1708, and a vector of history 1710. The task name 1702 is simply the name assigned to the task, used to identify the task object. An example of a task name 1702 is "CSendTimer" (reference 1620 of FIG. 16).

The task schedule 1704 comprises dates related to performance of the task. In one embodiment, the dates include a "planning date", a "planned start" date, a "planned end" date, an "actual start" date, and an "actual end" date. The planning date indicates the latest date on which any of the other task schedule dates were entered or updated. In one embodiment, the current date (i.e., the date on which an entry or change to a schedule is made) will automatically be retrieved from the system clock and entered into the appropriate planning date field. The substance of the other task schedule dates, that is, the planned and actual dates, is self-explanatory. Manipulation of these fields can be performed through use of an on-line task scheduler form, illustrated in FIG. 20 and described in reference thereto.

Implementation of the task schedule 1704 can take multiple forms and remain within the scope of the invention. For example without limitation, the task schedule 1704 can be implemented using vector, map, list, or struct classes of programming objects.

The vector of lower-level references 1706 is a programming tool used to provide references from a particular task to lower level tasks in the hierarchical structure of tasks. For example, a level 2 task, such as task 1612 (FIG. 16) has a vector of references that point to its associated lower-level, or child, tasks 1616 (FIG. 16) and 1618 (FIG. 16). The term "vector" refers to a standard template library associated with the C++programming language, which provides an implementation of a 1-dimensional, random access sequence of items. Practice of the invention is not limited to the use of vectors in providing references from one task object to other task objects, for other referencing techniques can be implemented and still fall within the scope of the present invention.

The parent reference 1708 is used to provide a reference from a particular task to an associated higher level, or parent, task in the hierarchical structure of tasks. For example, a level 2 task, such as task 1612 (FIG. 16) has a parent reference to its associated parent task 1610. The parent reference 1708 is not limited to any particular form, and may take the form, for example, of a simple pointer from a task to its parent task. Use of the vector of references 1706 and the parent reference 1708 is described in more detail in reference to FIG. 18.

The vector of history 1710 provides a reference from a particular task to historical data related to the particular task. For example, the vector of history 1710 can be implemented as a simple pointer to a location of data representing historical dates associated with the particular task. Thus, a task schedule can include historical (or "old," or "obsolete") dates for any of the date fields, such as planned start, planned end, actual start, and actual end, along with current dates, such as referred to collectively as element 1210 of FIG. 12. This feature provides information on the incremental magnitude of a schedule slip or advance to a viewer of a task schedule.

Figure 18:
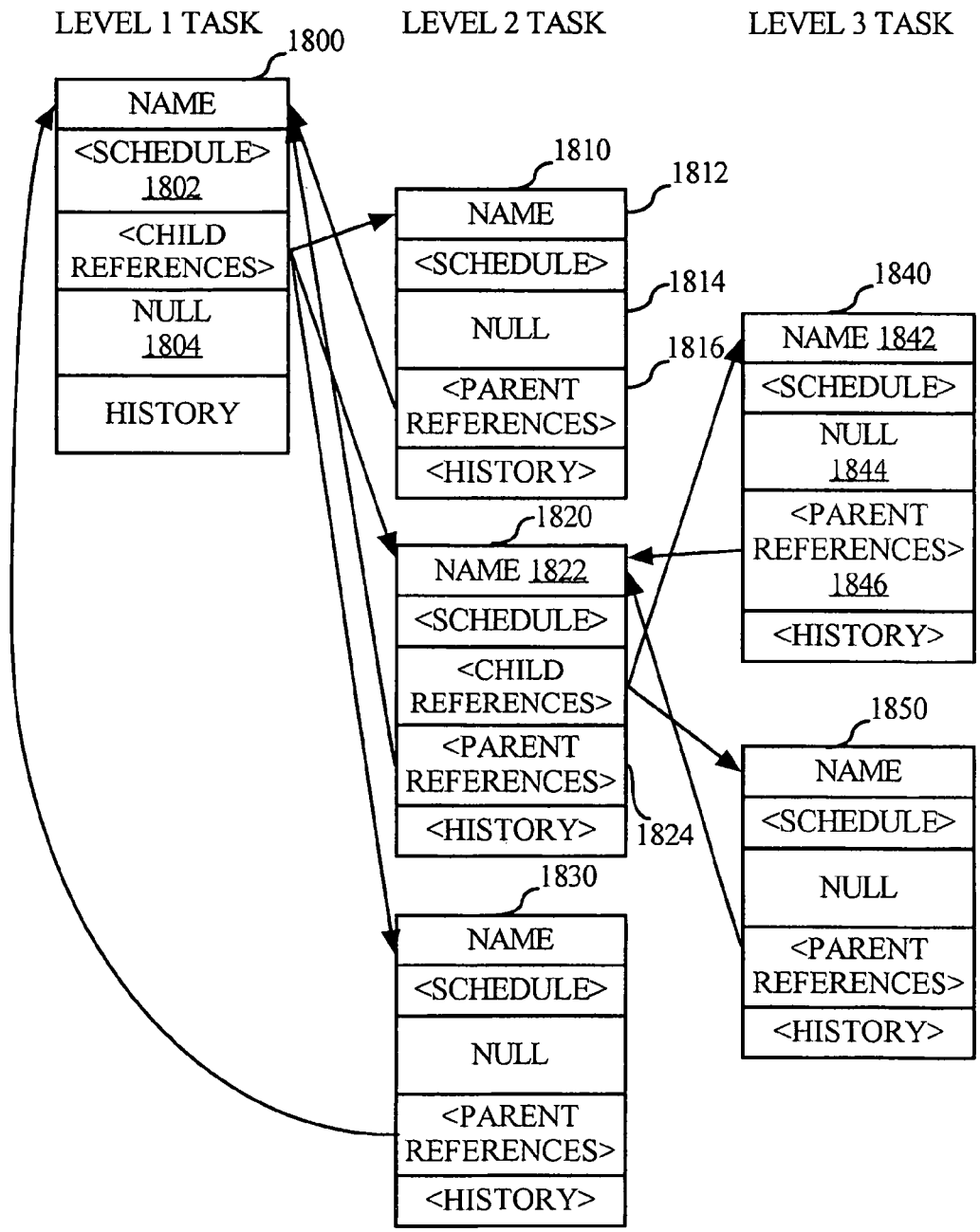
FIG. 18 is a diagram illustrating a hierarchical relationship of task data structures, according to an embodiment of the invention.

FIG. 18 is a diagram illustrating a hierarchical relationship of task data structures, visually depicting relations between task objects, according to an embodiment of the invention. FIG. 18 depicts Level 1 task object 1800; Level 2 task objects 1810, 1820, and 1830; and Level 3 task objects 1840 and 1850. Each of the objects is depicted as having the data structure illustrated in FIG. 17, including name, schedule, child references, parent references, and history. Some data fields have null values to represent fields with no relevant data, for example, parent reference field 1804 of task object 1800 (indicating no parents, and thus, no parent references), child references fields 1814 of task object 1810 (indicating no children, and thus, no child references), and child references fields 1844 of task object 1840 (indicating no children, and thus, no child references).

FIG. 18 illustrates the relationships and the interactions among multiple task objects for a development project, and the following example is used to assist in illustrating the object interactions. For example, if an update is made to the schedule data of task object 1840, then according to the techniques for automatic task schedule updating described herein, parent references 1846 of task object 1840 are accessed to identify the parent task of object 1840. Note that the parent references 1846 (generally, parent reference 1708 of FIG. 17) may be implemented as a vector, therefore, the task data structure 1700 allows a hierarchy of tasks in which a task may have more than one parent task. In the example, task object 1840 has a single parent task referred to in the parent references 1846, which is to task object 1820 which depends on the task associated with task object 1840 for completion. Once a parent task is identified, it is accessed to identify its child references. For example, the vector of lower-level references for task object 1820 points to the two children tasks of task object 1820, which are task object 1840 and task object 1850. Once the child tasks are identified, the schedule data for the child task objects is accessed and analyzed to determine whether any of the schedule dates of parent object 1820 requires updating as a result of the change to the schedule data of child object 1840. For example, if the actual end date of the task represented by task object 1840 is updated to be later than the actual end date represented by sibling task object 1850, then the parent task object 1820 requires an update to reflect the current actual end date of the parent task, and the schedule data of task object 1820 is updated accordingly.

Figure 21:
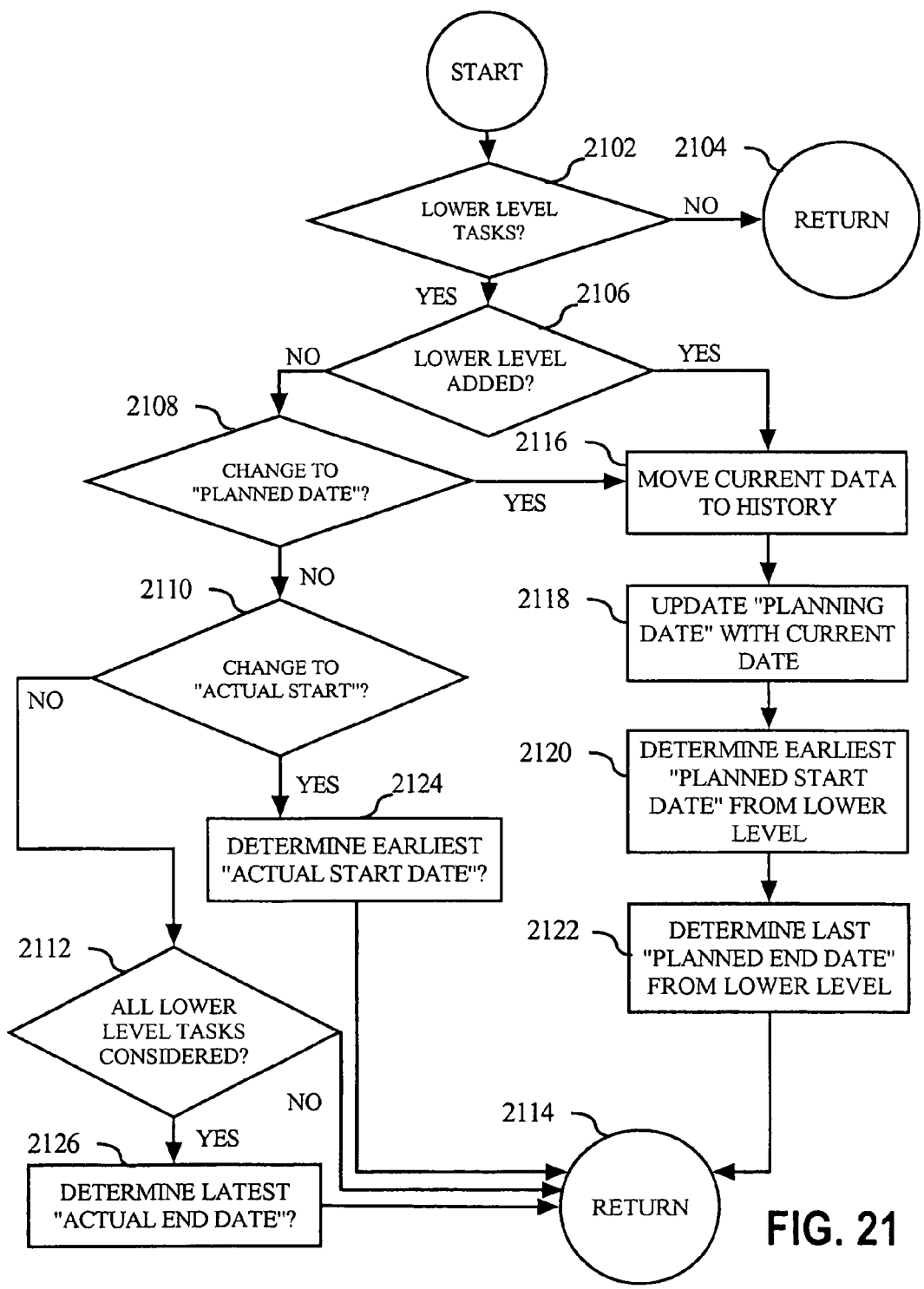
FIG. 21 is a flowchart illustrating a method for updating a task schedule data structure, according to an embodiment of the invention.

Furthermore, parent references of parent object 1820 are accessed to identify any parents of task object 1820, so that a determination can be made as to whether the schedule data of the parent task object at the next higher level requires updating as a result of the change to the schedule data of task object 1840 and the resultant change to object 1820. For example, the parent references of object 1820 points to task object 1800. Task object 1800 is accessed to identify its child references. For example, the vector of lower-level references for task object 1800 points to the three children tasks of task object 1800, which are task object 1810, task object 1820, and task object 1830. Once the child tasks are identified, the schedule data for the child task objects (i.e., 1810, 1820, and 1830) is accessed and analyzed to determine whether any of the schedule dates of their parent object 1800 requires updating as a result of the change to the schedule data of grandchild object 1840. This process is performed along all necessary levels of the task hierarchy until the top level (Level 1) is reached and any required updates to task schedules at the top level are determined. According to an embodiment of the invention, a method for updating a task schedule data structure, which illustrates in more detail the analysis of task schedule dates, is illustrated in FIG. 21.

Task Management Tools

FIG. 19 illustrates an example of an on-line task assignment form 1900, implemented in an embodiment of the invention to assign specific tasks to specific project participants. Task assignment form 1900 includes a "Tasks" column 1902 and an "Assigned to" column 1904. Columns 1902 and 1904 include data entry fields for entering a task name, such as "Common" for task 1612 (FIG. 16), in the fields of column 1902, and a project participant's name (or other identifying data, for example, employee number) in the fields of column 1904.

The task assignment form 1900 further includes pull-down menus, such as "Major Task List" menu 1906 and "Task Level" menu 1908. In certain instances, particular tasks may be required of a development project, due, for example, to company policy or the nature of the development project. In such instances, the menu 1906 can be programmed to include such required tasks. Consequently, the pull-down menu 1906 can be utilized by a project participant, for example, an engineering manager or project lead, when assigning project tasks through the on-line task assignment form 1900. Furthermore, as major, or high-level, tasks are identified for the project, they can be added to the menu 1906 by someone such as an administrator or a project manager. In one implementation, the menu 1906 includes only major tasks, defined as level 1 tasks, but the invention is not so limited. The "Task level" pull-down menu 1908 can be utilized by a managing project participant to assist in assigning levels (e.g., levels 1 through 3 of FIG. 16) to the tasks that are being entered into the system and assigned through on-line task assignment form 1900.

FIG. 20 illustrates an example of an on-line individual task scheduler form 2000, implemented in an embodiment of the invention to enter task schedule and hierarchy information. Task scheduler form 2000 is an interface used to view tasks that are already entered into the system, as well as to enter tasks and associated dates. Task scheduler form 2000 includes a "Tasks" column 2002, which includes data entry fields for entering a task name, such as "Common" for task 1612 (FIG. 16), in the fields of column 2002. According to one embodiment, tasks that are entered into a database, such as database 106 (FIG. 1), are presented in task scheduler form 2000. In addition, the tasks that are presented in task scheduler form 2000 are presented in a manner representing their position in the task hierarchy. For example, column 2004 can display a "+", which can be clicked with a computer mouse or other pointing device, which causes display of associated lower-level tasks, preferably indented from their parent, or dependent, task. For example, clicking on the "+" in column 2002 adjacent to the "Package Design" task 1606 (FIG. 16), would cause a display of its related lower level tasks, that is, the "Common", "SendService", and "Send Timer" tasks collectively identified as tasks 1608 (FIG. 16). Furthermore, new lower-level tasks can be entered directly at this particular stage of the task hierarchy through the on-line individual task scheduler form 2000, and will, therefore, automatically be associated with the parent task (e.g., Package Design) currently being displayed. According to one embodiment, the association is a dependency, whereby a task depends on completion of one or more other tasks for its completion. The level 2 tasks are presented as to visually portray their position in the hierarchy, in relation to other tasks in the task hierarchy, such as through indentation.

Task scheduler form 2000 further includes pull-down menus, that is, "Major Task List" menu 2006 and "Task Level" menu 2008. These pull-down menus are used similarly to menus 1906 and 1908 of FIG. 19, to view and/or enter major tasks (menu 2006) and to specify hierarchical task levels (menu 2008).

Task scheduler form 2000 further includes several columns related to development project task performance and completion, which include data entry fields for entering and viewing the respective schedule dates for the tasks. The date columns include "Planned date" column 2010 (equivalent to "Identified Date" of FIG. 12 and "Planning Date" of FIG. 17), "Planned Start" column 2012, "Planned End" column 2014, "Actual Start" column 2016, and "Actual End" column 2018, which correspond to the task schedule 1704 (FIG. 17) data elements of the task objects.

Use of on-line task scheduler form 2000 operates upon the task objects that define the tasks. For any task, entering data in any of the columns 2002 and 2010-2018 creates or changes the state of the task object that defines the particular task. For example, entering or changing data in column 2002 affects the state of the task name 1702 attribute (FIG. 17), entering or changing data in columns 2010-2018 affects the state of the task schedule 1704 attribute (FIG. 17) and possibly the vector of history 1710 attribute (FIG. 17), and use of menu 2008 in relation to a particular task affects the state of the vector of lower level references 1706 (FIG. 17) and parent reference 1708 attributes (FIG. 17).

Method of Updating Task Schedule Data

FIG. 21 is a flowchart illustrating a process for updating a task schedule data structure, according to an embodiment of the invention. The process illustrated is triggered, for example, by an event such as entering or changing data at any level of the task hierarchy for a particular development project, through on-line task scheduler form 2000 or by completion of a task. This triggering event triggers the update process (FIG. 21) for the parent task, using the parent reference 1708 (FIG. 17). The process illustrated is operable at all levels of the task hierarchy, but is configured (as illustrated) such that from the standpoint of any given task, the process of updating the task "looks down" the task hierarchy to determine and implement an update to the given task.

Thus, for any given task, upon an action that triggers the update process for a project task schedule (such as management schedule 1400 of FIG. 14), at step 2102 it is determined whether the given task has any lower-level, or child, tasks (in relation to the task hierarchy described above). If no lower level tasks exist, the method returns with no action, at step 2104. For example, if a level 2 task with no associated level 3 tasks is being processed, the inquiry at step 2102 would be negative and the processing would return to the calling process. In one embodiment, the process returns to the triggering task, which was changed, for example, through the use of the task scheduler form 2000 of FIG. 20.

If the response at step 2102 is positive, that is, the given task does have lower-level tasks in the defined task hierarchy, then at step 2106 it is determined whether the triggering action was an addition of a lower-level task. If the response to step 2106 is negative, then at step 2108 it is determined whether the triggering action was a change to a "planned" date (i.e., planned start or planned end) of the task schedule 1704 data (FIG. 17) for a lower-level task. If the response to step 2108 is negative, then at step 2110 it is determined whether the actual start date has been updated for the given task. If the response to step 2110 is negative, then at step 2112 it is determined whether all of the lower-level tasks have been considered. If the response to step 2112 is negative, then the method returns to start at step 2114.

If the response to step 2112 is positive, then at step 2126 the latest actual end date from the lower-level tasks is retrieved and stored in the data structure of the given task. For example, the vector of lower-level references 1706 (FIG. 17) of the given task are accessed to identify all of the children of the given task. According to step 2126, the task schedule 1704 (FIG. 17) of each of the children tasks (referred to as lower-level tasks in block 2126) is accessed to determine the latest actual end date among them, which is then referenced within the task schedule 1704 of the given task. Hence, the change made to the task schedule 1704 of a triggering task is "rolled-up" into the task schedule 1704 of the given task, if necessary. If the change to the triggering task does not result in it having the latest actual end date among its sibling tasks (i.e., the tasks at the same hierarchical level with the same parent task), then no change to the given task schedule is required. Once step 2126 is completed, at step 2114 the process returns to the calling process. In one embodiment, step 2114 returns to the calling process of the child task manipulated in the task scheduler form 2000 (FIG. 20).

Returning to step 2110, if the response to step 2110 is positive (i.e., the actual start date of a lower-level task has been updated, which is the triggering event), then at step 2124 the earliest actual start date from the lower-level tasks of the given task are retrieved and stored in the data structure of the given task. According to step 2124, the task schedule 1704 (FIG. 17) of each of the lower-level tasks is accessed to determine the earliest actual start date among them, which is then referenced within the task schedule 1704 of the given task. Hence, the change made to the task schedule 1704 of a triggering child task is rolled-up into the task schedule 1704 of the given task, if necessary. If the change to the triggering task does not result in it having the earliest actual start date, then no change to the given task schedule is required. Once step 2124 is completed, at step 2114, the process returns to the calling process.

Returning to step 2108, if the response to step 2108 is positive (i.e., the planned start or end date of a lower-level task has been updated, which is the triggering event), then the process moves to step 2116, whereby the current data is moved to the vector of history 1710 (FIG. 17) for the given task.

Returning to step 2106, if the response at step 2106 is positive (i.e., a lower-level task has been added and associated with the given task), then at step 2116 the current data is moved to the vector of history 1710 (FIG. 17) for the given task. At step 2118, the current date is used as the planning date in task schedule 1704 (FIG. 17) for the given task. In addition, if it is determined that the revision to the triggering task requires revisions to another related parent task of the triggering task, then the current date is also used as the planning date in the other parent's task schedule 1704. In one embodiment, the current data is retrieved from the system clock of the computer platform, such as workstation 102 (FIG. 1) or computer system 200 (FIG. 2), on which the project management system executes.

At step 2120, the earliest planned start date from the lower-level tasks (which includes the triggering task) is retrieved and stored in the data structure of the given task. According to step 2120, the task schedule 1704 (FIG. 17) of each of the lower-level tasks is accessed to determine the earliest planned start date among them, which is then referenced within the task schedule 1704 of the given task. Hence, the change made to the task schedule 1704 of the triggering child task is rolled-up into the task schedule 1704 of the given task, if necessary. If the change to the triggering task is not to the planned start date, then the logic simply moves to step 2122. If the change to the triggering task does not result in it having the earliest planned start date, then no consequent change to the given task schedule is required.

Alternately, the logic of FIG. 21 could contain a decision block prior to step 2120, wherein it is determined whether the change to the planned date is a change to the planned start date or to the planned end date, and then the logic could continue to either step 2120 or step 2122 depending on the result from the decision block.

Returning to the method as depicted in FIG. 21, at step 2122, the latest planned end date from the lower-level tasks is retrieved and stored in the data structure of the given task, similarly as described above with respect to step 2120. Again, the change made to the task schedule 1704 of the triggering task is rolled-up into the task schedule 1704 of the given task, if necessary. If the change to the triggering child task does not result in it having the latest planned end date, then no change to the given task schedule is required. Once step 2122 is completed, at step 2114 the process returns to the start.

Throughout the process depicted in FIG. 21, if any of the schedule entries of the given task change, the given task will trigger the same process of FIG. 21 in its parent task through the reference to the parent task 1708 (FIG. 17). Because the process of FIG. 21 is triggered by the child task, step 2102 is the safety check to prevent unrelated processes to trigger the process flow of FIG. 21.

Software Design Specification

Figure 22:
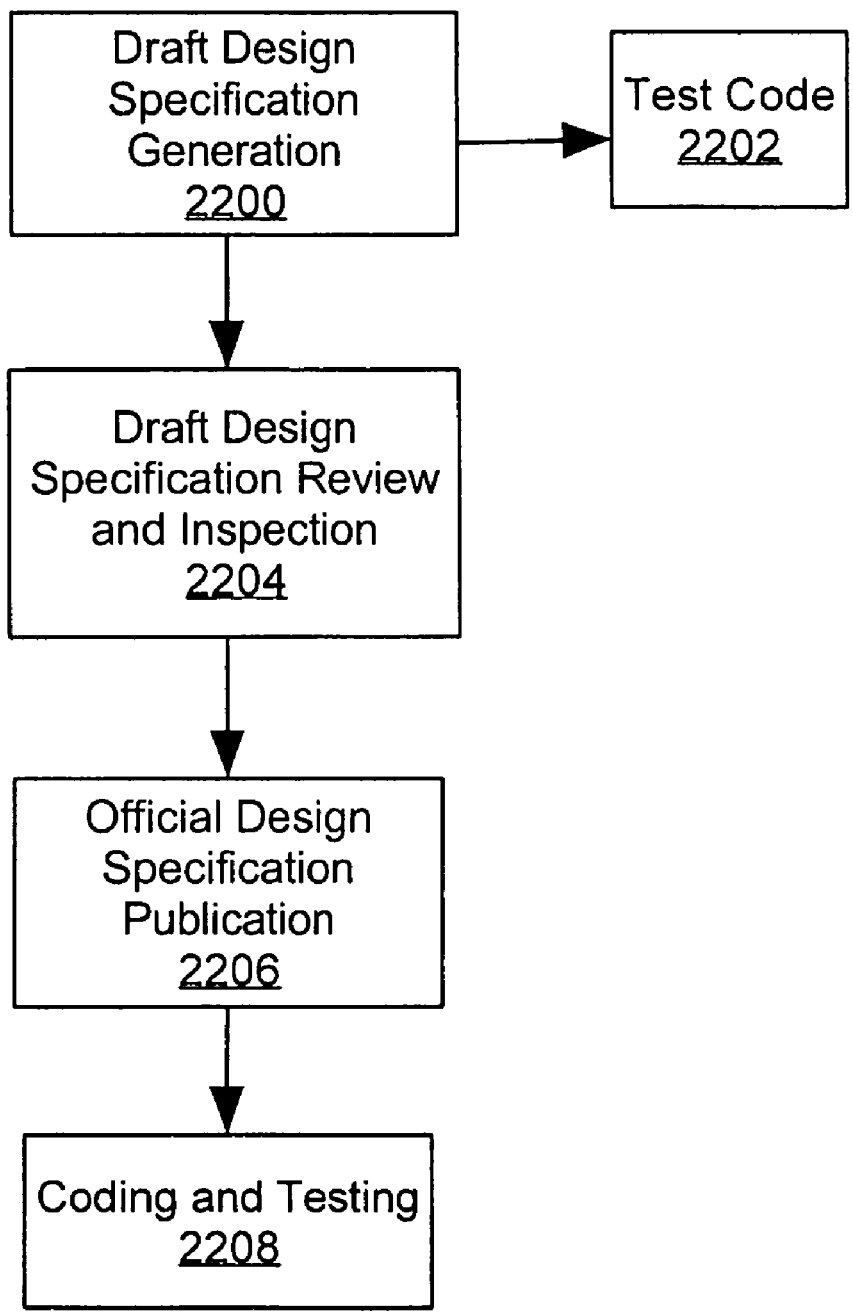
FIG. 22 is a flowchart that illustrates a software design and coding process overview.

FIG. 22 is a flowchart that illustrates a software design and coding process overview. At block 2200, a designer drafts a design specification document. Although a design specification document may take many forms, in one embodiment, a design specification document includes a class specification section.

Returning to FIG. 22, at block 2202, the software code associated with the corresponding design specification document is tested to verify the logic therein. Often, block 2200 is performed concurrently or iteratively with block 2202. At block 2204, the draft design specification document that is generated at block 2200 is reviewed and inspected. The review and inspection process of block 2204 may be one integrated process or multiple processes.

At block 2206, after passing the inspection of block 2204, the design specification document is registered, internal to the organization, as an official document. As an official document, the design specification is controlled through a document control system. Further, the design specification document may be a part of a larger software specification document. Finally, at block 2208, at the appropriate time a software coder implements the design specified in the design specification. To that end, the coder typically codes and tests the software.

Design Specification Verification Tool

Figure 23:
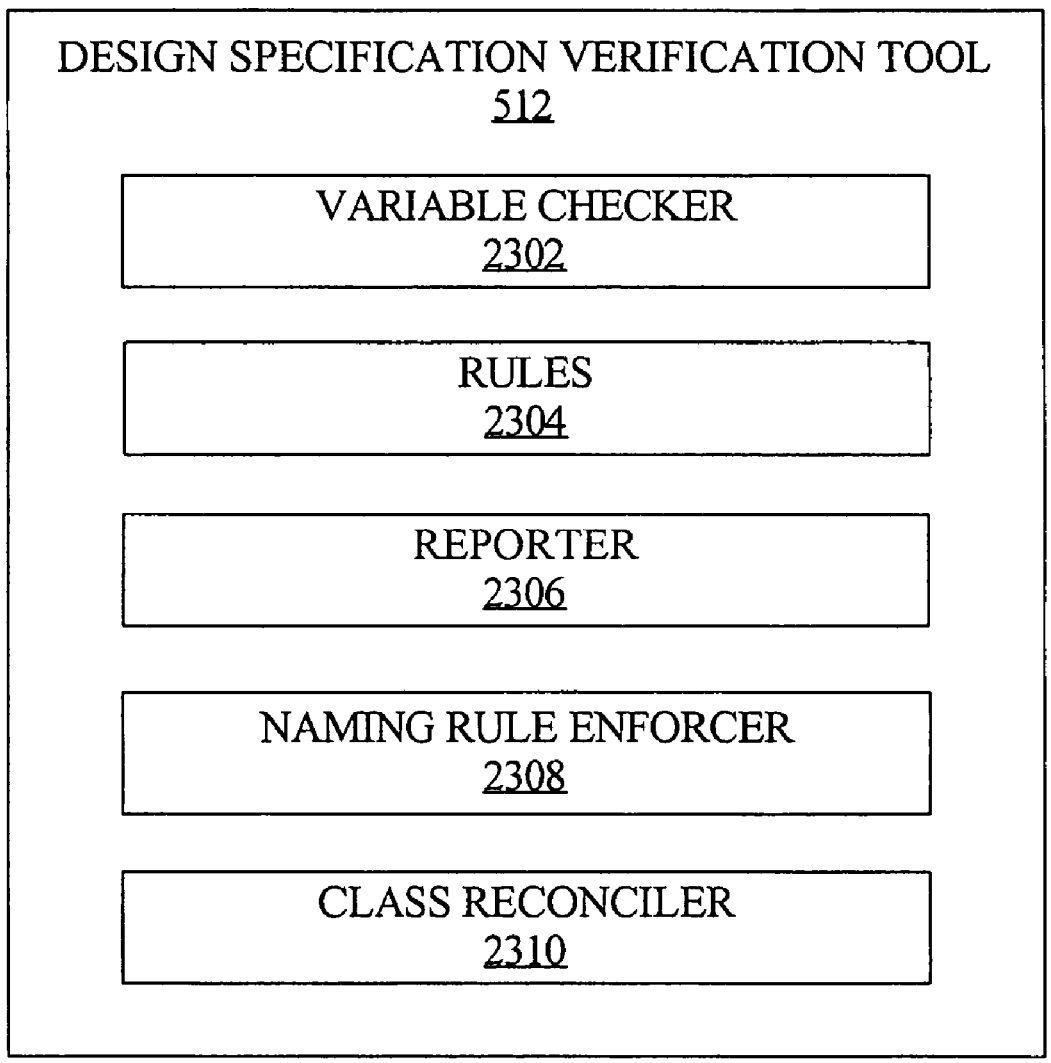
FIG. 23 is a block diagram that illustrates functional components of a design specification validation tool, according to an embodiment of the invention.

FIG. 23 is a block diagram that illustrates functional components of a design specification verification tool ("verification tool"), such as verification tool 512 of FIG. 5A, according to an embodiment of the invention. Verification tool 512 comprises a variable checker 2302, rules 2304, reporter 2306 and optionally, a naming rule enforcer 2308 and a class reconciler 2310.

Variable checker 2302 is configured to automatically check the class attribute names in the Function Definitions section of a class specification against the class attribute names described in the Class Attribute section of the class specification. Referring to Appendix A for an example, variable checker 2302 finds class attribute names listed in the Function Definitions section A007 of the class specification A001 and compares them with the class attribute names described in the Class Attributes section A006 of the same class specification A001.

Variable checker 2302 is further configured to automatically check the function parameter names in the Function Definitions section of a class specification against the function parameter names in the Function List section of the same class specification. Referring to Appendix A for an example, variable checker 2302 finds function parameter names included in the Function Definitions section A007 section of the class specification A001 and compares the parameter names with the function parameter names declared in the Function List A004 of the same class specification A001.

In one embodiment, variable checker 2302 is further configured to locate local variable names referenced in the Function Definitions section. Local variables may be specified in algorithms within the function definitions. If local variable names are specified in a function definition, then these local variables should be named according to organizational rules. However, local variable names are not necessarily used in other sections of the class specification, so once located in the Function Definitions section, there is no other section with which to check the local variable name. Hence, if a local variable name is found only once in a given algorithm in a function definition, then there exists the possibility that the variable is incorrectly spelled somewhere else within the given algorithm. Although not conclusive, a single occurrence of a local variable name within an algorithm of a function definition can mean that there might be an error in the class specification, so single occurrences of local variable names are reported. Therefore, a user is alerted to the possibility of an error and can research the issue further.

With respect to checks relating to class attribute names and function parameter names, verification tool 512 reports a discrepancy if one is found. For example, reporter 2306 of verification tool 512 can report any discrepancies with respect to the design specification being verified by saving data representing the problem in local or shared memory, by displaying an indication of the problem, by printing an indication of the problem, or by any combination of these. Furthermore, in the embodiment in which local variable occurrences are verified, reporter 2306 can report single occurrences of local variables in any of the same manners. In one embodiment, the information used in reporting discrepancies includes the number of times that a given attribute or parameter is used in a respective function.

Rules 2304 includes documentation rules with respect to organizational naming conventions regarding, for example, class attribute names, function parameter names, structure names and local variable names. For example, in one embodiment, attribute names are prefixed with "m_", function parameters are prefixed with either "in_", "out_", or "inOut_", and local variable names are prefixed with "loc_". Rules 2304 are not limited to the number or type of rules described above, for rules 2304 can be implemented to include any number of organizational constraints relating to design specification generation, that is, naming rules or otherwise. Other conventions embodied in rules 2304 may be used to verify other elements of a design specification.

Rules 2304 are used by the variable checker 2302 to check the design specification document or file. The naming conventions embodied in rules 2304 are used to locate applicable elements, for example, class attributes names, function parameter names and local variable names, within the different sections of the class specification so that the elements can be compared to occurrences in other sections of the class specification. For example, once a type of element of interest is located in the Function List or Class Attribute sections based on rules 2304, for example, via naming prefixes associated with respective element types, the Function Definitions section is searched for a corresponding element. This search can entail a complete element name or part of an element name found in the respective section, rather than just the applicable prefix. Thus, misspelled occurrences of corresponding elements are likely to be found more readily.

Implementations of these teachings may vary. For example, elements may first be located in the Function Definition section and then searched for and verified with corresponding elements in the Function List, Defined Type List and Class Attributes sections.

Optional naming rule enforcer 2308 of verification tool 512 is a module that can enforce naming rules on occurrences of elements within the class specification A001 of a design specification. For example, when discrepancies are discovered within the various sections of the class specification, naming rule enforcer 2308 is configured to reconcile the discrepancies by re-naming the misspelled elements according to the rules. Rules 2304 is referenced by naming rule enforcer 2308 in the course of enforcing the naming conventions. Furthermore, verification tool 512 can be configured with other similarly functioning rule enforcers in addition to or instead of naming rule enforcer 2308, whereby any number of other rules or organizational conventions can be enforced upon the design specification document.

Optional class reconciler 2310 of verification tool 512 is a module that can reconcile usage of elements, e.g., class attribute names and function parameter names, among different classes of the software application. After a first class (represented by a class specification of a design specification) is processed by verification tool 512, subsequent verification of other class specifications can use the knowledge obtained in verifying and reconciling the first class. Thus, consistency among different classes represented by different corresponding class specifications is ensured with respect to referenced class attributes and function parameters. If the functionality of verification tool 512 is expanded to include verification of elements other than those discussed herein, which is specifically contemplated, then the functionality of class reconciler 2310 can expanded accordingly in order to reconcile the other elements among the various class specifications.

In one embodiment, class reconciler 2310 is configured to reconcile elements among a parent class and any associated derived classes. Hence, verification of a derived class is benefited by employing knowledge gained in verifying the parent class.

Class Specification

Appendix A is an example of a class specification A001 with all the components required by the corresponding document rule(s): Title A002, Base Class A003, Function List A004, Defined Type List A005, Class Attributes A006, and Function Definitions A007. The class specification provides enough information to generate the code for the class. Appendix B is an example of an incorrectly formatted class specification B001. Appendix C is an example of a class specification C001 with undeclared functions and undeclared variables used by the functions. Further references are made hereafter to Appendix A, Appendix B, and Appendix C.

Various computer programming terminology is used herein in the context of a class specification, with general definitions as follow. In object-oriented programming, a class is a user-defined type consisting of methods (i.e., member functions of the class) and variables (i.e., attribute members of the class). The class is a template definition of a particular kind of object. An object is a specific instance of a class, where the variables contain real values. A parameter is an item of information that is passed to a program or function by a user or another program, and affects the operation of the program or function receiving the parameter. Therefore, parameters are a type of variable and can be used in the context of functions. Generally, a variable declared as 'local' is a variable that is visible only within the block of code in which the local variable appears and, thus, the local variable has local scope. In a function, a local variable has meaning only within that function block. Whereas the attribute members of a class are private by default (i.e., members are accessible only within the class), structures (or "struct") are similar to classes but in which attribute members are public by default. Structures contain member functions and attribute members just like classes. However, the attribute members are accessible outside the structure.

A Function List section A004 typically includes function declarations of the particular class described in the class specification. In the example class specification A001 of Appendix A, a class named "CHTMLProcessor" is specified. Furthermore, the Function List A004 includes parameters associated with the functions declared in Function List A004. In one implementation, parameters of the functions are prefixed with either "in_", "out_", or "inOut_", depending on how the parameters are used in the respective function. Although the preceding prefixes are presented as an example, the significance of organizational rules and required addendums associated with parameter naming is described further below.

In addition, enumerations, structures, and nested classes might also be defined in a Defined Type List section A005. For example, enumeration A010 illustrates an enumeration type named "ELineStatus", structure A011 illustrates a structure named "SExtractionState", and class A012 illustrates a nested class named "CLineOfFile".

The Class Attributes section A006 lists and defines the attribute members of the particular class described in the class specification, e.g., CHTMLProcessor. In one implementation, attribute names are prefixed with "m_". Although the preceding prefix is presented as an example, the significance of organizational rules and required addendums associated with class attribute naming is described further below.

The Function Definitions section A007 defines the algorithms used to implement the functions that are associated with the particular class described in the class specification, e.g., CHTMLProcessor. Function parameters and class attributes are used in the function definitions in the Function Definitions section A007 of class specification A001.

In addition, local variables used in a function definition may be specified in an associated algorithm of the function definition. In one implementation, local variable names are prefixed with "loc_". Although the preceding prefix is presented as an example, the significance of organizational rules and required addendums associated with local variable naming is described further below.

Process for Validating a Design Specification Document

Figure 24:
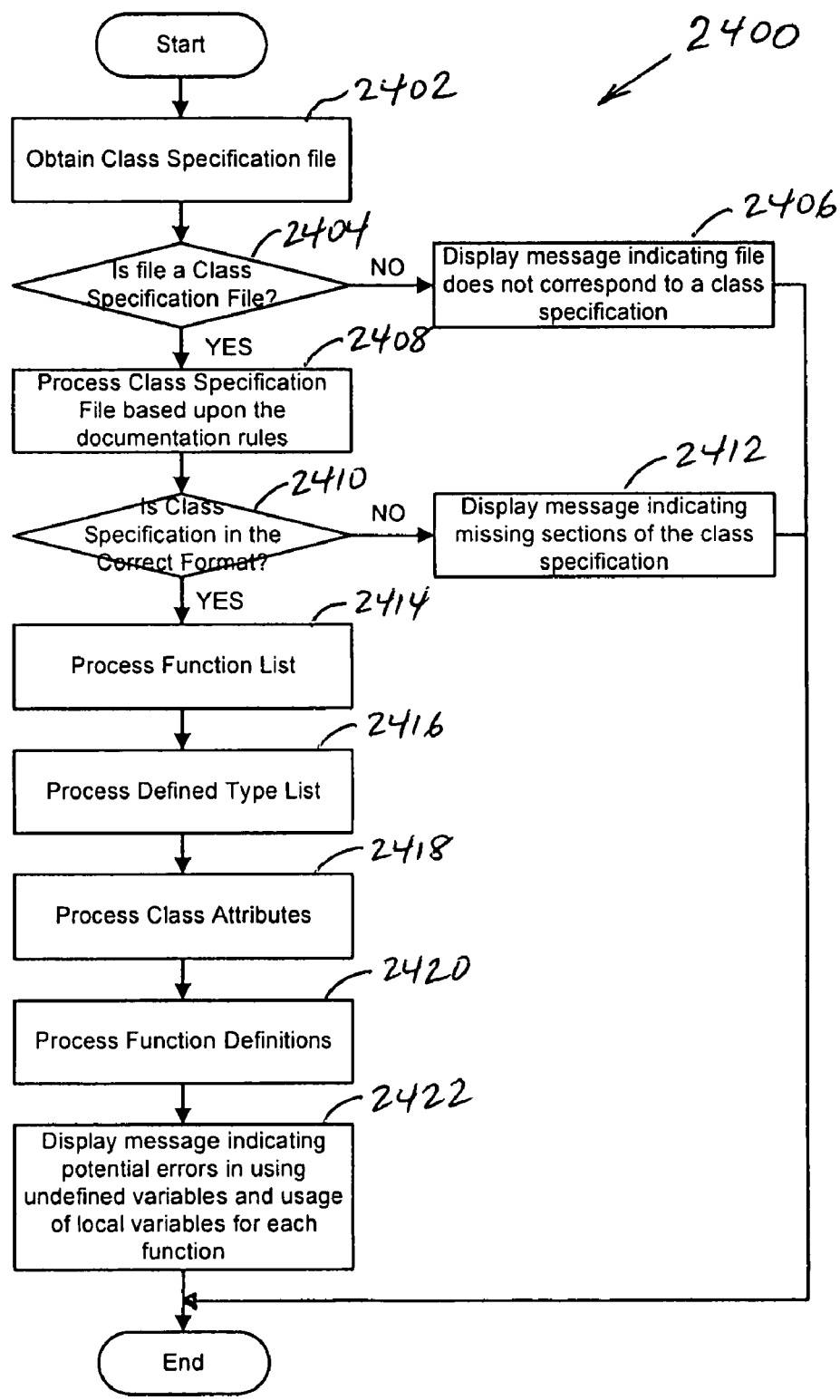
FIG. 24 is a flowchart that illustrates a process for validating a class specification, according to an embodiment of the invention.

FIG. 24 is a flowchart that illustrates a process 2400 for validating an electronic class specification document, according to an embodiment of the invention. The terms "validate" and "validating" are used herein interchangeably with the terms "verify" and "verifying", respectively, in the context of a class specification document portion of a design specification document. Input to process 2400 is one or more computer-readable files that represent the class specification document and that are stored on a suitable computer-readable medium. For example, each class specification of a plurality of class specifications of a design specification document may be represented as a separate computer-readable file.

Process 2400 is embodied in computer software code and, thus, is an automated validation process. Process 2400 depicts a specific implementation of the embodiments described herein and, therefore, some steps can be added or deleted from process 2400 and the resulting process still falls within the scope of the broader teachings herein. Further, process 2400 may be carried out by verification tool 512 (FIG. 23).

Figure 26:
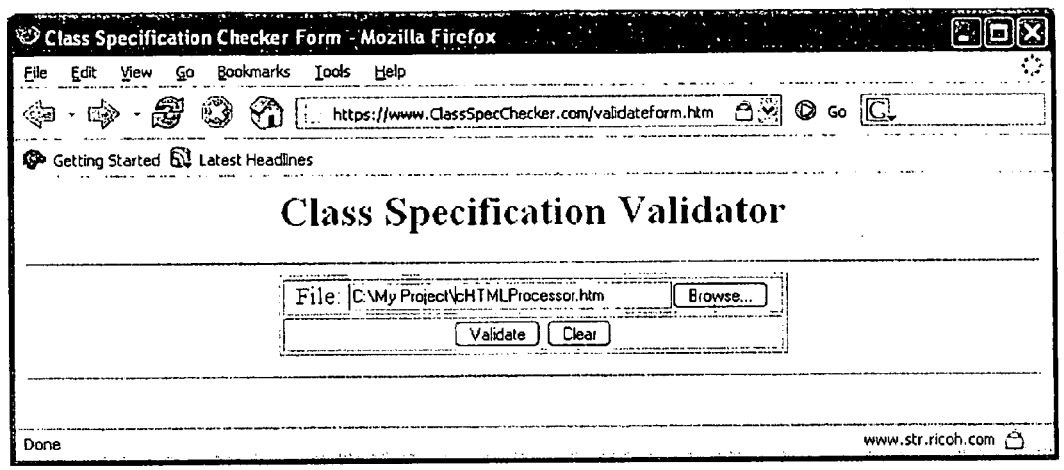
FIG. 26 presents a web page through which the class specification validation tool can be used, according to an embodiment of the invention.

FIG. 26 presents a web page through which the class specification validation tool can be used, according to an embodiment of the invention. FIG. 26 represents a web page interface for selecting the file containing the software class specification. Thus, the process 2400 is invoked via a web page (see, e.g., FIG. 26) for what is referred to herein as a "class specification validator" tool, or simply "validator". Using the class specification web page, the user inputs the file name corresponding to the class specification that the user is interested in validating. Therefore, the file for the class specification is obtained from storage, at block 2402.

According to one embodiment, the validator performs two passes through the file to validate the class specification.

During the first pass, the validator determines if the file corresponds to a class specification, at block 2404. If the file does not correspond to a class specification, then the validator displays a message on the web page indicating that the file does not correspond to a class specification, at block 2406. If the file is a class specification file, then the validator continues processing the class specification file based upon corresponding documentation rules, at block 2408.

At block 2410, it is determined whether the class specification is in the correct format, i.e., whether the class specification file contains all the components in the right order, such as with class specification A001 of Appendix A. If the class specification file is not in the correct format, such as with class specification B001 of Appendix B (which is missing a Defined Type List section), then the validator displays a message on the web page identifying the missing components of the class specification.

Figure 28:
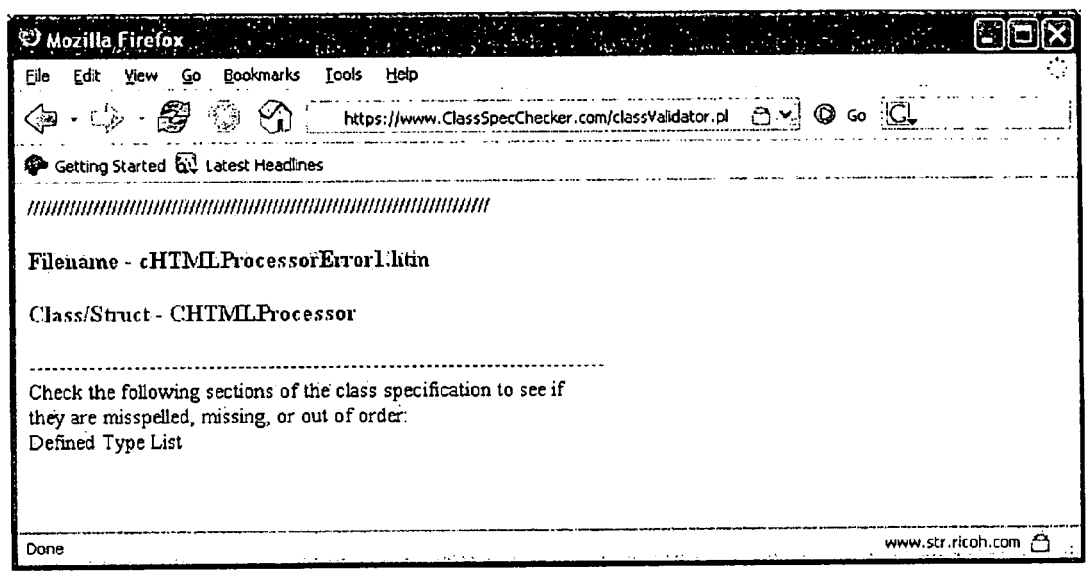
FIG. 28 illustrates an example of results from use of the class specification validator on the class specification of Appendix B, according to an embodiment of the invention.

FIG. 28 illustrates an example of results from use of the class specification validator on the class specification of Appendix B, according to an embodiment of the invention. According to one embodiment, the information that is displayed in the results includes the filename, the name of the class, and a listing of sections missing in the class specification. In the class specification B001 of Appendix B, the Define Type List component is missing. Therefore, the web page of FIG. 28 displays that the Defined Type List section is misspelled, missing, or out of order. If the class specification file is in the correct format, then the validator performs the second pass through the class specification file to validate the functions and the variables used in the functions, i.e., blocks 2414-2422, as described hereafter.

Processing The Function List Section

In the second pass through the class specification file, the validator locates the Function List section (e.g., A004 of Appendix A) of the class specification, and processes the Function List as follows, at block 2414. From the Function List, the validator obtains and maintains each function name along with an associated parameter listing. For example, the validator extracts the function names and associated parameter listings from Function List section of the class specification file and stores this information in volatile memory, e.g., RAM.

With reference to the sample class specification A001 of Appendix A, the validator would extract the function names (public: CHTMLProcessor, ~CHTMLProcessor, obtainDataFromHTMLFile; private: setupExtractionStateVector, adjustMap, obtainNonBlankLine, obtainNonBlankLine, clear) and associated parameter listings (in_HPPTSession for CHTMLProcessor function; inOut_Status and in_KeyValueInfoVector for obtainDataFromHTMLFile function; in_KeyValueInfoVector for setupExtractionStateVector function; inOut_Status and in_sValue and in_InfoType and in_nRelativePriority for adjustMap function; out_sLine for first obtainNonBlankLine function; out_sLine and in_sLine for second obtainNonBlankLine function; out_sLine for clear function) from the Function List section A004.

By maintaining the function name with its associated parameter listing, the validator can distinguish between overloaded functions in which the respective function names are the same but the respective associated parameter listings differ. With reference to the sample class specification A001 of Appendix A, the validator would distinguish between the first and second obtainNonBlankLine functions from Function List A004. Knowledge of such differences is used for validating functions and variables in the Function Definitions section (e.g., A007 of Appendix A) of the class specification, as described hereafter in reference to block 2420. Encountering the Defined Type List section (e.g., A005 of Appendix A) of the class specification is an indication that all the functions of the class specified in the class specification have been obtained by the validator.

Processing the Defined Type List Section

The Defined Type List section of a class specification contains the enumerations, structures, and classes that are defined within a class. According to one embodiment, the validator processes the structures and classes that are in the Defined Type List (e.g., A005 of Appendix A) as follows, at block 2416. For each structure and class, the corresponding attributes and functions are obtained and maintained. For example, the validator extracts the attribute names and function names from the Defined Type List section of the class specification file and stores this information in volatile memory, e.g., RAM.

According to one embodiment, the attributes of the defined types are identified by the leading "m_"; however, the manner in which the attributes of the defined types are identified may vary from implementation to implementation. With reference to the sample class specification A001 of Appendix A, the validator would extract the attribute names (m_LineState, m_currentPreconditionltr, m_Endltr, m_infoType, m_nRelativePriority, m_sFrontDelete1, m_sFrontDelete2, m_sBackDelete for structure SExtractionState; m_sLine for nested class CLineOfFile) and function names (SExtractionState, ~SExtractionState, clear for structure SExtractionState; CLineOfFile, ~CLineOfFile, processLineOfFile for nested class CLineOfFile) from the Defined Type List section A005. Thus, the validator is capable of recognizing and handling nested classes (e.g., CLineOfFile) and structures (e.g., SExtractionState) that are defined within a class (e.g., CHTMLProcesor) of a class specification, such as in a Defined Type List section of a class specification, to validate the nested classes and structures against other sections of the class specification document, as described in greater detail hereafter.

The names of the structure or class are prefixed to the corresponding function names, which are associated with each function's parameter listing, to indicate that the function corresponds to the structure or class. For example, the structure name "SExtractionState" would be prefixed to the function "clear" to form a unique name, "SExtractionState::clear", indicating that the "clear" function corresponds to the "SExtractionState" structure. For another example, the class name "CLineOfFile" would be prefixed to the function "processLineOfFile" to form a unique name, "CLineOfFile::processLineOfFile", indicating that the "processLineOfFile" function corresponds to the "CLineOfFile" class. The function name prefix and the associated function parameter listings are used to distinguish the functions of the class from the functions of the defined types (e.g., structures and nested classes), as well as to distinguish between overloaded functions within the defined types. Encountering the Class Attributes section of the class specification is an indication that all the classes and structures of the defined type list have been obtained by the validator.

Processing the Class Attributes Section

The Class Attributes section (e.g., A006 of Appendix A) of a class specification contains all the attribute members of a class. As mentioned, the attributes of the class are identified by the leading "m_", according to one embodiment. According to one embodiment, the validator processes the class attributes that are in the Class Attributes section as follows, at block 2418. The validator obtains and maintains all attributes of the class. For example, the validator extracts the attributes from the Class Attributes section of the class specification file and stores this information in volatile memory, e.g., RAM. With reference to the sample class specification A001 of Appendix A, the validator would extract the attribute names (m_HTTPSession, m_ExtractValueFromLine, m_ExtractionStateVector, m_nCounter) from the Class Attributes section A006. Encountering the Function Definitions section of the class specification is an indication that all the attributes of a class have been obtained by the validator.

Processing the Function Definitions Section

The Function Definitions section (e.g., A007 of Appendix A) of a class specification contains the description and the algorithm of all the functions of the class and of the defined types (i.e., the structure and classes within the class). According to one embodiment, the validator processes the function definitions that are in the Function Definitions section as follows, at block 2420. For each function defined in the Function Definitions section, the names of the variables (i.e., the parameters) corresponding to the function are obtained and maintained. For example, the validator extracts the function parameter names from the Function Definitions section of the class specification file and stores this information in volatile memory in association with the corresponding function. The parameters of the function are obtained from the function name with parameter listing in the first line (following "Function:") in the function definition of each function.

Processing Class Attribute and Parameter Variables

According to one embodiment, the names of the parameters are identified by a leading "in_" "inOut_", or "out_". As the validator processes the entire definition of a function (i.e., for attributes and function parameters), the validator locates all the variables with leading "m_" (e.g., indicating an attribute type of variable), "in_", "inOut_", or "out_" (e.g., indicating a parameter type of variable). If any variables do not correspond to the names of the attributes of the class or of the defined types, or do not correspond to the names of parameters, then a possible undeclared variable is identified and maintained by the validator.

With reference to the sample class specification A001 of Appendix A, the validator would extract the function parameter names (e.g., the parameters in_HTTPSession for the CHTMLProcessor function; in_KeyValueInfoVector for the setupExtractionStateVector function; inOutStatus and in_sValue and in_InfoType and in_nRelativePriority for adjustMap function; and so on) and attribute names (e.g., the attributes m_HTTPSession for the CHTMLProcessor function; m_ExtractionStateVector and m_PreconditionVector and m_LineState and m_CurrentPreconditionltr and m_Endltr and m_nCounter for the setupExtractionStateVector function; and so on) from the Function Definitions section A007 for each function following the function name with its parameter listing.

Processing Function Local Variables

The validator identifies all the local variables which, according to one embodiment, have a leading "loc_". The validator maintains the number of times each local variable is used in the definition of the function in the Function Definition section of the class specification. With reference to the sample class specification A001 of Appendix A, the validator would extract the local variables (loc_Pair used four times in adjustMap function; loc_fRemoveTrailing used two times and loc_fRemoveLeading used two times in first obtainNonBlankLine function; and so on) from the Function Definitions section A007.

Processing Function Declarations

As part of processing a definition of a function from the Function Definitions section of the class specification, the validator determines whether the function corresponds to one of the functions identified from the Function List or from the Defined Type List. If the function does not correspond to one of the functions identified from the Function List or from the Defined Type List, then a message is displayed on the web page indicating the function has not been declared. Otherwise the function name is displayed on the web page.

FIG. 29 illustrates an example of results from use of the class specification validator on the class specification of Appendix C, according to an embodiment of the invention. In the class specification C001 of Appendix C, some of the functions in the Function Definition are not declared and some of the attributes and parameters in the function definitions do not correspond to those in the function declaration, defined type list, or class attributes. Thus, in this example, while processing the Function Definitions section C007 of the CHTMLProcessor class specification C001 of Appendix C, the validator determines that there is a function, obtainBlankLine C008, that is defined in the Function Definitions section C007. However, the obtainBlankLine C008 function is not declared in the Function List C004 or the Defined Type List C005 of class specification C001. In response to this determination, the validator displays a message 2902 on the web page illustrated in FIG. 29, indicating the obtainBlankLine C008 function is not declared. Similarly, the validator displays messages 2904 and 2906 on the web page illustrated in FIG. 29, indicating the clear(std::string & out_sLine, std::string in_sLine) C010 function and the SExtractionState::reset( ) C012 function, respectively, is not declared. For the other functions from the Function Definitions section C007 of the class specification C001 that are declared in either the Function List C004 or the Defined Type List C005 of class specification C001, the validator displays the function names and corresponding local variable usage, if applicable (see FIG. 29).

FIG. 25A illustrates a lookup table 2502 used to store the functions declared in the Function List and Defined Type List of the class specification corresponding to the class specification of Appendix A, according to an embodiment of the invention. According to one embodiment, the key to the lookup table is the function name along with the corresponding parameter listing, with all the spaces in the parameter listing removed. If the function is a function of a defined type, the function name is preceded with the class or structure name and two colons "::". Lookup table 2502 provides a lookup mechanism for a quick determination of whether or not a function is properly declared in the class specification. When the validator extracts a function name from a corresponding function definition, the function name with its parameter listing is obtained and the spaces are removed from the parameter listing. The validator checks to see if the function name is in the lookup table 2502 to determine whether the function is properly declared in the class specification. If the function name is not in the lookup table 2502, then the function has not been declared. According to one embodiment, lookup table 2502 is a hash table. However, the type of lookup table used for processing function names may vary from implementation to implementation.

Processing Class Variable Declarations

If a function definition contains any undeclared variables, then a message is displayed which lists all the undeclared variables and the number of times each undeclared variable is used in the function, at block 2422. In this example, while processing the Function Definitions section C007 of the CHTMLProcessor class specification C001 of Appendix C, the validator determines that there is a variable, m_Counter C014, that is referenced in the obtainDataFromHTMLFile function C013 in the Function Definitions section C007. However, the m_Counter C014 variable is not specified in any other section of class specification C001, such as the Defined Type List section C005 or Class Attributes section C006. In response to this determination, the validator displays a message 2908 on the web page illustrated in FIG. 29, indicating the m_Counter C014 variable is unspecified and that the variable is used once in the obtainDataFromHTMLFile function C013. Similarly, the validator displays messages 2910 and 2912 on the web page illustrated in FIG. 29, indicating the m_PreconditionVector variable (used three times in the setupExtractionStateVector function) and the in_Line and out_Line variables (used once and four times, respectively, in the pertinent obtainNonBlankLine function), respectively, are not specified in any other section of class specification C001.

FIG. 25B illustrates a lookup table 2504 used to store the attributes from the Defined Type List and Class Attributes sections of the class specification corresponding to the class specification of Appendix A, according to an embodiment of the invention. According to one embodiment, the key to the lookup table 2504 is the attribute name. The lookup table provides a mechanism for a quick determination of whether an attribute used in a function is properly declared in the class specification. When the validator processes a function definition and discovers a variable name starting with "m_", which indicates an attribute, the validator checks to see if the attribute name is in the lookup table 2504 to determine whether the function is properly declared in the class specification. If the variable is not in the lookup table 2504, then the variable has not been declared. According to one embodiment, lookup table 2504 is a hash table. However, the type of lookup table used for processing attribute names may vary from implementation to implementation.

A similar table is used to store the parameters listed in a function declaration. According to one embodiment, the key to the parameters lookup table is the parameter names starting with "in_", "inOut_", and "out_". When the validator processes a function definition for a given function declaration and discovers a variable name starting with "in_", "inOut_", and "out_", the validator checks the parameters lookup table to determine whether or not the variable name is in the parameters lookup table and is properly specified. If the variable is not in the parameters lookup table, then the variable has an incorrect parameter name. According to one embodiment, the parameters lookup table is a hash table. However, the type of lookup table used for processing parameter names may vary from implementation to implementation Processing Use of Local Variables Furthermore, all the local variables of the function and the number of times each local variable is used are displayed, at block 2422. In this example, while processing the Function Definitions section C007 of the CHTMLProcessor class specification C001 of Appendix C, the validator determines that there are local variables loc_sLine, loc_Line, loc_sValue, and loc_bReturn that are referenced in the obtainDataFromHTMLFile function C013 in the Function Definitions section C007. In response to this determination, the validator displays a local variable list 2914 on the web page illustrated in FIG. 29, indicating the number of times each local variable is used in the obtainDataFromHTMLFile function C013 (i.e., loc_sLine is used three times, loc_Line is used once, loc_sValue is used four times, and loc_bReturn is used three times).

The validator processes each function definition defined in the Function Definitions section in turn, and displays the appropriate foregoing message(s) for each function processed. The validator is finished executing once all the function definitions in the Function Definitions section have been processed.

Figure 27:
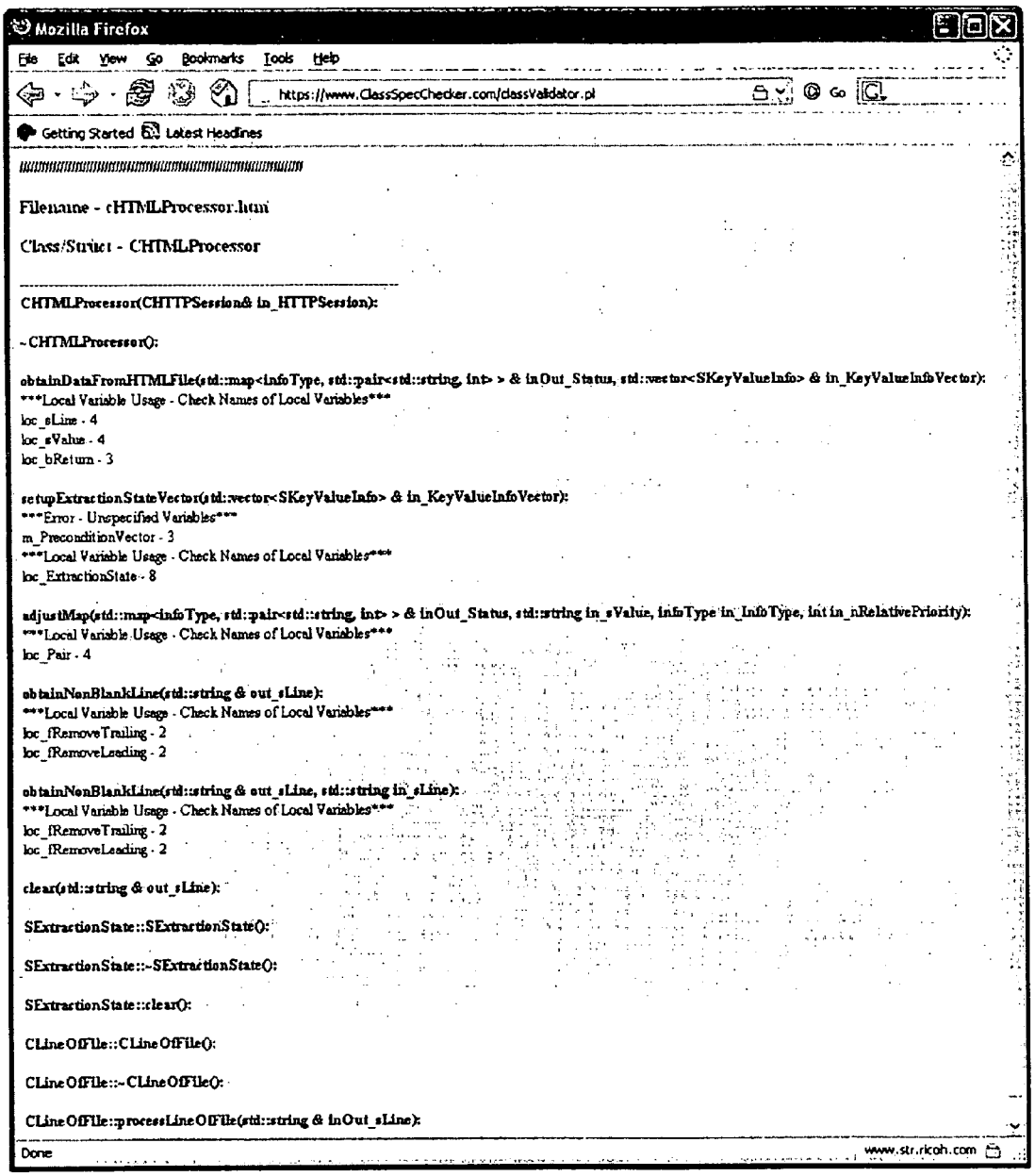
FIG. 27 illustrates an example of results from use of the class specification validator on the class specification of Appendix A, according to an embodiment of the invention.

FIG. 27 illustrates an example of results from use of the class specification validator on the class specification of Appendix A, according to an embodiment of the invention. According to one embodiment, the information that is displayed in the results includes the filename, the name of the class, and a listing of all the functions in the function definition. For each function, the unspecified variables and usage of local variables are listed, if there are any. The validator also distinguishes between overloaded functions (e.g., obtainNonBlankdLine( )) and functions of defined types having the same name as functions of the class (e.g., clear( )). Information provided by the results helps validate the correctness of the class.

A lookup table similar to lookup table 2504 (FIG. 25B) is used to store the local variables used in a function definition. According to one embodiment, the key to the local variables lookup table is variable names starting with "loc_". When the validator processes a function definition and discovers a variable name starting with "loc_", the validator checks the local variables lookup table to determine whether or not the variable name is in the local variables lookup table and is properly specified. If the local variable is not in the local variables lookup table, then the local variable is added to the local variables lookup table. If the local variable is in the local variables lookup table, then the validator increments a count value that indicates the number of times the local variable is used in the function. According to one embodiment, the local variables lookup table is a hash table. However, the type of lookup table used for processing local variables may vary from implementation to implementation.

As discussed, FIGS. 27, 28, and 29 show results of the validator tool on the class specifications of Appendices A, B, and C, respectively. According to one embodiment, if parts of the class specification do not conform to the rules for the class specification, the validator highlights the corresponding nonconformance messages by displaying the messages in the web page in red type. The highlighting allows the user to quickly identify the errors in the class specification, thereby improving the usability of the tool. Other mechanisms for drawing attention to the nonconformance messages may be used, such as type colors other than red, bold type, and the like.

Hence, the foregoing detailed description describes techniques for automated validation of a software class specification. In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX A

Author: XXX
6.6.7.4.4 CHTMLProcessor Class Specification
6.6.7.4.4.1 Base Class
None
6.6.7.4.4.2 Function List
public:
   CHTMLProcessor(CHTTPSession& in__HTTPSession);
   ~CHTMLProcessor( );
   bool obtainDataFromHTMLFile(std::map<infoType, std::pair<std::string, int> > & inOut__Status,
      std::vector<SKeyValueInfo> & in__KeyValueInfoVector);
private:
   void setupExtractionStateVector(std::vector<SKeyValueInfo> & in__KeyValueInfoVector);
   bool adjustMap(std::map<infoType, std::pair<std::string, int> > & inOut__Status,
      std::string in__sValue, infoType in__InfoType, int in__nRelativePriority);
   bool obtainNonBlankLine(std::string & out__sLine);
   bool obtainNonBlankLine(std::string & out__sLine, std::string in__sLine);
   bool clear(std::string & out__sLine);
6.6.7.4.4.3 Defined Type List
private:
   enum ELineStatus {
      ePreTargetLine = 0,
      eTargetLine,
      eFinished
   };
   struct SExtractionState {
      ELineStatus               m__LineState;
      std::vector<std::string>::iterator m__CurrentPreconditionItr;
      std::vector<std::string>::iterator m__EndItr;
      infoType                 m__infoType;
      int                       m__nRelativePriority;
      std::string              m__sFrontDelete1;
      std::string              m__sFrontDelete2;
      std::string              m__sBackDelete;
      SExtractionState( );
      ~SExtractionState( );
      void clear( );
   };
   class CLineOfFile {
     public:
       CLineOfFile( );
       ~CLineOfFile( );
       void processLineOfFile(std::string & inOut__sLine);
     private:
       std::string m__sLine;
   };
6.6.7.4.4.4 Class Attributes
private:

| Type | Attribute Name | Description |
| --- | --- | --- |
| CHTTPSession& | m__HTTPSession | This attribute member represents an HTTP session to access the HTML files of the devices. |
| CExtractValueFromLine | m__ExtractValueFromLine | This attribute member extracts a value from the target line passed in |
| std::vector<SExtractionState> | m__ExtractionStateVector | This attribute member contains information used to locate the value of the information from the HTML file. |
| int | m__nCounter | Counter for checking if all the values are obtained. |

6.6.7.4.4.5 Function Definitions
////////////////////////////////////////////////////////////
// Function: CHTMLProcessor(CHTTPSession& in__HTTPSession)
// Description: Constructor
// Preconditions: None.
// Postconditions: None.
// Security: None
// Algorithm: 1 Initializes m__HTTPSession(in__HTTPSession).
////////////////////////////////////////////////////////////
////////////////////////////////////////////////////////////
// Function: ~CHTMLProcessor( )
// Description: Destructor
// Preconditions: None.
// Postconditions: None.
// Security: None.
// Algorithm: Default.
////////////////////////////////////////////////////////////
////////////////////////////////////////////////////////////

APPENDIX A-continued

```
// Function:      obtainDataFromHTMLFile(std::map<infoType, std::pair<std::string, int> > &
//                    inOut_Status, std::vector<SKeyValueInfo> & in_KeyValueInfoVector)
// Description:   This function obtains the desired information from the
//                HTML file of a device. The input vector contains
//                information used to obtain the information from the
//                HTML file. This function returns true and a map with
//                the information if it can be obtained. Otherwise
//                false and a map unmodified is returned.
// Preconditions: The input in_KeyValueInfoVector cannot be empty.
// Postconditions: None.
// Security:      Line is from m_HTTPSession over the network
// Algorithm:     1 if in_KeyValueInfoVector is empty, return false.
//                2 call setupExtractionStateVector passing in_KeyValueInfoVector
//                3 declare std::string's loc_sLine, loc_sValue,
//                     bool loc_bReturn = false
//                4 while obtainNonBlankLine with loc_sLine passed in
//                  returns true,
//                   4.1 Iterate over m_ExtractionStateVector
//                      4.1.1 If (*iterator) contains m_infoType NE 102 AND LT 501 or
//                            m_nRelativePriority EQ 0, then continue to 4.1
//                      4.1.2 Switch on (*iterator).m_LineState
//                         4.1.2.1 case: eFinished
//                            continue to 4.1
//                         4.1.2.2 case: ePreTargetLine
//                            4.1.2.2.1 if *(*iterator).m_CurrentPreconditionItr is
//                                  not in loc_sLine, continue to 4.1
//                            4.1.2.2.2 (*iterator).m_CurrentPreconditionItr++
//                            4.1.2.2.3 if (*iterator).m_CurrentPreconditionItr EQ
//                                  (*iterator).m_EndItr, (*iterator).m_LineState = eTargetLine
//                            4.1.2.2.4 break
//                         4.1.2.3 case: eTargetLine
//                            4.1.2.3.1 obtainValueFromLine of m_ExtractValueFromLine
//                                  passing loc_sValue, and necessary parameters
//                            4.1.2.3.2 if loc_sValue is not empty,
//                                  if adjustMap passing inOut_Status, loc_sValue,
//                                  and RelativePriority and infoType returns true,
//                                  assign the return value to loc_bReturn
//                            4.1.2.3.3 (*iterator).m_LineState = eFinished
//                            4.1.2.3.4 m_nCounter --
//                            4.1.2.3.5 break
//                   4.2 if m_nCounter is zero, break out of 4
//                   4.3 clear loc_sLine
//                6 return loc_bReturn
///////////////////////////////////////////////////////////////
///////////////////////////////////////////////////////////////
// Private Function: setupExtractionStateVector(std::vector<SKeyValueInfo> & in_KeyValueInfoVector)
// Description:   This function sets up m_ExtractionStateVector.
// Preconditions: None.
// Postconditions: None.
// Security:      None.
// Algorithm:     1 Clear m_ExtractionStateVector
//                2 Declare SExtractionState loc_ExtractionState
//                3 Iterate over in_KeyValueInfoVector
//                   3.1 Clear loc_ExtractionState Note: iterators are not clearedll --> 3.5 and 3.6
//                   3.2 copy simple values of (*iterator) to loc_ExtractionState
//                   3.3 if (*iterator).m_PreconditionVector is empty
//                         loc_ExtractionState.m_LineState is eTargetLine
//                   3.4 else loc_ExtractionState.m_LineState is ePreTargetLine
//                   3.5 loc_ExtractionState.m_CurrentPreconditionItr =
//                         (*iterator).m_PreconditionVector.begin( )
//                   3.6 loc_ExtractionState.m_EndItr =
//                         (*iterator).m_PreconditionVector.end( )
//                   3.7 m_ExtractionStateVector.push_back(loc_ExtractionState)
//                4 Assign the size of in_KeyValueInfoVector to m_nCounter
///////////////////////////////////////////////////////////////
///////////////////////////////////////////////////////////////
// Private Function:  adjustMap(std::map<infoType, std::pair<std::string, int> > & inOut_Status,
//                    std::string in_sValue, infoType in_InfoType, int in_nRelativePriority)
// Description:   This function puts the value to the status map if the condition
//                is met.
// Preconditions: in_sValue is not empty, input numerals are not 0 (also eNotDefine)
// Postconditions: None.
// Security:      None.
// Algorithm:     1 if preconditions are not met, return false
//                2 std::pair<std::string, int> loc_Pair
//                3 Assign in_sValue and in_nRelativePriority to loc_Pair
//                4 if in_InfoType is not in inOut_Status
//                   4.1 inOut_Status[in_InfoType] = loc_Pair
//                   4.2 return true
```

APPENDIX A-continued

```
//                  5 if int of inOut_Status[in_InfoType] is GE
//                        in_nRelativePriority, return false
//                  6 inOut_Status[in_InfoType] = loc_Pair
//                  7 return true
//////////////////////////////////////////////////////////////
//////////////////////////////////////////////////////////////
// Private Function: obtainNonBlankLine(std::string & out_sLine)
// Description:   This function obtains non-blank line from m_HTTPSession
//                This function returns true and line taking the leading and
//                trailing white spaces out, or false when the HTML file
//                reaches end of file.
// Preconditions:  None.
// Postconditions: None.
// Security:       None.
// Algorithm:      1 clear out_sLine
//                 2 declare static CRemoveLeadingWhiteSpace loc_fRemoveLeading
//                         static CRemoveTrailingWhiteSpace loc_fRemoveTrailing
//                 2 while obtainNextLineOfHTMLFile( ) of m_HTTPSession passing
//                         out_sLine
//                   2.1 loc_fRemoveLeading(out_sLine)
//                   2.2 loc_fRemoveTrailing(out_sLine)
//                   2.3 if out_sLine is not empty, return true
//                 3 return false
//////////////////////////////////////////////////////////////
//////////////////////////////////////////////////////////////
// Private Function: obtainNonBlankLine(std::string & out_sLine, std::string in_sLine)
// Description:   This function obtains non-blank line from m_HTTPSession
//                This function returns true and line taking the leading and
//                trailing white spaces out, or false when the HTML file
//                reaches end of file.
// Preconditions:  None.
// Postconditions: None.
// Security:       None.
// Algorithm:      1 assign in_sLine to out_sLine
//                 2 declare static CRemoveLeadingWhiteSpace loc_fRemoveLeading
//                         static CRemoveTrailingWhiteSpace loc_fRemoveTrailing
//                 3 while obtainNextLineOfHTMLFile( ) of m_HTTPSession passing
//                         out_sLine
//                   3.1 loc_fRemoveLeading(out_sLine)
//                   3.2 loc_fRemoveTrailing(out_sLine)
//                   3.3 if out_sLine is not empty, return true
//                 4 return false
//////////////////////////////////////////////////////////////
//////////////////////////////////////////////////////////////
// Private Function: clear(std::string & out_sLine)
// Description:   This function clears the input line.
// Preconditions:  None.
// Postconditions: None.
// Security:       None.
// Algorithm:      1 clears out_sLine
//////////////////////////////////////////////////////////////
//////////////////////////////////////////////////////////////
// Function:    SExtractionState::SExtractionState( )
// Description: Constructor
// Preconditions:  None.
// Postconditions: None.
// Security:       None.
// Algorithm:      1 initialize numerals to 0 (eNotDefine and ePreTargetLine).
//////////////////////////////////////////////////////////////
//////////////////////////////////////////////////////////////
// Function:    SExtractionState::~SExtractionState( )
// Description: Destructor
// Preconditions:  None.
// Postconditions: None.
// Security:       None.
// Algorithm:      Default.
//////////////////////////////////////////////////////////////
//////////////////////////////////////////////////////////////
// Function:    SExtractionState::clear( )
// Description: This function initializes the attribute members of
//              SExtractionState.
// Preconditions:  None.
// Postconditions: None.
// Security:       None.
// Algorithm:      1 sets numerals to 0 (eNotDefine and ePreTargetLine)
//                 and strings to be empty
//////////////////////////////////////////////////////////////
//////////////////////////////////////////////////////////////
// Function:    CLineOfFile::CLineOfFile( )
```

APPENDIX A-continued

```
// Description:    Constructor
// Preconditions:  None.
// Postconditions: None.
// Security:       None.
// Algorithm:      1 initialize m_sLine to empty string.
////////////////////////////////////////////////////////////////
////////////////////////////////////////////////////////////////
// Function:       CLineOfFile::~CLineOfFile( )
// Description:    Destructor
// Preconditions:  None.
// Postconditions: None.
// Security:       None.
// Algorithm:      Default.
////////////////////////////////////////////////////////////////
////////////////////////////////////////////////////////////////
// Function:       CLineOfFile::processLineOfFile(std::string & inOut_sLine)
// Description:    This function processes and returns the input line.
// Preconditions:  None.
// Postconditions: None.
// Security:       None.
// Algorithm:      1 assign inOut_sLine to m_sLine.
//                 2 remove leading and trailing white spaces from
//                   inOut_sLine.
//                 3 replace multiple white spaces with single space
//                   in inOut_sLine.
////////////////////////////////////////////////////////////////
```

APPENDIX B

Author: XXX 6.6.7.4.4 CHTMLProcessor Class Specification 6.6.7.4.4.1 Base Class

None 6.6.7.4.4.2 Function List

```
public:
    CHTMLProcessor(CHTTPSession& in_HTTPSession);
    ~CHTMLProcessor( );
    bool obtainDataFromHTMLFile(std::map<infoType, std::pair<std::string, int> > & inOut_Status,
        std::vector<SKeyValueInfo> & in_KeyValueInfoVector);
private:
    void setupExtractionStateVector(std::vector<SKeyValueInfo> & in_KeyValueInfoVector);
    bool adjustMap(std::map<infoType, std::pair<std::string, int> > & inOut_Status,
        std::string in_sValue, infoType in_InfoType int in_nRelativePriority);
    bool obtainNonBlankLine(std::string & out_sLine);
    bool obtainNonBlankLine(std::string & out_sLine, std::string in_sLine);
    bool clear(std::string & out_sLine);
```

6.6.7.4.4.3 Class Attributes private:

| Type | Attribute Name | Description |
|---|---|---|
| CHTTPSession& | m_HTTPSession | This attribute member represents an HTTP session to access the HTML files of the devices. |
| CExtractValueFromLine | m_ExtractValueFromLine | This attribute member extracts a value from the target line passed in |
| std::vector<SExtractionState> | m_ExtractionStateVector | This attribute member contains information used to locate the value of the information from the HTML file. |
| int | m_nCounter | Counter for checking if all the values are obtained. |

6.6.7.4.4.4 Function Definitions

```
////////////////////////////////////////////////////////////////
// Function:       CHTMLProcessor(CHTTPSession& in_HTTPSession)
// Description:    Constructor
// Preconditions:  None.
// Postconditions: None.
// Security:       None
// Algorithm:      1 initializes m_HTTPSession(in_HTTPSession).
////////////////////////////////////////////////////////////////
////////////////////////////////////////////////////////////////
// Function:       ~CHTMLProcessor( )
// Description:    Destructor
// Preconditions:  None.
// Postconditions: None.
```

APPENDIX B-continued

```
// Security:     None.
// Algorithm:    Default.
/////////////////////////////////////////////////////////////////////
/////////////////////////////////////////////////////////////////////
// Function:     obtainDataFromHTMLFile(std::map<infoType, std::pair<std::string, int> > &
//                 inOut__Status, std::vector<SKeyValueInfo> & in__KeyValueInfoVector)
// Description:  This function obtains the desired information from the
//               HTML file of a device. The input vector contains
//               information used to obtain the information from the
//               HTML file. This function returns true and a map with
//               the information if it can be obtained. Otherwise
//               false and a map unmodified is returned.
// Preconditions:  The input in__KeyValueInfoVector cannot be empty.
// Postconditions: None.
// Security:     Line is from m__HTTPSession over the network
// Algorithm:    1 if in__KeyValueInfoVector is empty, return false.
//               2 call setupExtractionStateVector passing in__KeyValueInfoVector
//               3 declare std::string's loc__sLine, loc__sValue,
//                    bool loc__bReturn = false
//               4 while obtainNonBlankLine with loc__sLine passed in
//                 returns true,
//                 4.1 Iterate over m__ExtractionStateVector
//                     4.1.1 If (*iterator) contains m__infoType NE 102 AND LT 501 or
//                           m__nRelativePriority EQ 0, then continue to 4.1
//                     4.1.2 Switch on (*iterator).m__LineState
//                         4.1.2.1 case: eFinished
//                             continue to 4.1
//                         4.1.2.2 case: ePreTargetLine
//                             4.1.2.2.1 if *(*iterator).m__CurrentPreconditionItr is
//                                 not in loc__sLine, continue to 4.1
//                             4.1.2.2.2 (*iterator).m__CurrentPreconditionItr++
//                             4.1.2.2.3 if (*iterator).m__CurrentPreconditionItr EQ
//                                 (*iterator).m__EndItr, (*iterator).m__LineState = eTargetLine
//                             4.1.2.2.4 break
//                         4.1.2.3 case: eTargetLine
//                             4.1.2.3.1 obtainValueFromLine of m__ExtractValueFromLine
//                                 passing loc__sValue, and necessary parameters
//                             4.1.2.3.2 if loc__sValue is not empty,
//                                 if adjustMap passing inOut__Status, loc__sValue,
//                                 and RelativePriority and infoType returns true,
//                                 assign the return value to loc__bReturn
//                             4.1.2.3.3 (*iterator).m__LineState = eFinished
//                             4.1.2.3.4 m__nCounter --
//                             4.1.2.3.5 break
//                 4.2 if m__nCounter is zero, break out of 4
//                 4.3 clear loc__sLine
//               6 return loc__bReturn
/////////////////////////////////////////////////////////////////////
/////////////////////////////////////////////////////////////////////
// Private Function: setupExtractionStateVector(std::vector<SKeyValueInfo> & in__KeyValueInfoVector)
// Description:  This function sets up m__ExtractionStateVector.
// Preconditions:  None.
// Postconditions: None.
// Security:     None.
// Algorithm:    1 Clear m__ExtractionStateVector
//               2 Declare SExtractionState loc__ExtractionState
//               3 Iterate over in__KeyValueInfoVector
//                 3.1 Clear loc__ExtractionState Note: iterators are not cleared!! --> 3.5 and 3.6
//                 3.2 copy simple values of (*iterator) to loc__ExtractionState
//                 3.3 if (*iterator).m__PreconditionVector is empty
//                     loc__ExtractionState.m__LineState is eTargetLine
//                 3.4 else loc__ExtractionState.m__LineState is ePreTargetLine
//                 3.5 loc__ExtractionState.m__CurrentPreconditionItr =
//                     (*iterator).m__PreconditionVector.begin( )
//                 3.6 loc__ExtractionState.m__EndItr =
//                     (*iterator).m__PreconditionVector.end( )
//                 3.7 m__ExtractionStateVector.push__back(loc__ExtractionState)
//               4 Assign the size of in__KeyValueInfoVector to m__nCounter
/////////////////////////////////////////////////////////////////////
/////////////////////////////////////////////////////////////////////
// Private Function: adjustMap(std::map<infoType, std::pair<std::string, int> > & inOut__Status,
//                 std::string in__sValue, infoType in__InfoType, int in__nRelativePriority)
// Description:  This function puts the value to the status map if the condition
//               is met.
// Preconditions:  in__sValue is not empty, input numerals are not 0 (also eNotDefine)
// Postconditions: None.
// Security:     None.
// Algorithm:    1 if preconditions are not met, return false
//               2 std::pair<std::string, int> loc__Pair
```

APPENDIX B-continued

```
//              3 Assign in__sValue and in__nRelativePriority to loc__Pair
//              4 if in__InfoType is not in inOut__Status
//                4.1 inOut__Status[in__InfoType] = loc__Pair
//                4.2 return true
//              5 if int of inOut__Status[in__InfoType] is GE
//                    in__nRelativePriority, return false
//              6 inOut__Status[in__InfoType] = loc__Pair
//              7 return true
////////////////////////////////////////////////////////////
////////////////////////////////////////////////////////////
// Private Function: obtainNonBlankLine(std::string & out__sLine)
// Description:   This function obtains non-blank line from m__HTTPSession
//                This function returns true and line taking the leading and
//                trailing white spaces out, or false when the HTML file
//                reaches end of file.
// Preconditions:  None.
// Postconditions: None.
// Security:       None.
// Algorithm:      1 clear out__sLine
//                 2 declare static CRemoveLeadingWhiteSpace loc__fRemoveLeading
//                        static CRemoveTrailingWhiteSpace loc__fRemoveTrailing
//                 2 while obtainNextLineOfHTMLFile( ) of m__HTTPSession passing
//                        out__sLine
//                   2.1 loc__fRemoveLeading(out__sLine)
//                   2.2 loc__fRemoveTrailing(out__sLine)
//                   2.3 if out__sLine is not empty, return true
//                 3 return false
////////////////////////////////////////////////////////////
////////////////////////////////////////////////////////////
// Private Function: obtainNonBlankLine(std::string & out__sLine, std::string in__sLine)
// Description:   This function obtains non-blank line from m__HTTPSession
//                This function returns true and line taking the leading and
//                trailing white spaces out, or false when the HTML file
//                reaches end of file.
// Preconditions:  None.
// Postconditions: None.
// Security:       None.
// Algorithm:      1 assign in__sLine to out__sLine
//                 2 declare static CRemoveLeadingWhiteSpace loc__fRemoveLeading
//                        static CRemoveTrailingWhiteSpace loc__fRemoveTrailing
//                 3 while obtainNextLineOfHTMLFile( ) of m__HTTPSession passing
//                        out__sLine
//                   3.1 loc__fRemoveLeading(out__sLine)
//                   3.2 loc__fRemoveTrailing(out__sLine)
//                   3.3 if out__sLine is not empty, return true
//                 4 return false
////////////////////////////////////////////////////////////
////////////////////////////////////////////////////////////
// Private Function: clear(std::string & out__sLine)
// Description:   This function clears the input line.
// Preconditions:  None.
// Postconditions: None.
// Security:       None.
// Algorithm:      1 clears out__sLine
////////////////////////////////////////////////////////////
////////////////////////////////////////////////////////////
// Function:     SExtractionState::SExtractionState( )
// Description:   Constructor
// Preconditions:  None.
// Postconditions: None.
// Security:       None.
// Algorithm:      1 initialize numerals to 0 (eNotDefine and ePreTargetLine).
////////////////////////////////////////////////////////////
////////////////////////////////////////////////////////////
// Function:     SExtractionState::~SExtractionState( )
// Description:   Destructor
// Preconditions:  None.
// Postconditions: None.
// Security:       None.
// Algorithm:      Default.
////////////////////////////////////////////////////////////
////////////////////////////////////////////////////////////
// Function:     SExtractionState::clear( )
// Description:   This function initializes the attribute members of
//                SExtractionState.
// Preconditions:  None.
// Postconditions: None.
```

APPENDIX B-continued

```
// Security:     None.
// Algorithm:    1 sets numerals to 0 (eNotDefine and ePreTargetLine)
//               and strings to be empty
///////////////////////////////////////////////////////////////
```

APPENDIX C

Author: XXX
6.6.7.4.4      CHTMLProcessor Class Specification
6.6.7.4.4.1    Base Class
None
6.6.7.4.4.2    Function List
public:
   CHTMLProcessor(CHTTPSession& in__HTTPSession);
   ~CHTMLProcessor( );
   bool obtainDataFromHTMLFile(std::map<infoType, std::pair<std::string, int> > & inOut__Status,
      std::vector<SKeyValueInfo> & in__KeyValueInfoVector);
private:
   void setupExtractionStateVector(std::vector<SKeyValueInfo> & in__KeyValueInfoVector);
   bool adjustMap(std::map<infoType, std::pair<std::string, int> > & inOut__Status,
      std::string in__sValue, infoType in__InfoType, int in__nRelativePriority);
   bool obtainNonBlankLine(std::string & out__sLine);
   bool obtainNonBlankLine(std::string & out__sLine, std::string in__sLine);
   bool clear(std::string & out__sLine);
6.6.7.4.4.4    Defined Type List
private:
   enum ELineStatus {
      ePreTargetLine = 0,
      eTargetLine,
      eFinished
   };
   struct SExtractionState {
      ELineStatus                              m__LineState;
      std::vector<std::string>::iterator m__CurrentPreconditionItr;
      std::vector<std::string>::iterator m__EndItr;
      infoType                                 m__infoType;
      int                                      m__nRelativePriority;
      std::string                              m__sFrontDelete1;
      std::string                              m__sFrontDelete2;
      std::string                              m__sBackDelete;
      SExtractionState( );
      ~SExtractionState( );
      void clear( );
   };
6.6.7.4.4.3    Class Attributes
private:

| Type | Attribute Name | Description |
| --- | --- | --- |
| CHTTPSession& | m__HTTPSession | This attribute member represents an HTTP session to access the HTML files of the devices. |
| CExtractValueFromLine | m__ExtractValueFromLine | This attribute member extracts a value from the target line passed in |
| std::vector<SExtractionState> | m__ExtractionStateVector | This attribute member contains information used to locate the value of the information from the HTML file. |
| int | m__nCounter | Counter for checking if all the values are obtained. |

6.6.7.4.4.5    Function Definitions
```
///////////////////////////////////////////////////////////////
// Function:      CHTMLProcessor(CHTTPSession& in__HTTPSession)
// Description:   Constructor
// Preconditions: None.
// Postconditions: None.
// Security:      None
// Algorithm:     1 initializes m__HTTPSession(in__HTTPSession).
///////////////////////////////////////////////////////////////
///////////////////////////////////////////////////////////////
// Function:      ~CHTMLProcessor( )
// Description:   Destructor
// Preconditions: None.
// Postconditions: None.
// Security:      None.
// Algorithm:     Default.
```

APPENDIX C-continued

```
////////////////////////////////////////////////////////////////
////////////////////////////////////////////////////////////////
// Function:       obtainDataFromHTMLFile(std::map<infoType, std::pair<std::string, int> > &
//                 inOut_Status, std::vector<SKeyValueInfo> & in_KeyValueInfoVector)
// Description:    This function obtains the desired information from the
//                 HTML file of a device. The input vector contains
//                 information used to obtain the information from the
//                 HTML file. This function returns true and a map with
//                 the information if it can be obtained. Otherwise
//                 false and a map unmodified is returned.
// Preconditions:  The input in_KeyValueInfoVector cannot be empty.
// Postconditions: None.
// Security:       Line is from m_HTTPSession over the network
// Algorithm:      1 if in_KeyValueInfoVector is empty, return false.
//                 2 call setupExtractionStateVector passing in_KeyValueInfoVector
//                 3 declare std::string's loc_sLine, loc_sValue,
//                       bool loc_bReturn = false
//                 4 while obtainNonBlankLine with loc_Line passed in
//                   returns true,
//                   4.1 Iterate over m_ExtractionStateVector
//                     4.1.1 If (*iterator) contains m_infoType NE 102 AND LT 501 or
//                           m_nRelativePriority EQ 0, then continue to 4.1
//                     4.1.2 Switch on (*iterator).m_LineState
//                       4.1.2.1 case: eFinished
//                           continue to 4.1
//                       4.1.2.2 case: ePreTargetLine
//                           4.1.2.2.1 if *(*iterator).m_CurrentPreconditionItr is
//                               not in loc_sLine, continue to 4.1
//                           4.1.2.2.2 (*iterator).m_CurrentPreconditionItr++
//                           4.1.2.2.3 if (*iterator).m_CurrentPreconditionItr EQ
//                               (*iterator).m_EndItr, (*iterator).m_LineState = eTargetLine
//                           4.1.2.2.4 break
//                       4.1.2.3 case: eTargetLine
//                           4.1.2.3.1 obtainValueFromLine of m_ExtractValueFromLine
//                               passing loc_sValue, and necessary parameters
//                           4.1.2.3.2 if loc_sValue is not empty,
//                               if adjustMap passing inOut_Status, loc_sValue
//                               and RelativePriority and infoType returns true,
//                               assign the return value to loc_bReturn
//                           4.1.2.3.3 (*iterator).m_LineState = eFinished
//                           4.1.2.3.4 m_nCounter –
//                           4.1.2.3.5 break
//                   4.2 if m_Counter is zero, break out of 4
//                   4.3 clear loc_sLine
//                 6 return loc_bReturn
////////////////////////////////////////////////////////////////
////////////////////////////////////////////////////////////////
// Private Function: setupExtractionStateVector(std::vector<SKeyValueInfo> & in_KeyValueInfoVector)
// Description:    This function sets up m_ExtractionStateVector.
// Preconditions:  None.
// Postconditions: None.
// Security:       None.
// Algorithm:      1 Clear m_ExtractionStateVector
//                 2 Declare SExtractionState loc_ExtractionState
//                 3 Iterate over in_KeyValueInfoVector
//                   3.1 Clear loc_ExtractionState Note: iterators are not cleared!! --> 3.5 and 3.6
//                   3.2 copy simple values of (*iterator) to loc_ExtractionState
//                   3.3 if (*iterator).m_PreconditionVector is empty
//                       loc_ExtractionState.m_LineState is eTargetLine
//                   3.4 else loc_ExtractionState.m_LineState is ePreTargetLine
//                   3.5 loc_ExtractionState.m_CurrentPreconditionItr =
//                       (*iterator).m_PreconditionVector.begin( )
//                   3.6 loc_ExtractionState.m_EndItr =
//                       (*iterator).m_PreconditionVector.end( )
//                   3.7 m_ExtractionStateVector.push_back(loc_ExtractionState)
//                 4 Assign the size of in_KeyValueInfoVector to m_nCounter
////////////////////////////////////////////////////////////////
////////////////////////////////////////////////////////////////
// Private Function: adjustMap(std::map<infoType, std::pair<std::string, int> > & inOut_Status,
//                 std::string in_sValue, infoType in_InfoType, int in_nRelativePriority)
// Description:    This function puts the value to the status map if the condition
//                 is met.
// Preconditions:  in_sValue is not empty, input numerals are not 0 (also eNotDefine)
// Postconditions: None.
// Security:       None.
// Algorithm:      1 if preconditions are not met, return false
//                 2 std::pair<std::string, int> loc_Pair
//                 3 Assign in_sValue and in_nRelativePriority to loc_Pair
//                 4 if in_InfoType is not in inOut_Status
```

APPENDIX C-continued

```
//                 4.1 inOut_Status[in_InfoType] = loc_Pair
//                 4.2 return true
//              5 if int of inOut_Status[in_InfoType] is GE
//                  in_nRelativePriority, return false
//              6 inOut_Status[in_InfoType] = loc_Pair
//              7 return true
/////////////////////////////////////////////////////////
/////////////////////////////////////////////////////////
// Private Function: obtainNonBlankLine(std::string & out_sLine)
// Description:    This function obtains non-blank line from m_HTTPSession
//                 This function returns true and line taking the leading and
//                 trailing white spaces out, or false when the HTML file
//                 reaches end of file.
// Preconditions:   None.
// Postconditions:  None.
// Security:        None.
// Algorithm:       1 clear out_sLine
//                  2 declare static CRemoveLeadingWhiteSpace loc_fRemoveLeading
//                         static CRemoveTrailingWhiteSpace loc_fRemoveTrailing
//                  2 while obtainNextLineOfHTMLFile( ) of m_HTTPSession passing
//                         out_sLine
//                     2.1 loc_fRemoveLeading(out_sLine)
//                     2.2 loc_fRemoveTrailing(out_sLine)
//                     2.3 if out_sLine is not empty, return true
//                  3 return false
/////////////////////////////////////////////////////////
/////////////////////////////////////////////////////////
// Private Function: obtainNonBlankLine(std::string & out_sLine, std::string in_sLine)
// Description:    This function obtains non-blank line from m_HTTPSession
//                 This function returns true and line taking the leading and
//                 trailing white spaces out, or false when the HTML file
//                 reaches end of file.
// Preconditions:   None.
// Postconditions:  None.
// Security:        None.
// Algorithm:       1 assign in_Line to out_Line
//                  2 declare static CRemoveLeadingWhiteSpace loc_fRemoveLeading
//                         static CRemoveTrailingWhiteSpace loc_fRemoveTrailing
//                  2 while obtainNextLineOfHTMLFile( ) of m_HTTPSession passing
//                         out_sLine
//                     2.1 loc_fRemoveLeading(out_Line)
//                     2.2 loc_fRemoveTrailing(out_Line)
//                     2.3 if out_Line is not empty, return true
//                  3 return false
/////////////////////////////////////////////////////////
/////////////////////////////////////////////////////////
// Private Function: obtainBlankLine(std::string & out_sLine, std::string in_sLine)
// Description:    This function obtains non-blank line from m_HTTPSession
//                 This function returns true and line taking the leading and
//                 trailing white spaces out, or false when the HTML file
//                 reaches end of file.
// Preconditions:   None.
// Postconditions:  None.
// Security:        None.
// Algorithm:       1 assign in_sLine to out_sLine
//                  2 declare static CRemoveLeadingWhiteSpace loc_fRemoveLeading
//                         static CRemoveTrailingWhiteSpace loc_fRemoveTrailing
//                  2 while obtainNextLineOfHTMLFile( ) of m_HTTPSession passing
//                         out_sLine
//                     2.1 loc_fRemoveLeading(out_sLine)
//                     2.2 loc_fRemoveTrailing(out_sLine)
//                     2.3 if out_sLine is not empty, return true
//                  3 return false
/////////////////////////////////////////////////////////
/////////////////////////////////////////////////////////
// Private Function: clear(std::string & out_sLine, std::string in_sLine)
// Description:    This function obtains non-blank line from m_HTTPSession
//                 This function returns true and line taking the leading and
//                 trailing white spaces out, or false when the HTML file
//                 reaches end of file.
// Preconditions:   None.
// Postconditions:  None.
// Security:        None.
// Algorithm:       1 clear out_sLine
/////////////////////////////////////////////////////////
/////////////////////////////////////////////////////////
// Function:        SExtractionState::SExtractionState( )
// Description:     Constructor
// Preconditions:   None.
```

APPENDIX C-continued

```
// Postconditions:  None.
// Security:        None.
// Algorithm:       1 initialize numerals to 0 (eNotDefine and ePreTargetLine).
//////////////////////////////////////////////////////////////////
//////////////////////////////////////////////////////////////////
// Function:        SExtractionState::~SExtractionState( )
// Description:     Destructor
// Preconditions:   None.
// Postconditions:  None.
// Security:        None.
// Algorithm:       Default.
//////////////////////////////////////////////////////////////////
//////////////////////////////////////////////////////////////////
// Function:        SExtractionState::reset( )
// Description:     This function initializes the attribute members of
//                  SExtractionState.
// Preconditions:   None.
// Postconditions:  None.
// Security:        None.
// Algorithm:       1 sets numerals to 0 (eNotDefine and ePreTargetLine)
//                  and strings to be empty
//////////////////////////////////////////////////////////////////
```

What is claimed is:

1. A computer-implemented method for validating an electronic software class specification file, the method comprising:
  receiving, via a web page interface, a file name and storage location for an electronic software class specification file;
  determining whether the class specification file includes each of a plurality of sections that class specifications are required to have according to document rules;
  if the class specification file includes each of the plurality of sections that class specifications are required to have, then determining whether the sections are correctly ordered according to the document rules; and
  if the class specification file does not include each of the plurality of sections that class specifications are required to have, and/or if the sections are not correctly ordered, then displaying in a second web page an indication that a particular section of the plurality of sections is misspelled, missing, or out of order in the class specification.

2. The method of claim 1, further comprising:
  identifying and storing names of all functions declared in a function list section of the class specification;
  identifying and storing names of all functions, if any, declared in a data structure defined in a defined type list section of the class specification;
  identifying and storing names of all functions, if any, declared in a nested class defined in the defined type list section of the class specification;
  identifying and storing names of all functions defined in a function definitions section of the class specification;
  determining whether any function defined in the function definitions section is not in the function list section or the defined type list section of the class specification; and
  if a particular function defined in the function definitions section is not in the function list section or the defined type list section of the class specification, then displaying in the second web page an indication that the particular function is not declared in the class specification.

3. The method of claim 2,
  wherein identifying and storing names of functions declared in the function list section and identifying and storing names of functions declared in the defined type list section include storing the names of the functions in association with corresponding parameter lists.

4. The method of claim 2,
  wherein identifying and storing names of functions declared in the function list section and identifying and storing names of functions declared in the defined type list section include storing the names of the functions, in a function lookup table, in association with corresponding parameter lists; and
  wherein determining whether any function defined in the function definitions section is not in the function list section or the defined type list section of the class specification includes determining, from the function lookup table, whether the particular function is defined in the function list or defined type list sections of the class specification.

5. The method of claim 1, further comprising:
  identifying and storing names of all attributes, if any, specified in a data structure defined in a defined type list section of the class specification;
  identifying and storing names of all attributes, if any, specified in a nested class defined in the defined type list section of the class specification;
  identifying and storing names of all attributes described in a class attributes section of the class specification;
  identifying all attributes referenced in functions defined in a function definitions section of the class specification;
  determining whether any attribute referenced in a function in the function definitions section is not in the defined type list section or the class attributes section of the class specification; and
  if a particular attribute referenced in a function in the function definitions section is not in the defined type list section or the class attributes section of the class specification, then displaying in the second web page an indication that the particular attribute is not specified in the class specification.

6. The method of claim 5,
  wherein identifying and storing names of attributes specified in the defined type list section and identifying and storing names of attributes specified in the class attributes section include storing the names of the attributes in an attributes lookup table; and wherein determining whether any attribute referenced in a function in the function definitions section is not in the defined type list section or the class attributes section of the class specification includes determining, from the attributes lookup table, whether the particular attribute is specified in the defined type list or class attributes sections of the class specification.

7. The method of claim 1, further comprising:

identifying and storing names of all parameters declared in a function list section of the class specification;

identifying and storing names of all parameters, if any, declared in association with a corresponding function in a structure defined in a defined type list section of the class specification;

identifying and storing names of all parameters, if any, declared in association with a corresponding function in a nested class defined in a defined type list section of the class specification;

identifying all parameters referenced in functions defined in a function definitions section of the class specification;

determining whether any parameter referenced in a function in the function definitions section is not in the function list section or the defined type list section of the class specification; and if a particular parameter referenced in a function in the function definitions section is not in the function list section or the defined type list section of the class specification, then displaying in the second web page an indication that the particular parameter is not specified in the class specification.

8. The method of claim 7, wherein identifying and storing names of parameters declared in the function list section and identifying and storing names of parameters declared in the defined type list section include storing the names of the parameters in a parameters lookup table; and wherein determining whether any parameter referenced in a function in the function definitions section is not in the function list section or the defined type list section of the class specification includes determining, from the parameters lookup table, whether the particular parameter is declared in the function list section or defined type list sections of the class specification.

9. The method of claim 1, further comprising:

identifying all local variables referenced in a function defined in a function definitions section of the class specification;

if a particular local variable referenced in the function in the function definitions section has not already been identified in the function, then storing the name of the particular local variable in a data structure and incrementing a local variable counter corresponding to the particular local variable and the function; and if the name of the particular local variable is already stored in the data structure, then incrementing the local variable counter.

10. The method of claim 1, wherein displaying in the second web page an indication that a particular section of the plurality of sections is misspelled, missing, or out of order in the class specification includes highlighting the indication by displaying the indication in a first character type that is different from a second character type in which information other than the indication is displayed.

11. A non-transitory computer-readable storage medium carrying one or more sequences of instructions which, when executed by one or more processors, causes the one or more processors to perform the method recited in claim 1.

12. A non-transitory computer-readable storage medium carrying one or more sequences of instructions which, when executed by one or more processors, causes the one or more processors to perform the method recited in claim 2.

13. A non-transitory computer-readable storage medium carrying one or more sequences of instructions which, when executed by one or more processors, causes the one or more processors to perform the method recited in claim 3.

14. A non-transitory computer-readable storage medium carrying one or more sequences of instructions which, when executed by one or more processors, causes the one or more processors to perform the method recited in claim 4.

15. A non-transitory computer-readable storage medium carrying one or more sequences of instructions which, when executed by one or more processors, causes the one or more processors to perform the method recited in claim 5.

16. A non-transitory computer-readable storage medium carrying one or more sequences of instructions which, when executed by one or more processors, causes the one or more processors to perform the method recited in claim 6.

17. A non-transitory computer-readable storage medium carrying one or more sequences of instructions which, when executed by one or more processors, causes the one or more processors to perform the method recited in claim 7.

18. A non-transitory computer-readable storage medium carrying one or more sequences of instructions which, when executed by one or more processors, causes the one or more processors to perform the method recited in claim 8.

19. A non-transitory computer-readable storage medium carrying one or more sequences of instructions which, when executed by one or more processors, causes the one or more processors to perform the method recited in claim 9.

20. A non-transitory computer-readable storage medium carrying one or more sequences of instructions which, when executed by one or more processors, causes the one or more processors to perform the method recited in claim 10.

21. A system configured for validating an electronic software class specification file, the system comprising:

means for receiving, via a web page interface, a file name and storage location for an electronic software class specification file;

means for determining whether the class specification file includes each of a plurality of sections that class specifications are required to have according to document rules;

means for determining whether the sections are correctly ordered according to the document rules in response to determining that the class specification file includes each of the plurality of sections that class specifications are required to have; and means for displaying in a second web page an indication that a particular section of the plurality of sections is misspelled, missing, or out of order in the class specification in response to determining that the class specification file does not include each of the plurality of sections that class specifications are required to have and/or if the sections are not correctly ordered.

22. The system of claim 21, further comprising:

means for identifying and storing names of all functions declared in a function list section of the class specification;

means for identifying and storing names of all functions, if any, declared in a data structure defined in a defined type list section of the class specification;

means for identifying and storing names of all functions, if any, declared in a nested class defined in the defined type list section of the class specification;

means for identifying and storing names of all functions defined in a function definitions section of the class specification;

means for determining whether any function defined in the function definitions section is not in the function list section or the defined type list section of the class specification; and means for displaying in the second web page an indication that the particular function is not declared in the class specification in response to determining that a particular function defined in the function definitions section is not in the function list section or the defined type list section of the class specification.

* * * * *